(12) United States Patent  
Kuang

(10) Patent No.: US 11,323,247 B2  
(45) Date of Patent: *May 3, 2022

(54) METHODS AND SYSTEMS FOR SECURE DATA COMMUNICATION

(71) Applicant: Quantropi Inc., Ottawa (CA)

(72) Inventor: Randy Kuang, Ottawa (CA)

(73) Assignee: Quantropi Inc., Ottawa (CA)

( * ) Notice: Subject to any disclaimer, the term of this patent is extended or adjusted under 35 U.S.C. 154(b) by 196 days.

This patent is subject to a terminal disclaimer.

(21) Appl. No.: 16/755,871

(22) PCT Filed: Oct. 23, 2018

(86) PCT No.: PCT/CA2018/051339  
§ 371 (c)(1),  
(2) Date: Apr. 13, 2020

(87) PCT Pub. No.: WO2019/079890  
PCT Pub. Date: May 2, 2019

(65) Prior Publication Data  
US 2021/0211271 A1    Jul. 8, 2021

Related U.S. Application Data

(63) Continuation-in-part of application No. 15/796,577, filed on Oct. 27, 2017, now Pat. No. 10,476,664.

(Continued)

(51) Int. Cl.  
*H04L 9/06* (2006.01)  
*H04L 9/32* (2006.01)  
(Continued)

(52) U.S. Cl.  
CPC .......... *H04L 9/0643* (2013.01); *H04L 9/3247* (2013.01); *G06Q 20/0655* (2013.01);  
(Continued)

(58) Field of Classification Search  
CPC ..... H04L 9/0643; H04L 9/3247; H04L 67/12; H04L 2209/34; H04L 2209/38;  
(Continued)

(56) References Cited

U.S. PATENT DOCUMENTS 5,862,260 A    1/1999    Rhoads  
6,813,366 B1   11/2004   Rhoads  
(Continued)

FOREIGN PATENT DOCUMENTS

CA    2638134 A1    1/2010  
CN    101610510 A   12/2009  
(Continued)

OTHER PUBLICATIONS

International Search Report and Written Opinion for International Application No. PCT/CA2018/051339 dated Jan. 31, 2019.

(Continued)

*Primary Examiner* — Fatoumata Traore  
*Assistant Examiner* — Mirza Israr Javed  
(74) *Attorney, Agent, or Firm* — Wolf, Greenfield & Sacks, P.C.

(57) ABSTRACT

A computer-implemented method, which comprises: receiving an input message comprising N-bit input segments, N being an integer greater than one; converting the N-bit input segments into corresponding N-bit output segments using a 2N-by-2N one-to-one mapping stored in a non-transitory storage medium; and generating an output message comprising the N-bit output segments. Also, a computer-implemented method for a recipient to validate a message received from a sender, the message including a first part and a second part. This method comprises receiving a token from a witnessing entity; obtaining a first data element by joint processing of the first part of the message and the token; obtaining a second data element by joint processing of the (Continued)

second part of the message using a key associated with the sender; and validating the message by comparing the first and second data elements.

30 Claims, 46 Drawing Sheets

Related U.S. Application Data

(60) Provisional application No. 62/662,819, filed on Apr. 26, 2018.

(51) Int. Cl.
*H04L 29/08* (2006.01)
*G06Q 20/06* (2012.01)
*G06Q 20/38* (2012.01)
*H04L 67/12* (2022.01)

(52) U.S. Cl.
CPC ..... *G06Q 20/3829* (2013.01); *G06Q 2220/00* (2013.01); *H04L 67/12* (2013.01); *H04L 2209/34* (2013.01); *H04L 2209/38* (2013.01)

(58) Field of Classification Search
CPC ... H04L 9/3239; H04L 2209/84; H04L 9/065; G06Q 20/0655; G06Q 20/3829; G06Q 2220/00
See application file for complete search history.

(56) References Cited

U.S. PATENT DOCUMENTS

| | | | |
|---|---|---|---|
| 6,937,273 B1 | 8/2005 | Loui | |
| 7,334,125 B1 | 2/2008 | Pellacuru | |
| 8,169,887 B2 | 5/2012 | Tsai | |
| 8,289,999 B1 * | 10/2012 | Francis | H04L 1/1893 370/476 |
| 8,878,860 B2 * | 11/2014 | Akiyama | G06F 12/0207 345/533 |
| 9,077,710 B1 * | 7/2015 | Levner | G06F 21/45 |
| 10,158,485 B2 | 12/2018 | Satpathy et al. | |
| 10,271,088 B2 | 4/2019 | Ellis | |
| 10,476,664 B2 | 11/2019 | Kuang | |
| 11,057,193 B2 | 7/2021 | Kuang et al. | |
| 2001/0016051 A1 | 8/2001 | Rhoads | |
| 2002/0023220 A1 | 2/2002 | Kaplan | |
| 2002/0090203 A1 | 7/2002 | Mankovitz | |
| 2006/0031737 A1 | 2/2006 | Chugg et al. | |
| 2008/0005293 A1 | 1/2008 | Bhargava et al. | |
| 2008/0148062 A1 * | 6/2008 | Ekberg | H04W 12/069 713/187 |
| 2010/0005132 A1 | 1/2010 | Choi et al. | |
| 2010/0239092 A1 | 9/2010 | Kuang | |
| 2011/0026483 A1 * | 2/2011 | Rudrapatna | H04L 5/0007 370/330 |
| 2011/0222506 A1 * | 9/2011 | Szymanksi | H04W 72/087 370/330 |
| 2014/0281367 A1 | 9/2014 | Johnson et al. | |
| 2015/0089223 A1 | 3/2015 | Tasher et al. | |
| 2015/0350655 A1 | 12/2015 | Huang | |
| 2017/0353302 A1 | 12/2017 | Fernandez et al. | |
| 2019/0132117 A1 | 5/2019 | Kuang | |

FOREIGN PATENT DOCUMENTS

| | | |
|---|---|---|
| CN | 101610510 B | 6/2012 |
| CN | 103000181 A | 3/2013 |
| CN | 103282958 A | 9/2013 |
| CN | 104335218 A | 2/2015 |
| WO | WO 2019/079890 A1 | 5/2019 |

OTHER PUBLICATIONS

International Search Report and Written Opinion for International Application No. PCT/CA2019/050093 dated May 1, 2019.
Cheng et al., Securing the Internet of Things in a Quantum World. Internet of Things. IEEE Communications Magazine. Feb. 2017. 5 pages. DOI: 10.1109/MCOM.2017.1600522CM.
Martinelli, Encryption Algorithms and Permutation matrices. Haiku Laboratories. http://www.haikulabs.com/encrmat4.htm Jun. 2003. Last accessed Oct. 24, 2017. 4 pages.
Examiner's Report dated Dec. 1, 2020 in connection with Canadian Application No. 3,073,549.
Examiner's Report dated Feb. 5, 2021 in connection with Canadian Application No. 3,073,549.
Notice of Allowance dated Mar. 15, 2021 in connection with Canadian Application No. 3,073,549.
Office Action dated Dec. 17, 2020 in connection with Chinese Application No. 201880057218.7.
Office Action dated Mar. 8, 2021 in connection with Chinese Application No. 201880057218.7.
Extended European Search Report dated Jun. 29, 2021 in connection with European Application No. 18870501.6.
International Search Report and Written Opinion dated Jun. 23, 2020 in connection with International Application No. PCT/CA2020/050417.
Notice of Allowance dated Mar. 3, 2021 in connection with U.S. Appl. No. 17/066,273.
[No Author Listed], Announcing the advanced encryption standard (AES). Federal Information Processing Standards Publication 197. Nov. 26, 2001. 49 pages. URL:http://csrc.nist.gov/publications/fips/fips197/fips-197.pdf.
Jacob et al., Towards the Generation of a Dynamic Key-Dependent S-Box to Enhance Security. Feb. 7, 2015. 5 pages.
Kak, Lecture 8: AES: The Advanced Encryption Standard. Lecture Notes on "Computer and Network Security". Purdue University. Feb. 5, 2020. 91 pages.
Wu, One-to-one mapping matrix. Applied mathematics and computation. Oct. 15, 2005;169(2):963-70.
Zulehner et al., Taking one-to-one mappings for granted: Advanced logic design of encoder circuits. Design, Automation & Test in Europe Conference & Exhibition (DATE). Mar. 27, 2017. pp. 818-823.
PCT/CA2018/051339, Jan. 31, 2019, International Search Report and Written Opinion.
PCT/CA2019/050093, May 1, 2019, International Search Report and Written Opinion.

* cited by examiner

| 402 | |
|---|---|
| x | y |
| 0 | 3367 |
| 1 | 128 |
| ... | ... |
| $2^N-2$ | 1007 |
| $2^N-1$ | 22 |

FIG. 4A

$$g \times P = g^*$$

$$[01000000] \times \begin{bmatrix} 8 \times 8 \\ \text{PERMUTATION} \\ \text{MATRIX} \end{bmatrix} = [10000000]$$

FIG. 4B

| Portion of Zones and Ones | "Weight" | Probability of Occurrence |
|---|---|---|
| 0:8 | 0.000 | 1/256 |
| 1:7 | 0.125 | 8/256 |
| 2:6 | 0.250 | 28/256 |
| 3:5 | 0.375 | 56/256 |
| 4:4 | 0.500 | 70/256 |
| 5:3 | 0.625 | 56/256 |
| 6:2 | 0.750 | 28/256 |
| 7:1 | 0.875 | 8/256 |
| 8:0 | 1.000 | 1/256 |

FIG. 21

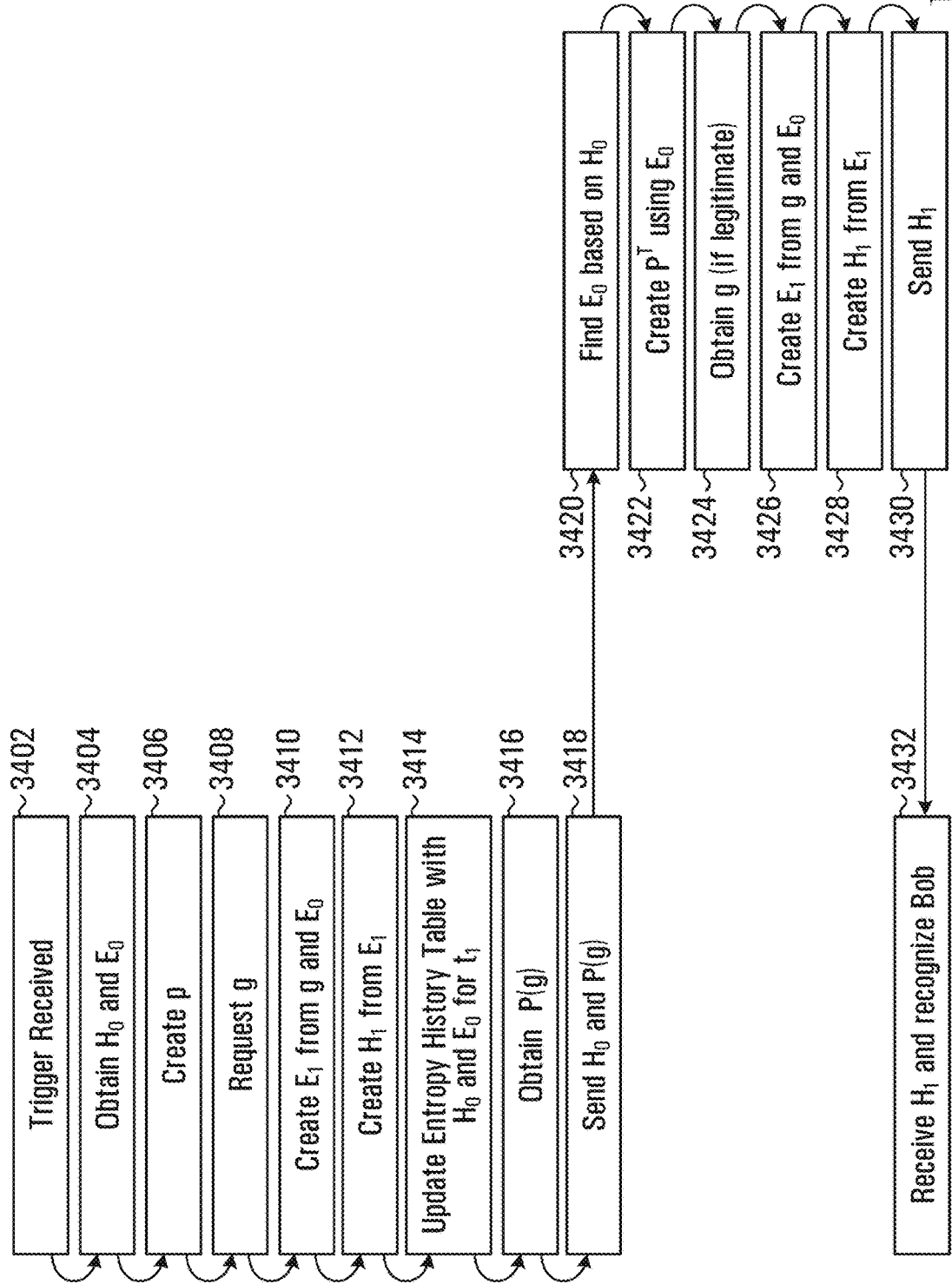

METHODS AND SYSTEMS FOR SECURE DATA COMMUNICATION

CROSS-REFERENCE TO RELATED APPLICATIONS

This application is a 35 U.S.C. § 371 National Phase filing of International Application No. PCT/CA2018/051339, filed on Oct. 23, 2018, entitled "METHODS AND SYSTEMS FOR SECURE DATA COMMUNICATION," which claims the benefit under 35 U.S.C. 119(e) of U.S. Provisional Patent Application Ser. No. 62/662,819, filed on Apr. 26, 2018, entitled "METHODS AND SYSTEMS FOR SECURE DATA COMMUNICATION." International Application No. PCT/CA2018/051339 is also a continuation-in-part (CIP) of U.S. patent application Ser. No. 15/796,577, filed on Oct. 27, 2017, entitled "METHODS AND SYSTEMS FOR DATA PROTECTION." The entire contents of the foregoing applications is hereby incorporated by reference herein.

FIELD

The present invention relates in general to data protection and, in particular, to data encoding and decoding.

BACKGROUND

Current data encryption technologies rely on the solution of complex numerical problems that present a formidable challenge to solve. Yet, when armed with a "key" to the solution, a legitimate user can easily gain access to the original, unencrypted data. This is the principle behind technologies such as AES (Advanced Encryption Standard), according to which data can be safely transmitted in encrypted form. However, the security provided by AES and other encryption technologies lasts only as long as a malicious party that intercepts the encrypted data does not have enough computing power and enough target data available to actually solve the problem without the required key.

To hedge against the inevitable increases in computing power at the disposal of malicious parties worldwide (and which is poised to increase further still with the advent of quantum computers), those with a need for secure communications typically seek to increase the complexity of the numerical problems being presented for solution. However, one side effect of this escalation in problem complexity is that a legitimate user, i.e., one with the required key, must also now expend increasingly significant resources to protect and decrypt the data. Thus, while the resources needed by a legitimate user are still designed to be less than the resources needed to solve the problem by brute force, they present a non-negligible burden on various performance parameters such as throughput and energy consumption.

As such, a highly secure yet computationally economical data protection solution would be welcomed by the industry.

SUMMARY

According to a broad aspect, there may be provided a computer-implemented method, comprising:
receiving an input message comprising N-bit input segments, N being an integer greater than one;
converting the N-bit input segments into corresponding N-bit output segments using a $2^N$-by-$2^N$ one-to-one mapping stored in a non-transitory storage medium; and
generating an output message comprising the N-bit output segments.

According to a further broad aspect, there may be provided a non-transitory computer-readable storage medium comprising computer-readable instructions which, when executed by a processor, cause the processor to carry out a method that comprises:
receiving an input message comprising N-bit input segments, N being an integer greater than one;
converting the N-bit input segments into corresponding N-bit output segments using a $2^N$-by-$2^N$ one-to-one mapping stored in a non-transitory storage medium; and
generating an output message comprising the N-bit output segments.

According to a further broad aspect, there may be provided a computer-implemented method, comprising:
receiving an input message comprising N-bit input segments, N being an integer greater than one;
converting the N-bit input segments into corresponding N-bit output segments using a $2^N$-by-$2^N$ one-to-one mapping stored in a non-transitory storage medium;
reassembling the N-bit output segments into M-bit input segments, M being an integer greater than one and different from N;
converting the M-bit input segments into corresponding M-bit output segments using a $2^M$-by-$2^M$ one-to-one mapping stored in a non-transitory storage medium; and
generating an output message comprising the M-bit output segments.

According to a further broad aspect, there may be provided a non-transitory computer-readable storage medium comprising computer-readable instructions which, when executed by a processor, cause the processor to carry out a method that comprises:
receiving an input message comprising N-bit input segments, N being an integer greater than one;
converting the N-bit input segments into corresponding N-bit output segments using a $2^N$-by-$2^N$ one-to-one mapping stored in a non-transitory storage medium;
reassembling the N-bit output segments into M-bit input segments, M being an integer greater than one and different from N;
converting the M-bit input segments into corresponding M-bit output segments using a $2^M$-by-$2^M$ one-to-one mapping stored in a non-transitory storage medium; and
generating an output message comprising the M-bit output segments.

According to a further broad aspect, there may be provided a non-transitory computer-readable storage medium comprising computer-readable instructions which, when executed by a processor, cause the processor to carry out a method that comprises encoding input segments of data into output segments of data of the same size using a one-to-one mapping of dimensionality greater than the size of the segments.

According to a further broad aspect, there may be provided a method comprising encoding input segments of data into output segments of data of the same size using a one-to-one mapping of dimensionality greater than the size of the segments.

According to a further broad aspect, there may be provided a non-transitory computer-readable storage medium comprising computer-readable instructions which, when executed by a processor, cause the processor to carry out a method that comprises using a permutation mapping to encode individual first sets of bits of an input bit stream into corresponding same-sized second sets of bits of an output bit stream, the permutation mapping being such that, for most of the possible corresponding pairs of first and second sets, the relative proportion of ones and zeroes is different between the two sets in the pair.

According to a further broad aspect, there may be provided a computer-implemented method for a recipient to validate a message received from a sender, the message including a first part and a second part, the method comprising:
  receiving a token from a witnessing entity;
  obtaining a first data element by joint processing of the first part of the message and the token;
  obtaining a second data element by joint processing of the second part of the message using a key associated with the sender; and
  validating the message by comparing the first and second data elements.

According to a further broad aspect, there may be provided a non-transitory computer-readable storage medium comprising computer-readable instructions which, when executed by a processor, cause the processor to carry out a method for a recipient to validate a message received from a sender, the message including a first part and a second part, wherein the method comprises:
  receiving a token from a witnessing entity;
  obtaining a first data element by joint processing of the first part of the message and the token;
  obtaining a second data element by joint processing of the second part of the message using a key associated with the sender; and
  validating the message by comparing the first and second data elements.

According to a further broad aspect, there may be provided a computer-implemented method executed by a witnessing entity, comprising:
  obtaining a code and a signature from a sender;
  consulting a first database to obtain entropy data associated with the code;
  generating a token from the entropy data;
  storing in a second database an association between the token and the signature; and
  transmitting a message comprising the token in response to receipt of a request identifying at least the signature.

According to a further broad aspect, there may be provided a non-transitory computer-readable storage medium comprising computer-readable instructions which, when executed by a processor, cause the processor to carry out a method that comprises:
  obtaining a code and a signature from a sender;
  consulting a first database to obtain entropy data associated with the code;
  generating a token from the entropy data;
  storing in a second database an association between the token and the signature; and
  transmitting a message comprising the token in response to receipt of a request identifying at least the signature.

According to a further broad aspect, there may be provided a computer-implemented method of synchronizing an Internet-enabled appliance with an application device, comprising:
  at the application device:
    generating an encoding mapping based on (i) a previous encoding mapping used to communicate previously with the appliance and (ii) a seed;
    transmitting the encoding mapping to the appliance over a local connection that does not traverse the Internet;
  at the appliance:
    receiving the encoding mapping over the local connection; and
    using the encoding mapping to subsequently secure data exchanged with the application device over the Internet.

According to a further broad aspect, there may be provided an IoT system comprising:
  an application device comprising a processing and networking capabilities configured for:
    generating an encoding mapping based on (i) a previous encoding mapping used to communicate previously with the appliance and (ii) a seed; and
    transmitting the encoding mapping to the appliance over a local connection that does not traverse the Internet; and
  an appliance connected to the application device over the Internet and comprising processing and networking capabilities configured for:
    receiving the encoding mapping over the local connection; and
    using the encoding mapping to subsequently secure data exchanged with the application device over the Internet.

BRIEF DESCRIPTION OF THE DRAWINGS

These and other aspects will become apparent from the following description of embodiments in conjunction with the accompanying drawings, wherein:

FIGS. 4A to 4C are block diagrams showing various ways to carry out one of the steps in FIG. 2, in accordance with various non-limiting embodiments.

FIG. 21 is a table showing a relationship between the proportion of zeroes and ones in an 8-bit input segment and the likelihood of occurrence of an input segment having such proportion.

FIG. 34 is a flowchart illustrating an update phase in the context of building an Entropy History Table by two peers.

The drawings are to be considered as illustrative of certain examples and are not to be considered limiting.

DETAILED DESCRIPTION

Figure 1:
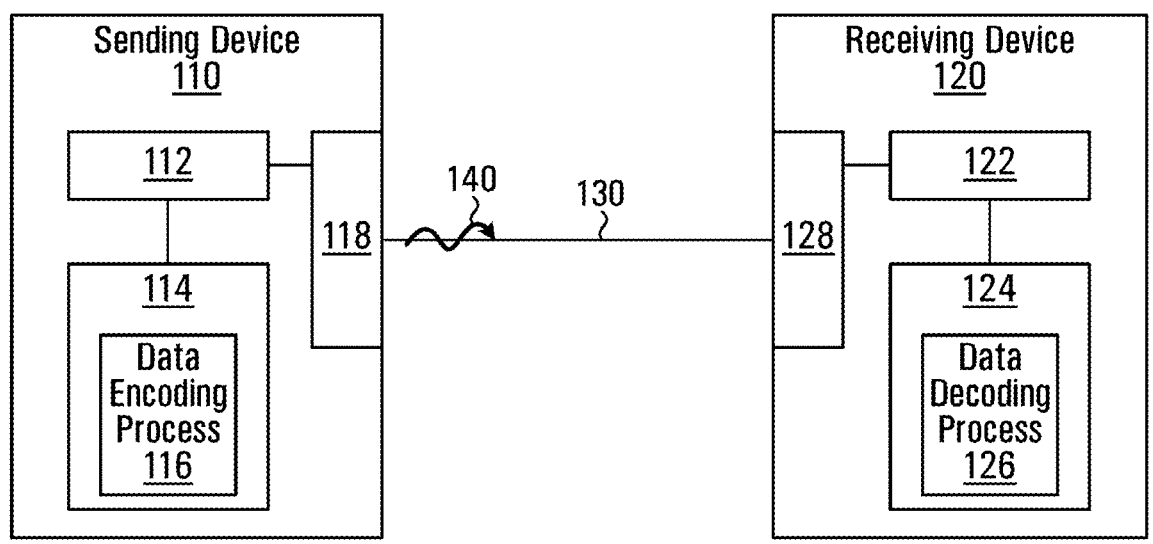
FIG. 1 is a block diagram showing a sending device, a receiving device and a channel.

FIG. 1 shows a communication system that may be configured to incorporate an example non-limiting embodiment of the present invention. Specifically, the system includes a sending device 110, a receiving device 120 and a channel 130 between the sending device 110 and the receiving device 120. The sending device 110 and the receiving device 120 may each be implemented within a mobile phone, smartphone, laptop, desktop, on-board vehicle computer, internet-enabled appliance, etc.

The sending device 110 may release a signal 140 to the receiving device 120 over the channel 130. The signal 140 may be a modulated signal that carries digital data that has been encoded by elements of the sending device 110. The channel 130 may be any suitable communication channel physically implemented using any suitable medium including one or more of wired, RF, fiber optic, free-space optical, acoustic, etc. The channel 130 may be implemented logically as a path over one or more data networks including but not limited to an intranet, a virtual private network and the Internet.

The receiving device 120 may also release a signal (not shown) containing data for the sending device 110 onto the channel 130 such that both the sending device 110 and the receiving device 120 are in bidirectional communication over the channel 130. However, to simplify the description herein below, a description of the generation of a signal by the receiving device 120 for transmission towards the sending device 110 will not be provided, as it would closely match the description of the generation of the signal 140.

In one embodiment, the sending device 110 uses electricity (e.g., DC or AC electricity from a battery, generator, inverter, power lines, photovoltaic cell or electrical transformer) to effect a transformation or change on an input signal carrying an input bit stream, in order to produce an output signal carrying an output bit stream. To this end, the sending device 110 includes a processing entity 112 and a memory 114 that stores computer-readable instructions. The memory 114 may be implemented in a variety of ways, such as a magnetic disk, or solid state memory, and may include flash memory, SRAM, DRAM, phase-change memory and the like. The processing entity 112 is configured to execute the computer-readable instructions in the memory 114. In doing so, the processing entity 112 of the sending device 110 causes the sending device 110 to implement a variety of processes, including data processes and control processes. Examples of a processing entity may include electronic components such as a computer processor on a microchip, or a quantum computer. An example of a process that may be implemented by the processing entity 112 includes a data encoding process, described herein below in further detail. The data encoding process may be encoded as a subset 116 of the computer-readable instructions in the memory 114. An input/output (I/O) 118 enables the processing entity 112 to communicate externally and may include a screen (e.g., touchscreen), keyboard/mouse, network interface device/card (e.g., to support NFC, WiFi, Ethernet or cellular/GSM/LTE communications), USB port(s), etc.

For its part, the receiving device 120 also uses electricity to effect a transformation or change on an input signal carrying an input bit stream, in order to produce an output signal carrying an output bit stream. To this end, the receiving device 120 includes a processing entity 122 and a memory 124 that stores computer-readable instructions. The processing entity 122 is configured to execute the computer-readable instructions in the memory 124. In doing so, the processing entity 122 of the receiving device 120 causes the receiving device 120 to implement a variety of processes, including data processes and control processes. Examples of a processing entity may include electronic components such as a computer processor on a microchip, or a quantum computer. An example of a process that may be implemented by the processing entity 122 includes a data encoding process, described herein below in further detail. The data decoding process may be encoded as a subset 126 of the computer-readable instructions in the memory 124. An input/output (I/O) 118 enables the processing entity 122 to communicate externally and may include a screen (e.g., touchscreen), keyboard/mouse, network interface device/card (e.g., to support NFC, WiFi, Ethernet or cellular/GSM/LTE communications), USB port(s), etc.

Components of the sending device 110 (receiving device 120), such as the processing entity 112 (122) and the memory 114 (124) and various other input and other output devices, may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of the sending device 110 and the receiving device 120 may be interconnected by a network. For example, the memory 114 (124) may be comprised of multiple physical memory units located in different physical locations interconnected by a network. Moreover, depending on the exact device configuration and type, the memory 114 (124) may be volatile (such as RAM, for example), non-volatile (such as ROM, flash memory, etc., for example) or some combination of the two. The computer readable instructions stored in the memory 114 (124) may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

It should be appreciated that in some cases, the sending device 110 and the receiving device 120 may be the same computer, the channel 130 may be internal circuitry of the computer, the processing entities 112, 122 may be the same processing entity, the memories 114, 124 may be a common computer memory, and the subsets 116, 126 may be different subsets of the common computer memory.

It should also be appreciated that the term "bit stream" generally encompasses a sequence of binary digits. A "bit stream" may include a sequence of bits that represents a stream of data, transmitted continuously over a communications path. In some cases, the term "bit stream" may encompass a bit string or an ordered collection of bits that may be encoded into, or reside on, a computer-readable medium, such as the bits that define a file stored on a solid state or magnetic drive. In some cases, a "bit stream" may include part of a digital message that may be formatted as an email, a text message, an instant message, an image, a video, a document in a format such as Word, PDF, etc. or in any other suitable way.

Data Encoding Process

A non-limiting embodiment of the data encoding process that may be implemented by the processing entity 112 of the sending device 110 in certain non-limiting embodiments will now be described with further reference to the flowchart in FIG. 2 and the conceptual block diagram in FIG. 3, for a received/obtained input bit stream 310.

At step 210 of the data encoding process, which may be caused by execution of the computer-readable instructions 116, the processing entity 112 determines a system size. This system size is denoted N and may be stored as a constant or variable in the memory 114. N is an integer at least as great as 1 and typically would be higher for added security. For example, in some embodiments, N may be 2, 4, 6, 8 or at least as great as 10, while in other embodiments, N may be at least as great as 20. In specific example embodiments, which are non-limiting, N may be 12, 13 or 14. There is no particular limitation on the magnitude of N, although it can be expected that greater security will be achieved with a higher value of N. Also, the system size may be fixed, or may be dynamically changed over time as will be described later on.

At step 220 of the data encoding process, which may be caused by execution of the computer-readable instructions 116, the processing entity 112 encodes input segments of data into output segments of data of the same size using a one-to-one mapping of dimensionality greater than the size of each segment. In an embodiment, the processing entity 112 obtains data indicative of a one-to-one mapping between $2^N$ possible input indexes and $2^N$ possible output indexes where, it is recalled, N represents the system size. To disambiguate this mapping from other mappings described elsewhere, the mapping obtained at step 220 will be referred to herein as the "encoding mapping".

The encoding mapping may be expressed in different ways. For example, the encoding mapping may be expressed as $\{P(x,y)\}$, which is a set of values at coordinates $P(x,y)$ that can be stored in the memory 114, wherein for each x (between 0 and $2^N-1$) there is a single y (also between 0 and $2^N-1$) such that $P(x,y)=1$, and wherein for each y there is a single x such that $P(x,y)=1$, and wherein $P(x,y)=0$ for all other combinations of x and y. The encoding mapping may thus represent a one-to-one association between each of the values from 0 to $2^N-1$ and another (typically but not necessarily) different value between 0 and $2^N-1$.

Conceptually, the encoding mapping take the form of a $2^N$-by-$2^N$ matrix "P", where each row and each column contains a single "1", and the rest of the matrix elements (of which there are $2^{2N}-2^N$) are "0". Such a matrix may be referred to as a "binary permutation matrix", and may be stored in the memory 114.

In yet another example, the encoding mapping may take the form of a switch fabric input-output correspondence table that associates each of $2^N$ switch inputs to one of $2^N$ switch outputs. The switch fabric input-output correspondence table may be stored in the memory 114. Other ways of representing the encoding mapping, such that it may be stored in the memory 114 and suitably accessed and interpreted by the processing entity 112, are within the scope of the present invention. As with the system size (N), the encoding mapping may be fixed, or may be dynamically changed over time as will be described later on.

Figure 3:
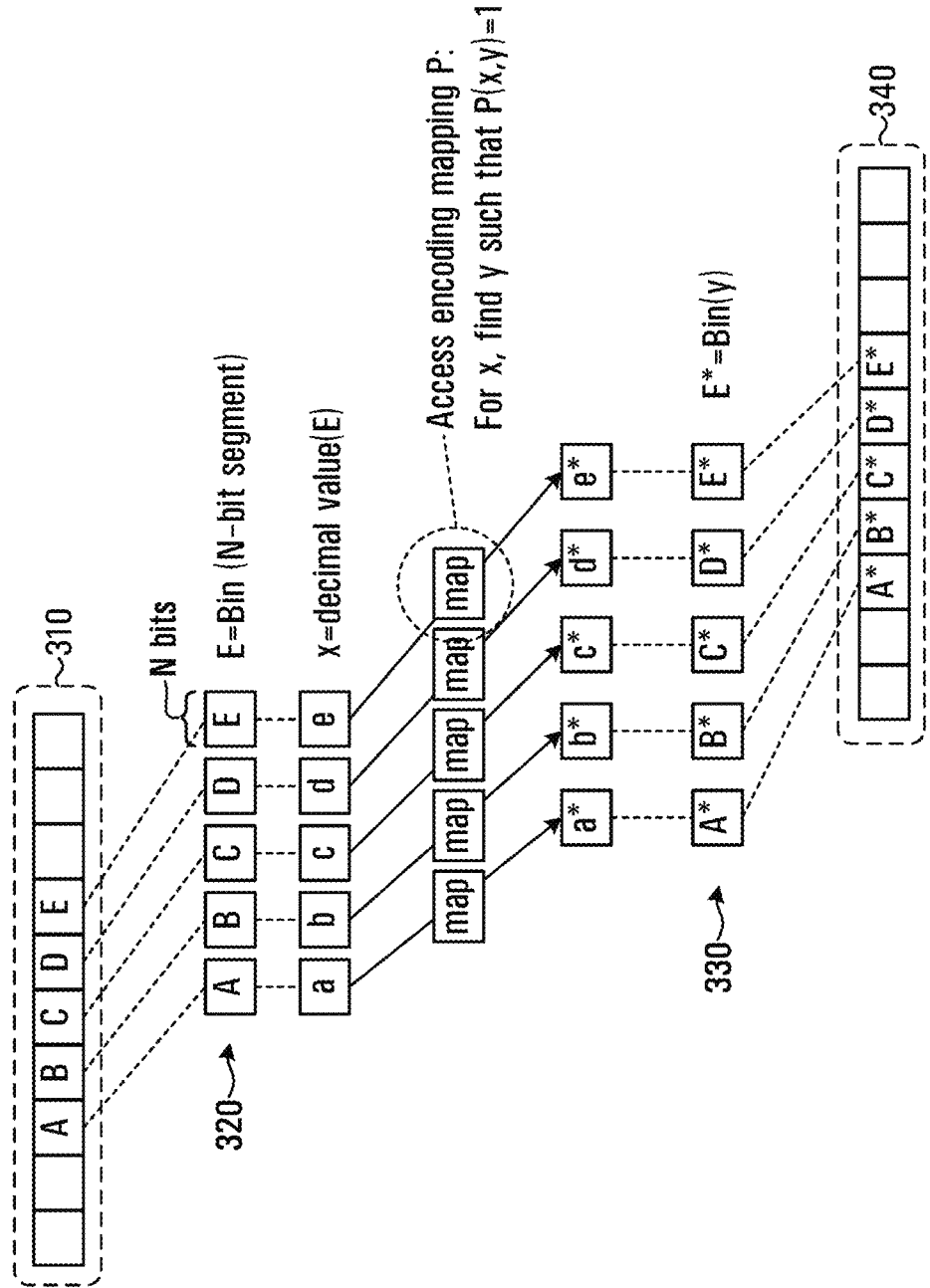
FIG. 3 is a conceptual block diagram, showing various steps in the data encoding process, in accordance with a non-limiting embodiment.

At step 230 of the data encoding process, which may be caused by execution of the computer-readable instructions 116, the processing entity 112 subdivides or separates the input bit stream 310 in FIG. 3 into a plurality of input bit segments 320 in FIG. 3, such that each of the input bit segments 320 is configured to have the system size, i.e., each of the input bit segments 320 is N bits long. This can be referred to as a disassembly process. It is noted that whereas a customary way to separate binary data is in groups of 8 bits (i.e., bytes), the value of N need not be 8 or a multiple thereof, and therefore the input bit segments 320 resulting from execution of step 230 are not necessarily a multiple of 8 bits long.

At step 240 of the data encoding process, which may be caused by execution of the computer-readable instructions 116, the processing entity 112 produces a plurality of output bit segments 330, where each of the output bit segments 330 corresponds to a respective one of the input bit segments 320. Each of the output bit segments 330 is configured to have the system size and is therefore N bits long, i.e., just like the input bit segments 320. Moreover, the contents of a given one of the output bit segments 330 is related to the contents of the respective one of the input bit segments 320 by the encoding mapping as will be described herein below. Specifically, for a particular N-bit input bit segment, an input index is determined as the (decimal) value of the particular N-bit input bit segment. Then, an output index is determined based on the input index and the encoding mapping. Finally, the corresponding N-bit output segment is set to the binary representation of this output index. This can be referred to as a quantropization process.

There may be various ways to determine an output index based on an input index and the encoding mapping in a practical implementation. In one example, with reference to FIG. 4A, if one considers that the encoding mapping is represented by the set $\{P(x,y)\}$, a look-up table 402 may store the various combinations of x and y that give $P(x,y)=1$. The look-up table 402 could be stored in the memory 114, wherein each of $2^N$ input indexes (the "x" column) is associated with a single output index (the "y" column). Thus, step 240 can involve accessing the look-up table 402 in the memory 114, based on an input index derived as the value of a particular N-bit input bit segment, so as to obtain an output index.

In another example, with reference to FIG. 4B, if one considers that the encoding mapping is represented by a $2^N$-by-$2^N$ binary permutation matrix P stored in the memory 114 (in this example, N=3), and if one creates a vector "g" as the $1 \times 2^N$ (i.e., 1×8) vector that contains a "1" element in the column that represents the input index, i.e., the (decimal) value of a particular N-bit input bit segment, then step 240 can involve calling a subroutine that executes a vector-matrix multiplication between g and P. The subroutine may be stored as computer-readable instructions stored in the memory 114 and executable by the processing entity 112. The outcome of the vector-matrix multiplication will be a $1 \times 2^N$ (i.e., 1×8) vector "g*" that contains a "1" element in the column that represents the output index.

Figure 4C:
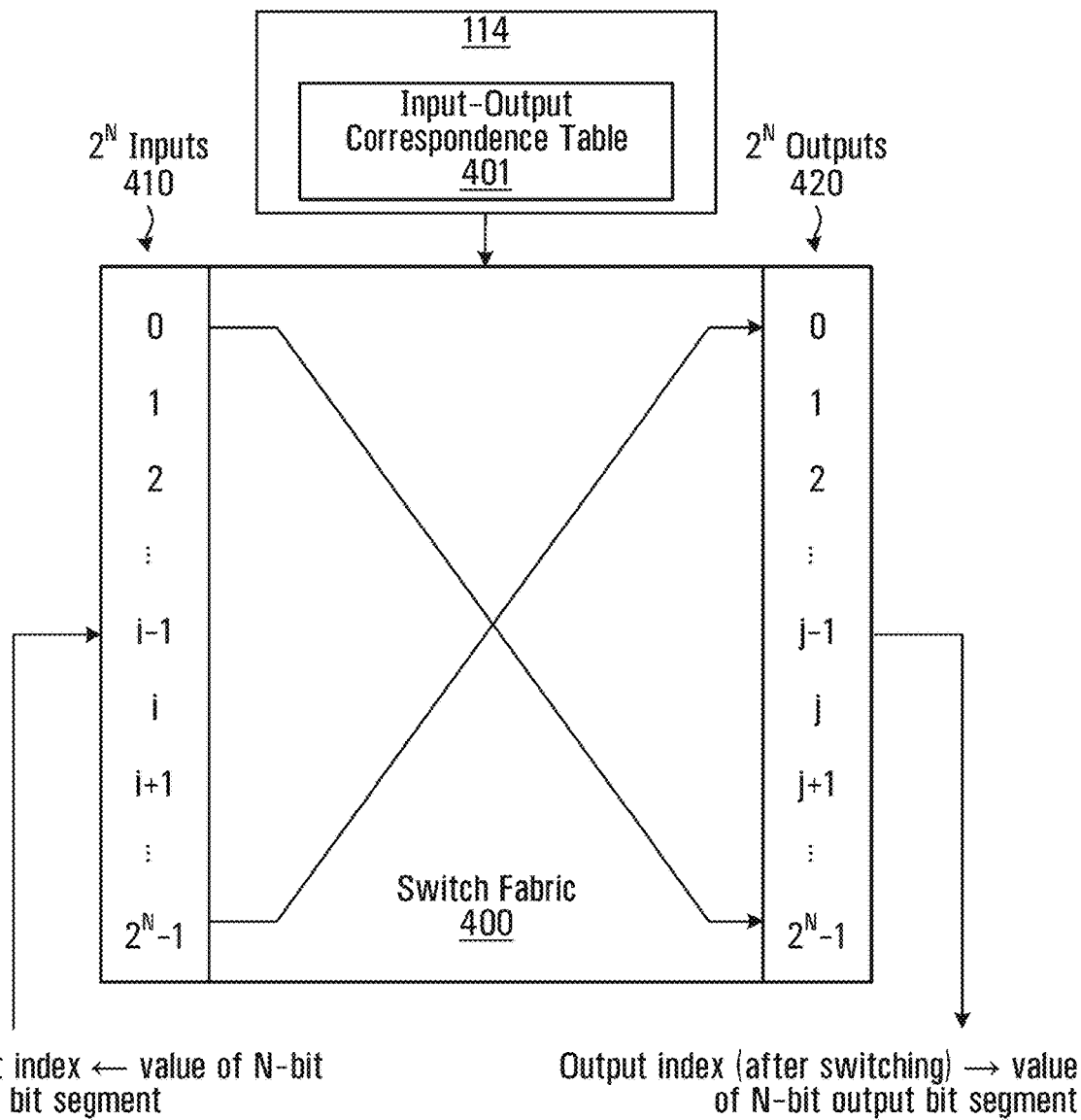

In yet another example, with reference to FIG. 4C, a hardware or software switch fabric 400 having $2^N$ inputs 410 and $2^N$ outputs 420 may be implemented within the sending device 110 and the encoding mapping may be represented as a switch fabric input-output correspondence table 401 for the switch fabric 400, as may be stored in the memory 114. The inputs 410 correspond to bit positions in successive $2^N \times 1$ input arrays (each containing only one "1" element at the position of the input index, the rest being zeroes) formed from corresponding N-bit input bit segments 320. The result is a succession of $2^N \times 1$ output arrays at the outputs 420 of the switch fabric 400. Each such output array contains only one "1" element at the position of the output index, the rest being zeroes. The decimal value of the position of the output index is converted into binary form, thus yielding the corresponding one of the N-bit output bit segments 330.

The foregoing is repeated for multiple ones of the input bit segments 320 and it will be appreciated that the manipulations and calculations can be achieved highly efficiently using a computer, notably by the processing entity 112.

At step 250 of the data encoding process, which may be caused by execution of the computer-readable instructions 116, the processing entity 112 may concatenate or combine multiple (e.g., successive) ones of the output bit segments 330 into an output bit stream 340, which may itself then be organized into bytes (or any other convenient grouping) and sent out onto the channel 130, e.g., they may be carried by the signal 140 after modulation into a modulated signal. The term "modulated signal" may include a signal that has one or more of its characteristics set or changed in such a manner as to encode information in the signal.

Of course, additional encoding and encryption of the input bit stream 310 (i.e., prior to execution of the data encoding process) and/or the output bit stream 340 (i.e., after execution of the data encoding process) could be added to render overall data encoding procedure even more secure.

Figure 5:
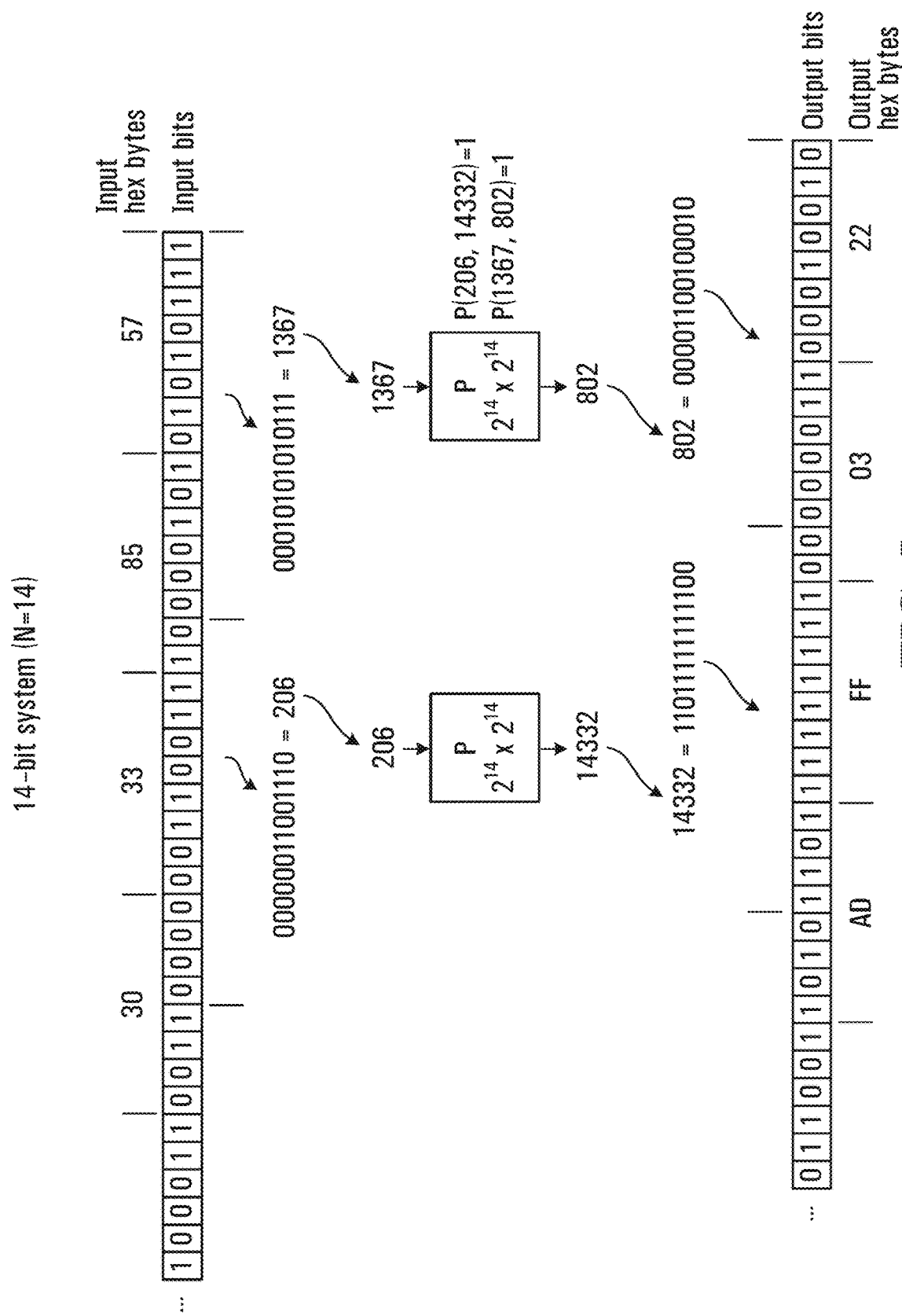
FIG. 5 is a block diagram, showing various steps in the data encoding process, in the context of a specific example of a non-limiting embodiment.

A specific non-limiting example of the data encoding process is now described with reference to FIG. 5. It is seen that an input data stream includes a sequence of hex bytes whose values are, from right to left, 57, 85, 33, 30, etc. The hex bytes can be broken down into bits, thus creating an input bit stream. The input bit stream is then broken down (disassembled) into segments of size N, where in this example, N=14. The first 14-bit input bit segment is 00010101010111, which has a decimal value of 1367, the next 14-bit input bit segment is 00000011001110, which has a decimal value of 206, and so on. The encoding mapping is first applied to decimal value 1367. In this case, the encoding mapping is represented by the set $\{P(x,y)\}$, where $P(x,y)=1$ for any x between 0 and $2^{14}-1$ (=16383), but for only one value of y for each such x; in all other cases $P(x,y)=0$; and mutatis mutandis for y and x. In this particular example, the relevant value of x is 1367, and it is noted that $P(1367,y)=0$ for all values of y except one. Let such value of y be 802. Thus, $P(1367,802)=1$. Then, 802 is converted into a 14-bit binary value, which works out to 00001100100010.

It is seen that the input bit segment had seven "1"s and the output bit segment only has four "1"s. This shows that the encoding mapping does not merely represent a permutation of the bits in the input bit segment. In fact, a given density of "1"s in the input bit segment may produce any given density of "1"s in the corresponding output bit segment, depending on the specifics of the encoding mapping.

Next, the encoding mapping is applied to decimal value 206. Let $P(206,y)=0$ for all values of y except 14332. Thus, the value of 14332 is obtained as the "column" index for "row" index 206. Then, the decimal value 14332 is converted into a 14-bit binary value, which amounts to 11011111111100. It is seen that there is again a difference in the density of the "1"s in the input bit segment and in the output bit segment. The bits in the output bit segments may then be concatenated in various ways and grouped again in, say, hex bytes, in this case yielding, from right to left, 22, 03, FF, AD.

The change in the bit pattern between a particular N-bit input bit segment and the corresponding N-bit output bit segment can be manifested, in a computer system, as a difference in voltage, current or other physical characteristics of the signal used to store and/or transmit the bit pattern in question.

As such, what has been described is a method of communication that uses a one-to-one mapping to encode individual sets of bits of an input bit stream into corresponding same-sized sets of bits of an output bit stream, wherein the relative proportion of ones and zeroes in a given set of bits of the input bit stream is often different from the relative proportion of ones and zeroes in the corresponding set of bits in the output bit stream.

More particularly, and with reference to FIG. 21, there is illustrated the situation where N=8. The relative proportion of ones and zeroes in an 8-bit input (or output segment) segment could range from 0:8, 1:7, 2:6, 3:5, 4:4, 5:3, 6:2, 7:1 and 8:0, corresponding to a "weight" of 0.000, 0.125, 0.250, 0.475, 0.500, 0.625, 0.750, 0.875 and 1.000. The number of combinations in each case is shown in the second column as 1, 8, 28, 56, 70, 56, 28, 8, 1, corresponding to a probability of 1/256, 8/256, etc. The total number of combinations is of course $2^8$=256. Given an arbitrary mapping, each input port is equally likely to map to any output port. As such, if one randomly selects an input-output pair, the chance of them having the same weight is:

the probability of the input segment having weight 0.000 multiplied the probability of the output segment having weight 0.000
+
the probability of the input segment having weight 0.125 multiplied the probability of the output segment having weight 0.125
+
Etc.

This results in a total probability of 0.077606, or 7.7606%, of an 8-bit input segment preserving its weight as it is mapped by a 256-by-256 mapping. Conversely, this means that at least 90% of the possible input segments will have a different proportion of ones and zeroes when one looks at the output segment to which it is mapped. In other words, when the size of the input and output segments is 8, at least 90% of the possible corresponding pairs of input and output segments will have different relative proportions of ones and zeroes between the input and output segments. Of course, when N is higher, differences will arise in an even greater percentage of cases. Clearly, the permutation mapping P does not merely result in a permutation of the 8 bits in the input segment. Rather, the permutation mapping is of a dimensionality greater than the size of the input and output segments. In particular, when the input and output segments are of size N, the permutation mapping P can be of a size $2^N$ by $2^N$, if not greater.

In a still further example, with the $2^N$-by-$2^N$ mapping stored in the memory, an ordered set of input bits is obtained. The processing entity 112 breaks down (disassembles) the ordered set of input bits into a plurality of N-bit input segments. Then, N-bit output segments corresponding to respective ones of the N-bit input segments are produced by: (i) expanding each of the N-bit input segments into a $2^N$-bit input segment, applying the $2^N$-by-$2^N$ mapping to the $2^N$-bit input segment to determine a $2^N$-bit output segment, compressing the $2^N$-bit output segment into an N-bit output segment. Then an ordered set of output bits is formed using the resulting N-bit output segments and the ordered set of output bits can be released onto a physical medium or stored in the memory.

Thus, the above has shown how N-bit input segments of an input message are converted into corresponding N-bit output segments of an output message using a $2^N$-by-$2^N$ one-to-one mapping stored in a non-transitory storage medium.

Data Decoding Process

The signal 140 travels along the channel 130 and reaches the receiving device 120. Certain pre-processing may be required to account for channel loss, distortion and other factors. Ultimately, however, the receiving device 120 executes a data decoding process that is virtually identical to the data encoding process performed by the sending device 110, except that it is performed with a decoding mapping rather than with an encoding mapping. The decoding mapping is the inverse of the encoding mapping so as to recover the originally encoded data.

Thus, for example, where the encoding mapping is represented by {P(x,y)}, the decoding mapping may be represented by {Q(x,y)}={$P^{-1}$(x,y)}={P(y,x)}. This can be referred to as a dequantropization process.

Alternatively, if the encoding mapping applied during the data encoding process is represented by a binary permutation matrix P, the decoding mapping to be applied during the data decoding process may be represented by Q=$P^T$ (the transpose of P). It is noted that due to the structure of P being a binary permutation matrix, $P^T$×P=I. In other words, if the N-bit input bit segment to the data encoding process was an "unencoded bit segment" (with the N-bit output bit segment resulting from application of P to the unencoded bit segment being an "encoded bit segment"), and if the N-bit input bit segment to the data decoding process is the encoded bit segment, and furthermore if the binary permutation matrix Q applied by the data decoding process is the transpose of P, then the N-bit output bit segment resulting from the data decoding process will be the original, unencoded bit segment. That is, the original N-bit input bit segments are recovered after the decoding process. They can then be assembled into a string of bits that can then be suitably resized (e.g., as bytes).

Due to the relationship between P and Q (i.e., Q=$P^T$), it follows that Q could be used in the data encoding process and P could be used in the data decoding process, since $Q^T$=P. Thus, overall, the encoding and decoding mappings may be represented as a pair of symmetric permutation matrixes P, Q, each being the transpose of the other, one of which is used in encoding and the other of which is used in decoding. Alternatively, the encoding and decoding mappings may be expressed as a single binary permutation matrix B together with additional an indicator (or "flag") being provided to the sending device 110 and the receiving device 120 to instruct one of the two devices to use B and the other to use $B^T$.

It is seen that both the data encoding and decoding processes do not significantly add to the computational burden of the processing entities 112, 122 in the sending and receiving devices 110, 120. This is due to the fact that the data encoding and decoding processes involve operations such as (i) index mapping from input index to output index or (ii) sparse vector-matrix multiplication, either of which may be efficiently handled by modern computer systems and processing entities. As such, CPU usage and energy costs of encoding and decoding may be kept low, potentially resulting in longer battery life, less latency and freeing up processing resources for other tasks. This contrasts with more complex numerical methods such as prime number factorization.

Figure 8:
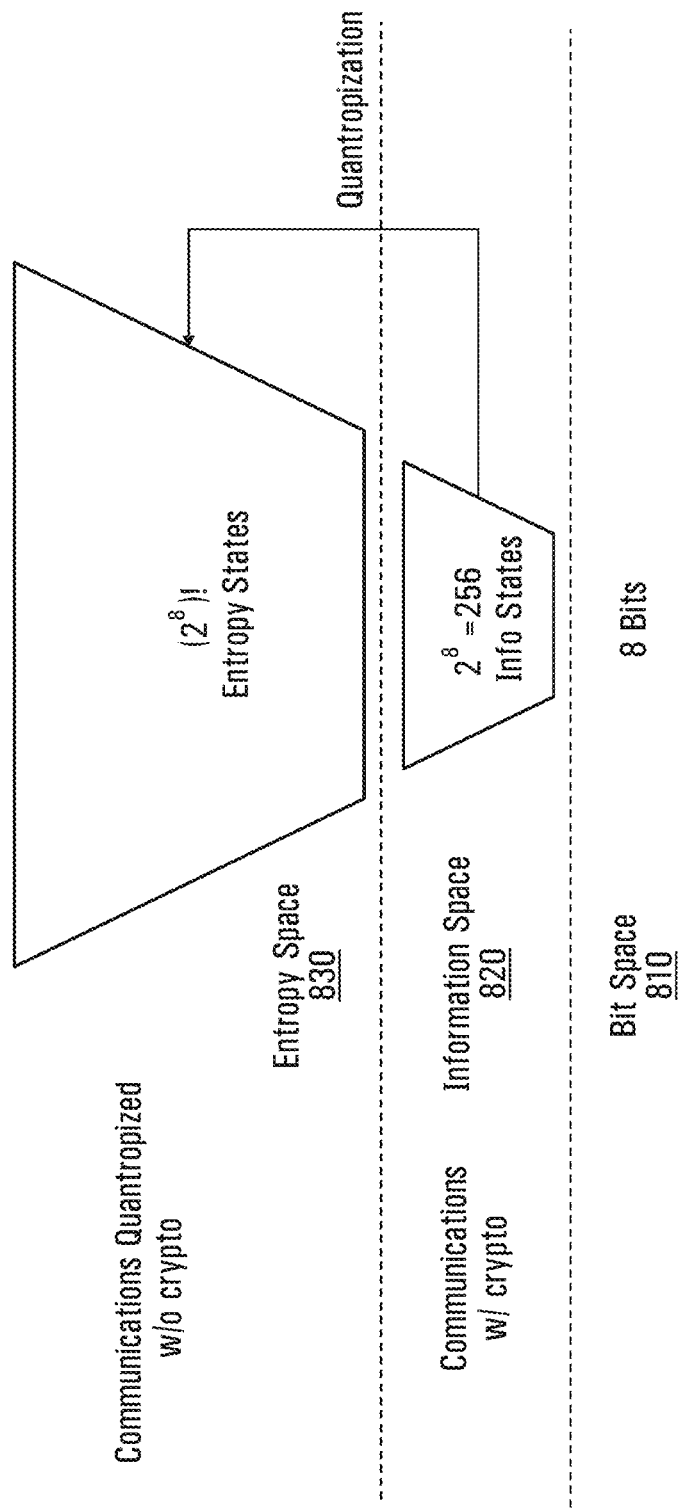
FIG. 8 schematically shows the relative size of memory space and entropy space.

With reference to FIG. 8, it is seen that for a given bit system size of N bits, each set of N original input bits can be said to reside in memory in a "bit space" 810 of size N.

The information carried by these N original input bits can be said to exist in an "information space" 820 of size $2^N$. That is to say, N bits can be used to express $2^N$ values or other information elements. Now, it is noted that the size of the corresponding encoding mapping (e.g., permutation matrix or switch fabric input-output correspondence table or look-up table) is $2^N$ by $2^N$. In other words, the dimensionality of the encoding mapping is $2^N$. This means that, if one represents the encoding mapping as a binary permutation matrix, there are $(2^N)!$ $(=2^N*((2^N)-1)*((2^N)-2)* \ldots *3*2*1)$ different possible permutation matrices, yet only one of them represents the selected encoding mapping being used by the sending device 110 for the particular set of N original input bits. An N-bit output bit segment produced through application of the selected encoding mapping can be said to exist in an "entropy space" 830 that is so vast that, from a practical perspective, encryption is no longer needed to guarantee security, even for relatively small values of N. The process of converting an N-bit input segment into an N-bit output segment using an encoding mapping may be referred to as "quantropization", and the inverse process may be referred to as "dequantropization". The input-output configuration of a particular $2^N$-by-$2^N$ encoding mapping used in quantropization can be referred to as an "entropy state", which can be represented in some non-limiting embodiments as a states array WI, although one may use a multitude of other ways to express the encoding mapping.

For example, even in just a 12-bit system, a malicious third party would need to guess which of the $2^{12}$ factorial possible permutation matrices was used (which is greater than $10^{13019}$). Furthermore, this assumes that the malicious party knows it is a 12-bit system to begin with, which knowledge might not be easily available to the malicious party. This may be considered a computationally intractable problem for many of today's systems, including quantum computers, and has the potential to dissuade malicious parties from trying to "hack" the system. As such, while each possible $2^N$ input bit stream does indeed map deterministically to a single $2^N$ output bit stream, this mapping does not arise from mere permutation of the bits in the input bit stream; rather it results from selection of an encoding mapping in a much larger space (i.e., the selection of one $2^N \times 2^N$ matrix in the space of $2^N \times 2^N$ matrices), which makes it more economical for a hacker to "guess" the N-bit value of the original input bit segment corresponding to an observed N-bit output bit segment, than to try to find the "correct" encoding mapping over any reasonable observation period. Since "guessing" by an outside party cannot be prevented even in a maximally secure system, one can conclude that by reducing a hacker's effectiveness to guessing, the level of data protection provided by the presently described embodiments is practically equivalent to the level of data protection provided by a maximally secure system, yet at a low computational cost.

This combination of low computational complexity, low latency and enhanced security against intrusion/hacking, provided by certain embodiments described herein, may help achieve high-bandwidth, real-time, quantum-secure communications.

Figure 9:
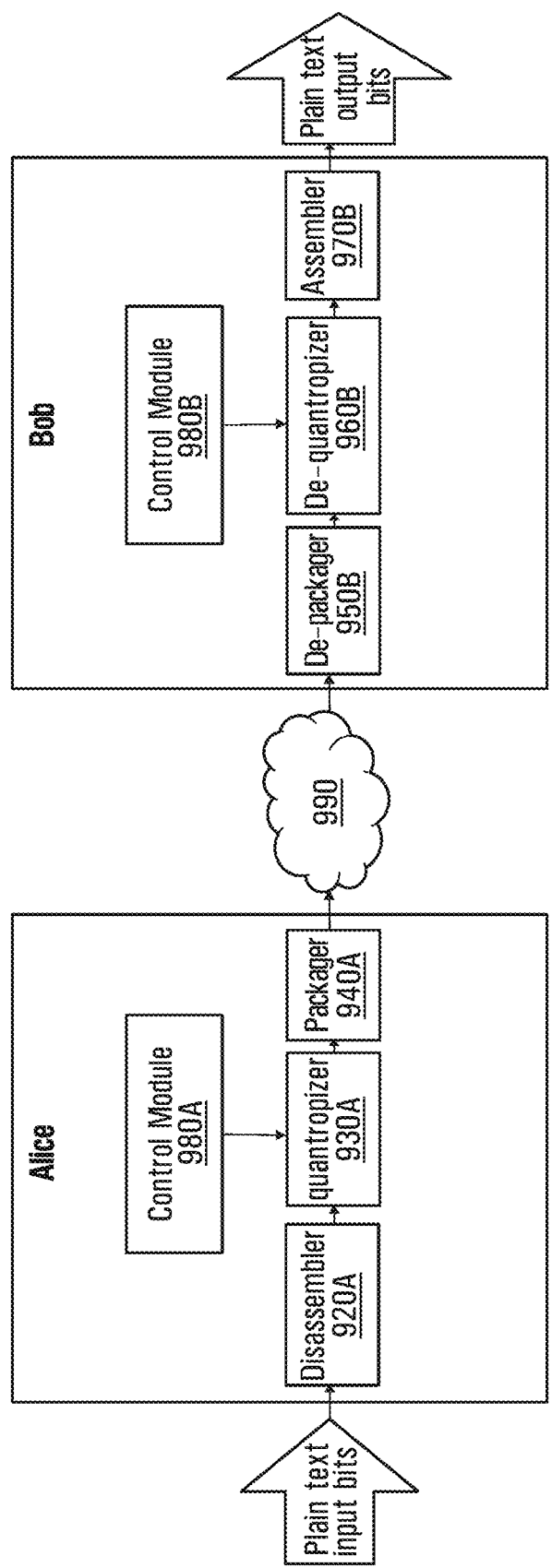
FIG. 9 is a block diagram showing communication from one peer to another over the Internet.

Another way to describe the above is with reference to the conceptual diagram of FIG. 9, which shows two peers, Alice and Bob, each of which can be a laptop, smartphone, Internet-enabled appliance, vehicle electronic control unit (ECU), web server, etc. Alice has the role of the "sending device" 110 of FIG. 1 and, through execution of the subset of instructions 116, implements a plurality of functional modules (e.g., a disassembler 920A, a quantropizer 930A, a packager 940A and a control module 980A), which will be described herein below. Similarly, Bob has the role of the "receiving device" 120 of FIG. 1 and, through execution of the subset of instructions 126, implements a plurality of functional modules (e.g., a depackager 950B, a dequantropizer 960B, an assembler 970B and a control module 980B), which will be described herein below.

Figure 2:
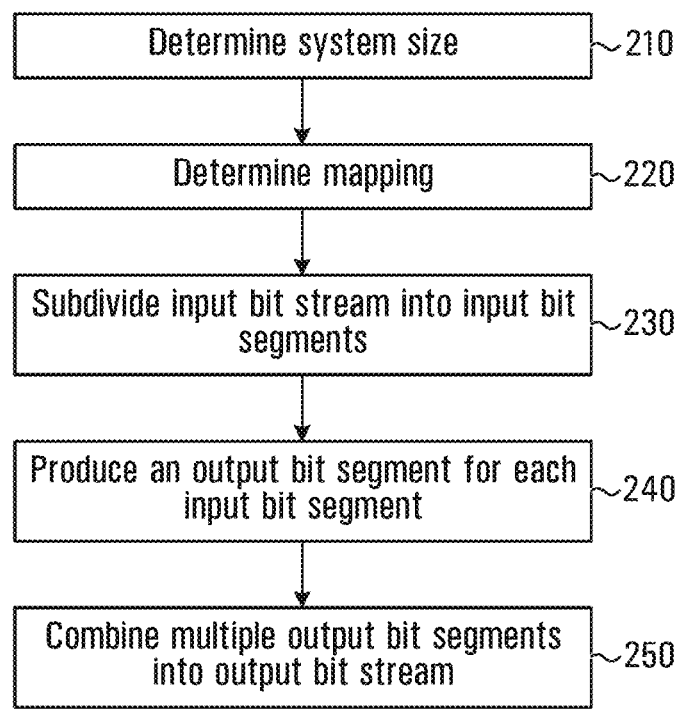
FIG. 2 is a flowchart showing steps in a data encoding process, in accordance with a non-limiting embodiment.

Specifically, Alice receives information segments (e.g., plain text input bits), which are then disassembled by the disassembler 920A into segments of a system size N (e.g., step 230 in FIG. 2). The N-bit input segments are processed by the quantropizer 930A into corresponding N-bit output segments according to an encoding mapping (e.g., a permutation matrix P) of size $2^N$ by $2^N$ (e.g., step 240 in FIG. 2). The resulting N-bit output segments are packaged into a suitable format by a packager 940A (e.g., step 250 in FIG. 2), which may group N-bit output segments together or break them down further before transmission to Bob over a network 990 (e.g., the Internet). Additionally, Bob includes the depackager 950B, which depackages the received quantropized data into N-bit input segments. The dequantropizer 960B applies the decoding mapping (e.g., $P^T$) to obtain N-bit output bit segments. These are then assembled into suitable information segments (e.g., plain text output bits) by the assembler 970B.

Thus far, it has been assumed that Alice and Bob use matching encoding and decoding mappings. In this regard, control module 980A is responsible for determining the encoding mapping (e.g., permutation matrix P) to be used by the corresponding quantopizer 930A (e.g., steps 210 and 220 in FIG. 2), whereas control module 980B is responsible for determining the decoding mapping (e.g., permutation matrix $P^T$) to be used by the corresponding dequantropizer 930B. How the control modules 980A, 980B determine and agree on the encoding and decoding mappings to be used for quantropization and dequantropization is now described in further detail.

Agreement on Encoding/Decoding Mapping Between Sending and Receiving Devices

Recalling that the Alice and Bob are mapped to FIG. 1 such that Alice is the sending device 110 and Bob is the receiving device 120, the permutation matrix P is used by the sending device 110 and the transpose of this matrix, namely $P^T$, is used by the receiving device 120. However, since $P^T$ is derivable from P, it is possible for both devices to be advised of just the permutation matrix P as well as to be advised of a flag (or other indicator) that tells the sending device 110 to use P in its data encoding process (i.e., without transposing it), and that tells the receiving device 120 to use $P^T$ in its data decoding process. Of course, the reverse is also possible (i.e., using $P^T$ in the data encoding process and P in the data decoding process).

In the case of the encoding mapping being represented by a set $\{P(x,y)\}$, the sending device 110 uses $\{P(x,y)\}$ and the receiving device 120 uses $\{P^{-1}(x,y)\}$. Again, since $\{P^{-1}(x,y)\}$ is derivable from $\{P(x,y)\}$ (as it equals to $\{P(y,x)\}$), it is possible for both devices to be advised of just the set $\{P(x,y)\}$ as well as to be advised of a flag (or other indicator) that tells the sending device 110 to use $\{P(x,y)\}$ in its data encoding process, and that tells the receiving device 120 to use $\{P(y,x)\}$ in its data decoding process. Of course, the reverse is also possible (i.e., using $\{P(y,x)\}$ in the data encoding process and $\{P(x,y)\}$ in the data decoding process).

The following sections describe various embodiments for informing the sending device 110 and the receiving device 120 of the appropriate encoding or decoding mapping to use.

For the sake of simplicity, the encoding mapping is represented by a binary permutation matrix P and the decoding mapping is represented by a binary permutation matrix $P^T$; however, lookup tables or the previously described sets {P(x,y), {P(y,x)} } could also have been used. Also, in each of the below embodiments, rather than transmitting the specific matrix (P or $P^T$) to be used by a particular recipient of the transmission, it is possible to include a common permutation matrix (P) in the transmission along with a flag or other indicator that specifies whether the intent is to transmit P or $P^T$ to the recipient.

First Initialization Method

Figure 6A:
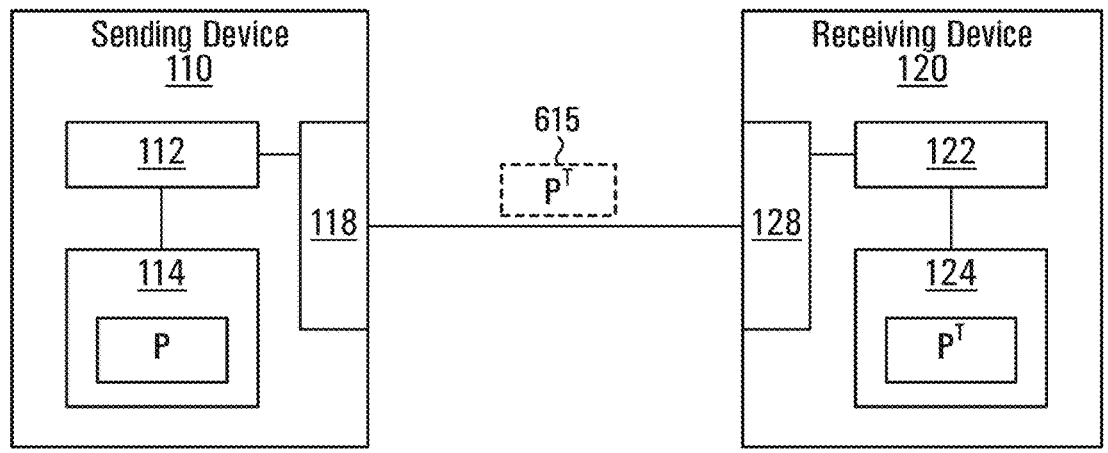
FIGS. 6A-6D are block diagrams showing distribution of the encoding and decoding mappings to the sending and receiving devices, respectively, in accordance with various non-limiting embodiments.

In one embodiment, shown in FIG. 6A, the sending device 110 generates the encoding mapping P and stores it in the memory 114. The sending device may send $P^T$ to the receiving device 120 in a signal 615 during an initialization phase. To this end, a handshaking protocol may be executed by the sending device 110 and the receiving device 120. This handshaking protocol may be securely implemented using current encryption technologies such as AES or DES. Alternatively, the handshaking protocol may be securely implemented using the techniques taught herein with a pre-defined system size M and default encoding (and decoding) mapping that is known and/or made available to the sending device 110 and the receiving device 120. For example, where M=3, the sending device 110 may use an 8×8 binary permutation matrix R for the purposes of encoding data that carries $P^T$, and the receiving device may use $R^T$ in its data decoding process for the purposes of recovering $P^T$ from the data encoded using R.

Thus, one embodiment of a data protection method could include encrypting the data indicative of the default mapping prior to sending it to the receiving device, e.g., using a private key of a private key/public key pair, where the private key being uniquely known to the sending device, and where the public key is known by or made available to the receiving device.

Second Initialization Method

Figure 6B:
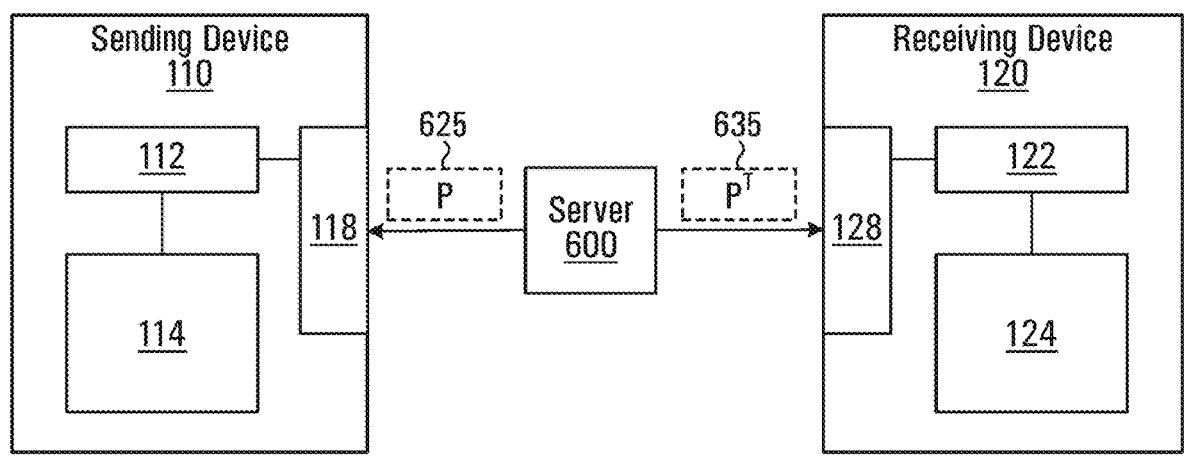

In another embodiment, shown in FIG. 6B, a central server 600 may securely communicate with the sending device 110 and/or the receiving device 120 in order to distribute the permutation matrix P during an initialization phase in signals 625 and 635. This secure communication may be implemented using current encryption technologies such as AES or DES, because it only requires the transmission of enough data to define a $2^N$-by-$2^N$ permutation matrix. Alternatively, the server 600 may communicate with each of the sending device 110 and the receiving device using the techniques taught herein with a pre-defined system size M and default encoding (and decoding) mapping that is a shared secret between the server 600 and the sending device 110, and between the server 600 and the receiving device 120 (it is noted that different shared secrets may be used by the server 600 when communicating with the sending device 100 and the receiving device 120 during the initialization phase). The central server 600 is equipped with a processor connected to a memory and an I/O, wherein the processor executes computer-readable instructions stored in the memory in order to perform the above specified functions.

Third Initialization Method

Figure 6C:
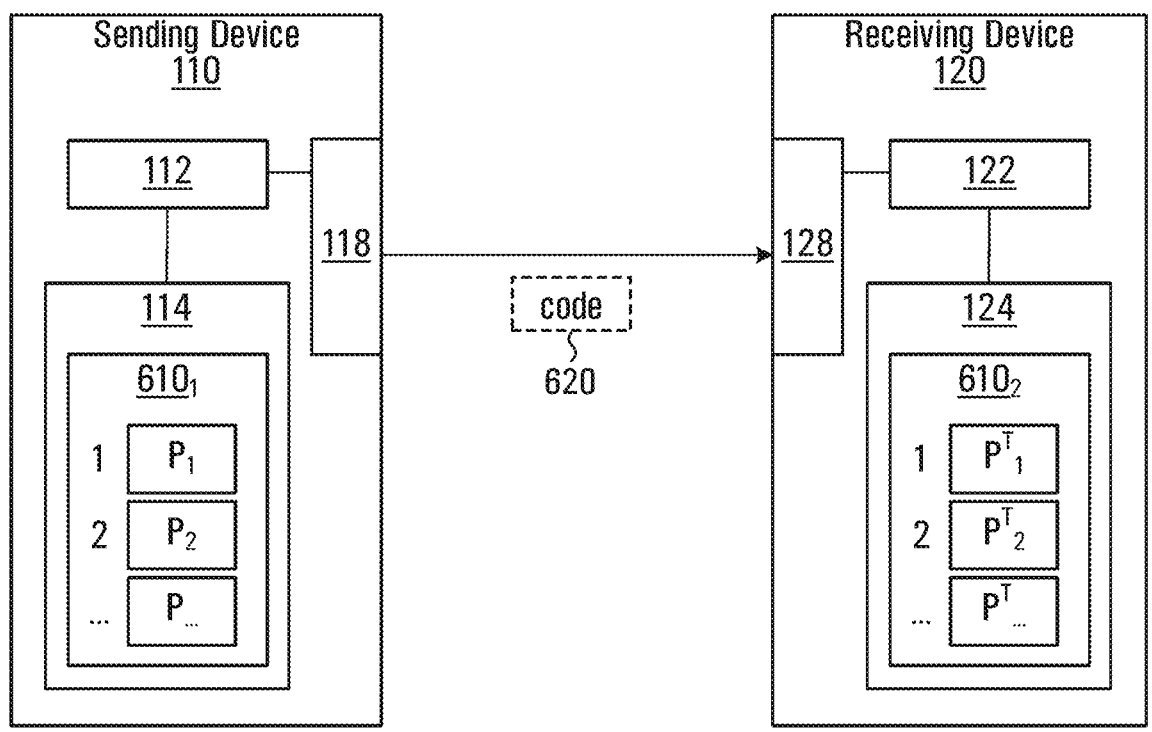

In another embodiment, shown in FIG. 6C, the sending device 110 and the receiving device 120 may each store a respective table 610 of pre-determined permutation matrices ($P_1$, $P_2$, . . . in the case of the sending device 110 and $P^T_1$, $P^T_2$, . . . in the case of the receiving device 120) that is securely installed in the respective memory 114, 124, with each permutation matrix in the table being referred to by a unique code (1, 2, . . . ). Thus, when the sending device 110 is using a particular permutation matrix in its data encoding process, rather than send the corresponding permutation matrix transpose to the receiving device 120, the sending device 110 may send a message 620 specifying the code corresponding to that permutation matrix in the table $610_2$ stored in the memory 124 at the receiving device 120. This allows the transmission between the sending device 110 and the receiving device 120 to be unencrypted (i.e., plaintext) because the code corresponding to one of the permutation matrices in the memory 124 is meaningless to an outside observer that does not have the table $610_2$. This embodiment only requires the tables $610_1$ and $610_2$ to be securely populated beforehand.

As an extension of the above embodiments, the sending device 110 and/or the receiving device 120 may choose to change the permutation matrix, or may be prompted to do so by an external party (e.g., a user, a central server). This can result the transmission of a new permutation matrix (appropriately protected or encrypted), or of a code corresponding to a new permutation matrix (which could be sent in plaintext). Alternatively, the order in which the permutation matrix changes can be programmed such that the mere request for a change in the permutation matrix may prompt the sending device 110 and the receiving device 120 to navigate ("hop") through its respective table $610_1$, $610_2$ of permutation matrices in a predefined way. Furthermore, there is no need for a subsequent permutation matrix to have the same system size. The system size may be specified as an independent variable, and there may be different levels of sophistication, such as different tables of permutation matrices for different system sizes, such that a code may be valid when received for different system sizes but would refer to different permutation matrices of different sizes, but known/made available to both parties due to their prior storage in the table of permutation matrixes.

After initial sharing the permutation between the sending device and receiving device, both sides can agree to form a session permutation matrix by using the encoding/decoding mechanism described in this document. Using the newly formed permutation matrix for a session data transmission can improve the data transmission security.

A change in session permutation matrix (which may involve a new system size) may be triggered by providing an indication to the sending device 110 and/or the receiving device 120. The indication may indicate a separation between N-bit input segments (and/or N-bit output segments) to be processed using the previous (old) permutation matrix and the N-bit input segments (and/or N-bit output segments) to be processed using the new permutation matrix. In one embodiment, the indication may specify the number of bits (or segments) to which a first permutation matrix applies before a change of permutation matrix (which may involve a new system size) is required. In another embodiment, the indication may signal an instantaneous change to a new system size or permutation matrix. In yet another embodiment, the indication may signal a time at which the sending device or the receiving device is to switch over to a new system size or permutation matrix. Also, the indication may provide a set of conditions which, when met, trigger a change in the permutation matrix, with the understanding that such conditions are being monitored by the sending and/or receiving devices 110, 120. An example of a condition is elapsed time, absolute time (e.g., change of day), number of bits processed, a detected hacking attempt, an interaction with a user through the I/O, etc. The indication may be controlled by the sending device 110 and transmitted from the sending device 110 to the receiving device 120, or it may be controlled by a server (e.g., central server 600) and send to both the sending device 110 and the receiving device 120. The indications may be encoded into a physical signal.

Fourth Initialization Method

Figure 6D:
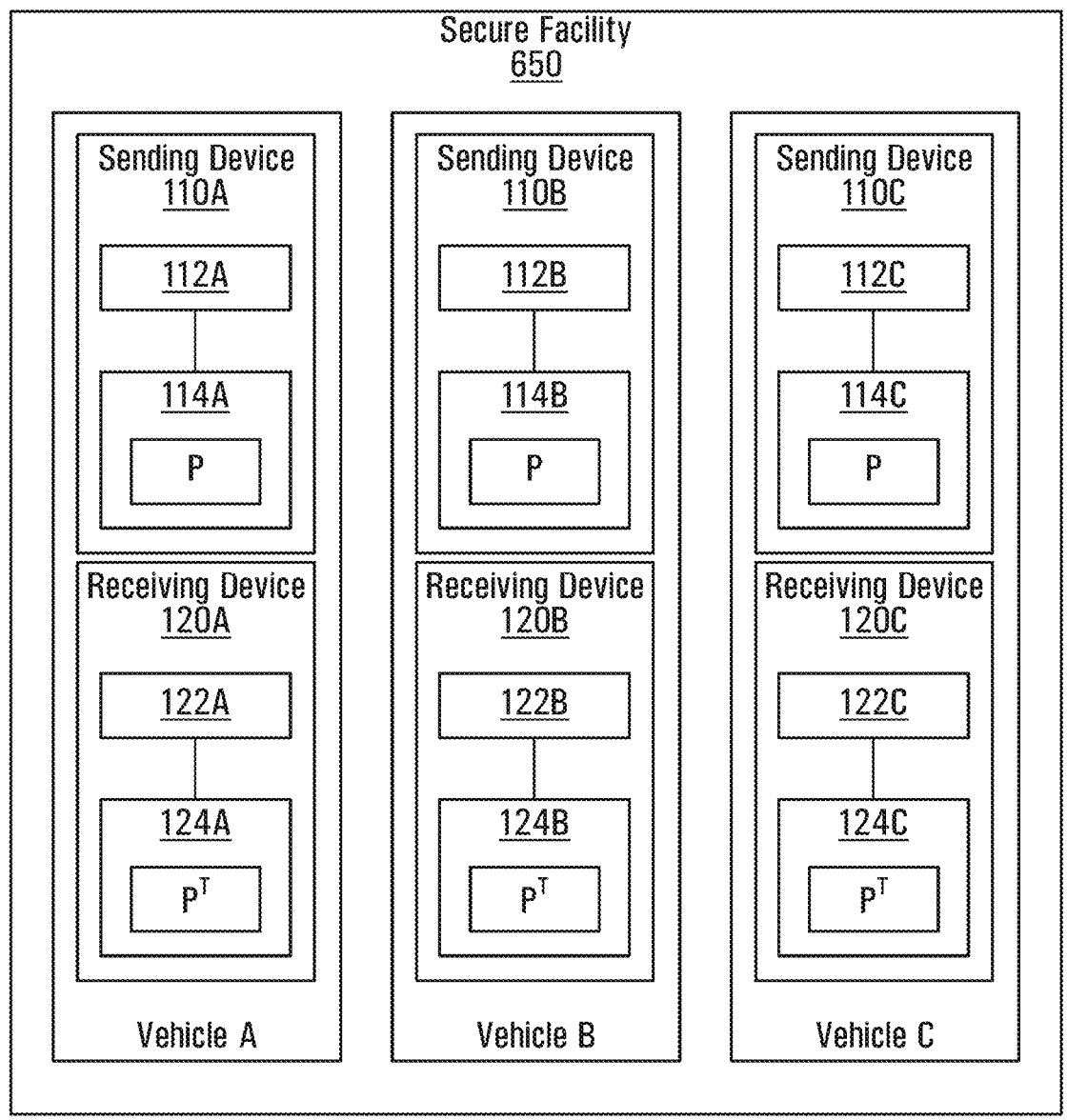

In another embodiment, shown in FIG. 6D, all sending devices and receiving devices that are susceptible of communicating with one another are produced in the same secure facility 650. Consider for example devices such as vehicles, satellites and smartphones that are produced in a secure plant. The vehicles, satellites, or smartphones (here illustrated as Vehicle A, Vehicle B and Vehicle C in a non-limiting example) can thus be provided with sending devices (110A, 110B, 110C, respectively) embedded with the same encoding mapping P and with receiving devices (120A, 120B, 120C, respective) embedded with the same decoding mapping $P^T$. In this way, Vehicle A, Vehicle B and Vehicle C can communicate amongst themselves (and/or with a central server at the secure facility 650 that is also aware of P and $P^T$), and this communication remains secure once Vehicle A, Vehicle B and Vehicle C have left the plant 650 and entered the marketplace. There is no need for any particular vehicle, satellite, or smartphone to perform handshaking, and there is no need for an initialization phase. Even in the case of a 12-bit system, the difficulty of hacking such a system is so extreme (as there are $2^{12}$ factorial $((2^{12})! > 1E+13019)$ possible permutation matrices) that it is envisaged that a single encoding mapping would provide adequate data protection throughout the life of the vehicles, satellites, or smartphones. The mapping may therefore be securely embedded in the memory of each of the devices in such a way that it prevents any external access or tampering.

Fifth Initialization Method

Figure 10:
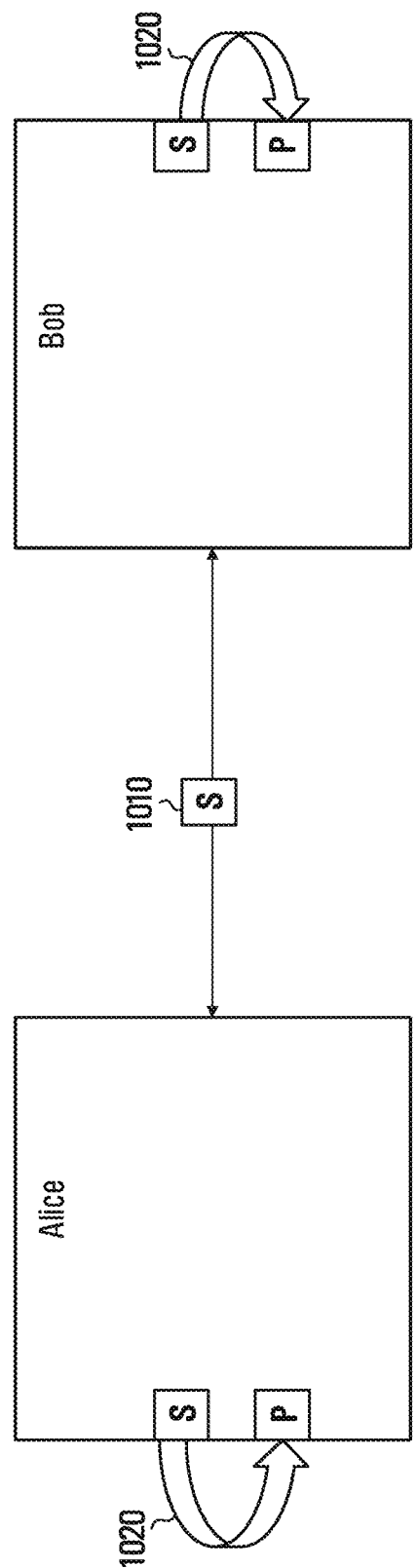
FIG. 10 is a schematic block diagram showing generation and exchange of an initial secret between two peers.

In another embodiment, the encoding mapping is locally generated based on an initial secret. This may follow the general process shown in FIG. 10 and outlined below:

Stage 1010: an initial secret S is shared between two peers (Alice and Bob).

Stage 1020: Each of Alice and Bob locally generates an initial encoding mapping (e.g., permutation matrix P) based on the initial secret S.

There are numerous ways of sharing of the initial secret S at Stage 1010. Three variants will now be described in greater detail.

Initial Secret Sharing (Variant 1 of Stage 1010)

Figure 11:
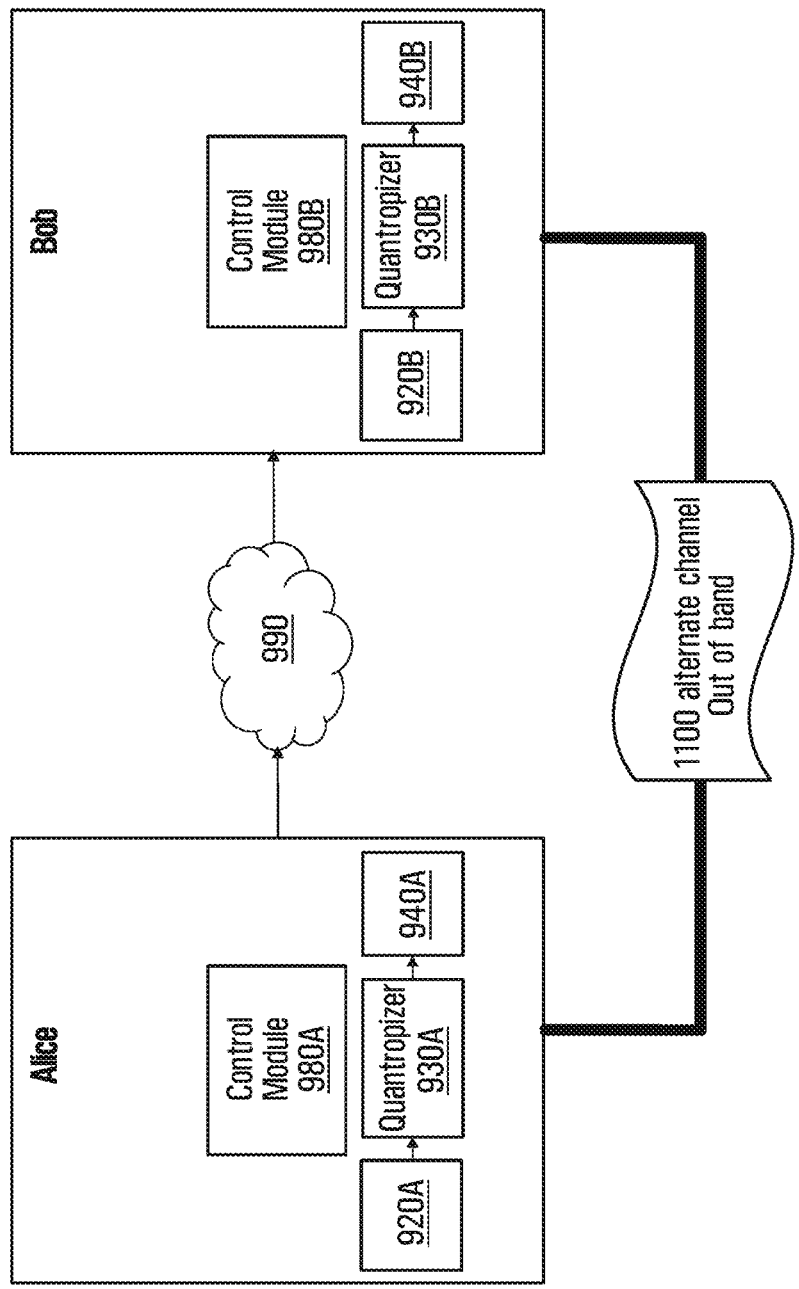
FIG. 11 is a bock diagram showing communication from one peer to another over the Internet and over an alternate channel.

Reference is made to FIG. 11, which is similar to FIG. 9 in that it shows two peers, Alice and Bob, communicating over the Internet 990. Alice implements a control module 980A and peer Bob includes a control module 980B. The control modules 980A, 980B are initialized and tuned so as to allow proper synchronization of the encoding mapping and decoding mapping being used by Alice and Bob. In the embodiment of FIG. 11, Alice has the ability to communicate with Bob not only over the Internet 990 but also over an alternate channel 1100. In an embodiment, the alternate channel 1100 is an out-of-band (OOB) channel, which is out-of-band in that it does not utilize the Internet 990. An example of an OOB channel 1100 may be a cellular link established over the public switched telephone network (PSTN), or an NFC link.

Figure 12:
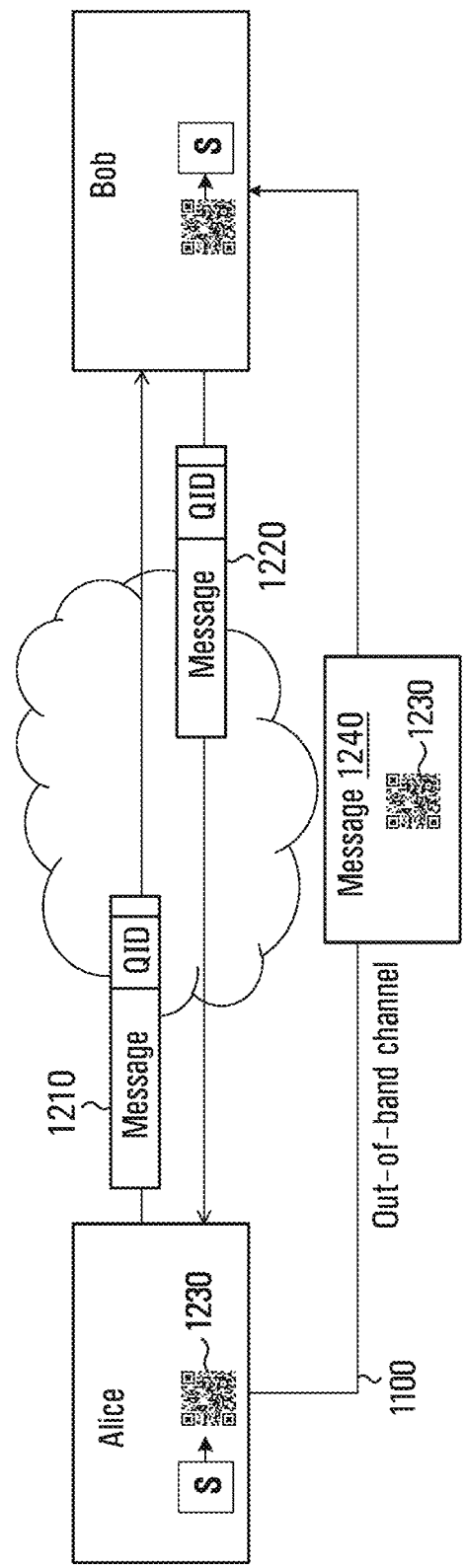
FIG. 12 is a block diagram further detailing the communication in FIG. 11, showing specific messages exchanged over the Internet and over the alternate channel.

To carry out Stage 1010 in the embodiment of FIG. 11, a process may be followed as now described with reference to the diagram in FIG. 12. The flow of operation is as follows:

(1) Firstly, Alice generates an identifier QID and sends a message 1210 containing the identifier QID to Bob.

(2) Next, Bob returns a message 1220 containing the identifier QID to Alice, as a form of acknowledgement.

(3) Then, Alice generates or obtains the initial secret S, which may but need not be a locally generated random number.

(4) Alice then generates a code 1230 (e.g., a QR code or hash code) from the identifier QID and the initial secret S.

(5) Next, Alice sends a message 1240 containing the code 1230 to Bob over the alternate/out-of-band channel 1100.

(6) Bob then receives the message 1240 and decodes the initial secret S from the code 1230 based on Bob's prior knowledge of the identifier QID.

At this point, Alice and Bob each have the initial secret S and can proceed to Stage 1020, which is described later on.

Initial Secret Sharing (Variant 2 of Stage 1010)

Figure 13:
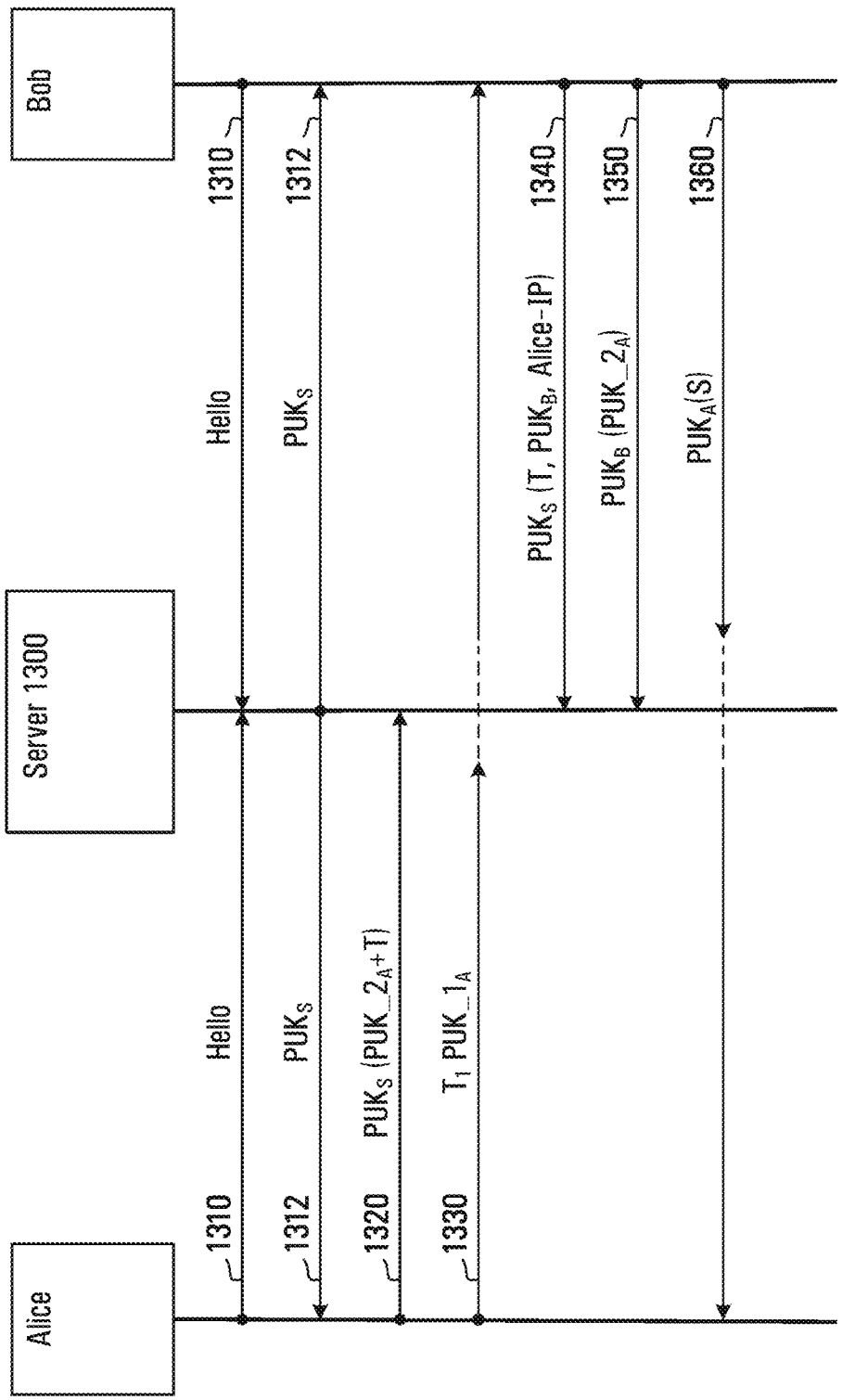
FIG. 13 is a message flow diagram showing a message exchange among two peers, Alice and Bob, and a server.

An alternate way of carrying out Stage 1010 (i.e., sharing of the initial secret S between Alice and Bob) will now be described with reference to the diagram in FIG. 13. This embodiment does not use an out-of-band channel between Alice and Bob, but rather uses three parties to achieve the initial secret sharing, namely Alice, Bob, and a network element 1300 (e.g., a server). The server 1300 has the ability to communicate with both Alice and Bob over the Internet 990. The flow of operation is as follows:

(1) Both Alice and Bob send a respective hello message 1310 to the server 1300 before they start to talk to one another. The server 1300 replies with a respective reply message 1312 containing the server's public key $PUK_E$ to Alice and Bob. It is noted that the server's public key $PUK_E$ is part of a public/private key pair and that the server 1300 is therefore imputed to know its own private key $PRK_S$;

(2a) Alice generates a token T and a public/private key pair ($PUK_A$, $PRK_A$), splits $PUK_A$ into two parts: $PUK\_1_A + PUK\_2_A$; uses the server's public key $PUK_E$ to encrypt $PUK\_2_A$ and the token T; then sends the result to the server 1300 in a message 1320;

(2b) The server 1300 decrypts the message 1320 with its private key $PRK_S$ and retrieves $PUK\_2_A$ and the token T, then records the token T, $PUK\_2_A$, and Alice's IP address Alice-IP. It is noted that token T is stored in a memory in association with Alice's IP address Alice-IP.

(2c) Alice then sends a message 1330 Sec-Req(T, $PUK\_1_A$) to Bob;

(3a) Bob receives T and $PUK\_1_A$ in the message 1330. Bob also generates a private/public key pair ($PUK_B$, $PRK_B$), which may be done before receiving the message 1330;

(3b) Bob encrypts token T, Bob's public key $PUK_B$ and Alice's IP address Alice-IP with the server's public key $PUK_S$ and sends the resulting encrypted message 1340 to the server 1300. The server 1300 decrypts the message 1340 with its private key $PRK_S$ and retrieves the token T, Bob's public key $PUK_B$, and Alice's IP address Alice-IP. The server 1300 then looks for token T and verifies that Alice's IP address Alice-IP is indeed the IP address associated with token T;

(3c) The server 1300 encrypts part 2 of the Alice's public key $PUK\_2_A$ with Bob's public key $PUK_B$ and sends back to Bob in a message 1350;

(3d) Bob decrypts the message 1350 with Bob's private key $PRK_B$ and retrieves $PUK\_2_A$; Bob assembles $PUK\_1_A$ and $PUK\_2_A$ to create the totality of Alice's public key $PUK_A$;

(4a) Bob generates an initial secret S and encrypts it with Alice's public key $PUK_A$.

(4b) Bob sends a message 1360 Sec-Resp(PUK$_A$(S)) back to Alice, containing the initial secret S encrypted with Alice's public key PUK$_A$ (that Bob was able to assemble at step (3d));

(5) Alice decrypts the message 1360 with Alice's private key PRK$_A$ and retrieves the secret S.

At this point, Alice and Bob each have the initial secret S and can proceed to Stage 1020, which is described later on.

Initial Secret Sharing (Variant 3 of Stage 1010)

Blockchains have generated interest in a variety of fields as a decentralized data storage mechanism with reliable redundant validation. An example application includes the exchange of cryptocurrencies (e.g., Bitcoins), which are transferred via transactions linked on a blockchain. Another example application includes the settlement of smart contracts, whereby rights and responsibilities of contracting parties are similarly transferred via transactions on a blockchain. In this embodiment, a blockchain is used by Alice to share the initial secret S with Bob.

Conceptually, a blockchain is a digital ledger in which transactions are recorded chronologically and publicly. From a technology point of view, and with reference to FIG. 18, a blockchain 1800 is a continuously growing list of records, called blocks 1810, which are linked and secured using cryptography. A "block" is a container data structure and lists one or more transactions 1820.

Participants to a transaction in a particular blockchain-enabled environment have an address, which is derivable from a participant's "public key" (e.g., by way of a hash function involving the public key and other information about the network). With continued reference to FIG. 18, a participant's public key 1830 is known to other participants in the blockchain-enabled environment. The participant also has a private key 1840, which is used to sign transactions. The participant's public key 1830 is used by such other participants to verify the signature of a received transaction. An algorithm, such as elliptic curve cryptography, can be used to generate one or more public keys from the private key. In one embodiment, such algorithm may involve converting the private key to a binary representation, identifying the bits in this binary representation that have a value of 1, and summing an exponentially multiplied generator variable to arrive at the final public key. While the process of public key generation is quite straightforward, reversing the process is computationally intense. The private key 1840 and the public key 1830 can be large integer numbers, but since these numbers can be very large, they tend to be represented using a separate format consisting of letters and numbers (e.g., Wallet Import Format (WIF)).

The private key and the one or more public keys may be stored by a "wallet". A wallet 1850 can be a software client of the blockchain-enabled environment that is associated with a given participant. The wallet 1850 can be implemented as computer-readable instructions carried out by a processor in a mobile phone or desktop computer, for example. In addition to storing the participant's private key 1840 and the one or more associated public keys 1830, the wallet 1850 may be configured to allow the participant to receive and send blocks in which transactions are listed.

Figure 18:
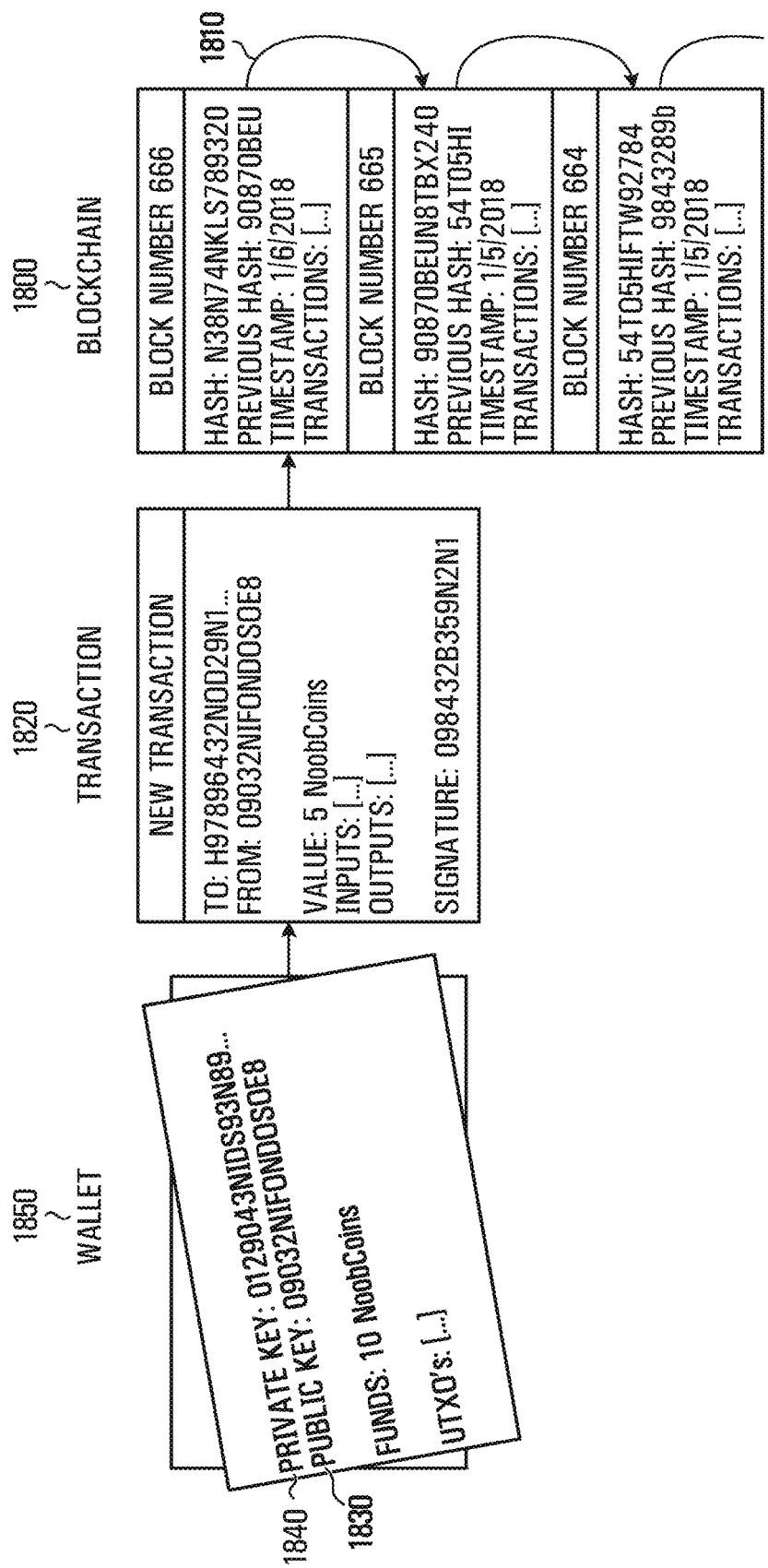
FIG. 18 is a schematic diagram that conceptually illustrates transactions in a blockchain.
Figure 19:
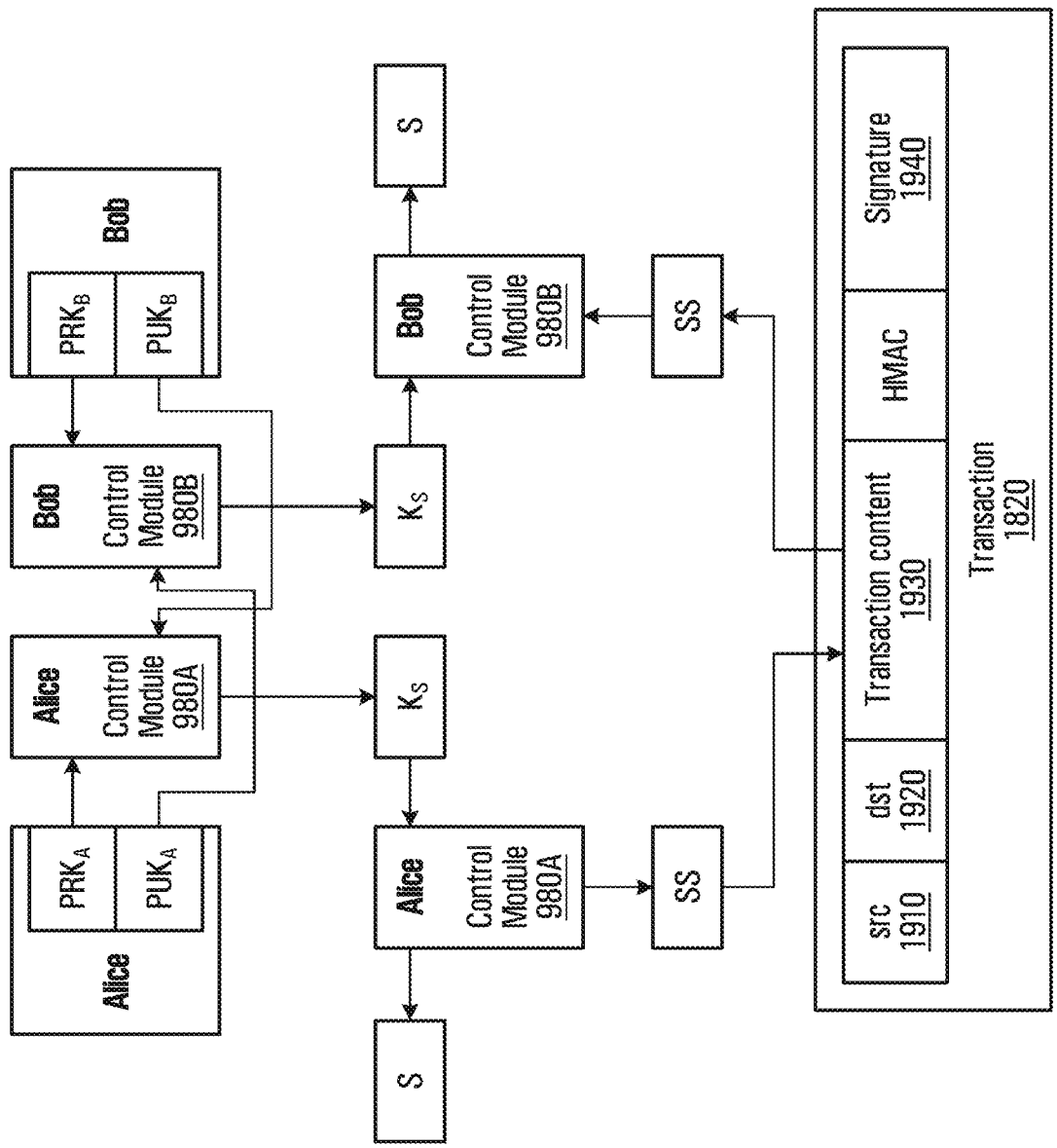
FIG. 19 is a schematic block diagram that illustrates a process of encoding an initial secret with a blockchain transaction as well as a process for retrieving the initial secret from the transaction.

With continued reference to FIG. 18 and with additional reference to FIG. 19, a transaction 1820 includes the sender's address 1910, a recipient's address 1920, transaction content 1930 and a signature 1940. The transaction content 1930 and the participant's private key 1840 are used to generate the signature 1940. A hash message authentication code (HMAC) can also be generated and inserted in the transaction 1820 to allow authenticity of the transaction content 1930 to be verified.

In this application of the blockchain to initial secret sharing, the transaction content 1930 is an encrypted version of the initial secret S. Specifically, once Alice has obtained the initial secret S and desires to share it with Bob, Alice's control module 980A first uses Alice's private key PRK$_A$ plus Bob's public key PUK$_B$ to generate a shared key K$_s$. The shared key K$_s$ has the special property of being derivable from both the combination of Alice's private key PRK$_A$ key plus Bob's public key PUK$_B$, and from the combination of Alice's public key PUK$_A$ key plus Bob's private key PRK$_B$. Control module 980A uses the shared key K$_s$ to encrypt the initial secret S (resulting in a "shared secret" SS) and creates a transaction on the blockchain. The transaction is from Alice and destined for Bob. When Bob detects the transaction from Alice, Bob's control module 980B uses Bob's private key PRK$_B$ plus Alice's public key PUK$_A$ to generate the same shared key K$_s$. Bob then uses this shared key K$_s$ to decrypt the initial secret S from the shared secret SS.

At this point, Alice and Bob each have the initial secret S and can proceed to Stage 1020, which is described herein below.

It should be noted that the initial secret S should have a certain minimum length. Generally speaking, the size of the initial secret S can be based on the system size N, and may correspond to $N*2^N$ bits. For example, in the case of N=10, the length of the initial secret "S" can be $10*2^{10}$=10,240 bits=1,280 bytes. However, this is not to be viewed as a limitation, as other lengths can be used.

The above three variants have described ways in which the initial secret S can be shared between Alice and Bob at Stage 1010 of the process for tuning the control modules 980A, 980B. Stage 1020 is now described in greater detail.

Specifically, each of Alice and Bob locally generates an initial encoding mapping (e.g., permutation matrix P) based on the initial secret S known to both parties. This can be further understood with reference to FIGS. 14A and 14B, where the control modules 980A, 980B are configured to generate the permutation matrix P (as well as its transpose $P^T$), by executing a process referred to as "EntroGen(*)" whose argument is, in this case, the initial secret S.

Figure 14B:
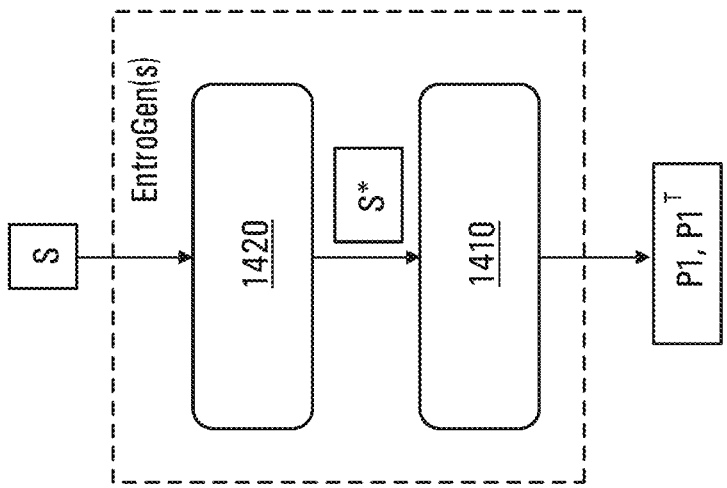
FIGS. 14A and 14B illustrate processes for generating permutation matrices from an initial secret.
Figure 14A:
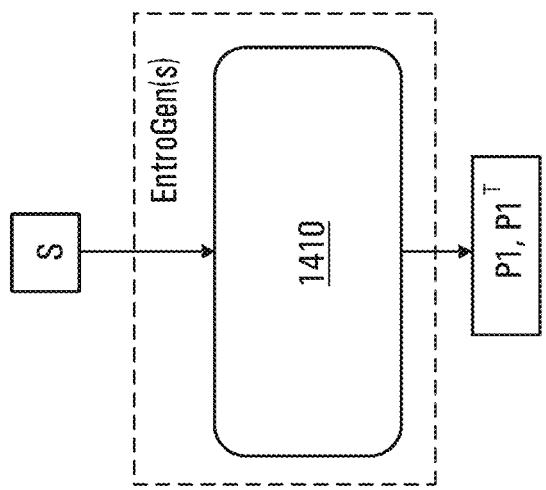

In FIG. 14A, the EntroGen(*) process implements an algorithm 1410 for generating P and $P^T$, which can take on many forms, such as an array shuffle algorithm, including the Key Scheduling Algorithm (KSA), Fisher-Yates Shuffle, etc., with information states from 0 to ($2^N$–1). In a non-limiting embodiment, $2^N$-by-$2^N$ permutation matrix P can be expressed by a "states array" $S[2^N]$.

Alternatively, and with reference to FIG. 14B, the EntroGen(*) process involves passing the initial secret S through a hash module 1420 in order to generate an intermediate secret S*, which is then processed by the appropriate (e.g., array shuffle) algorithm 1410. The hash module 1420 ensures that a small difference in S would produce a vastly different permutation matrix P.

Sixth Initialization Method

Figure 33A:
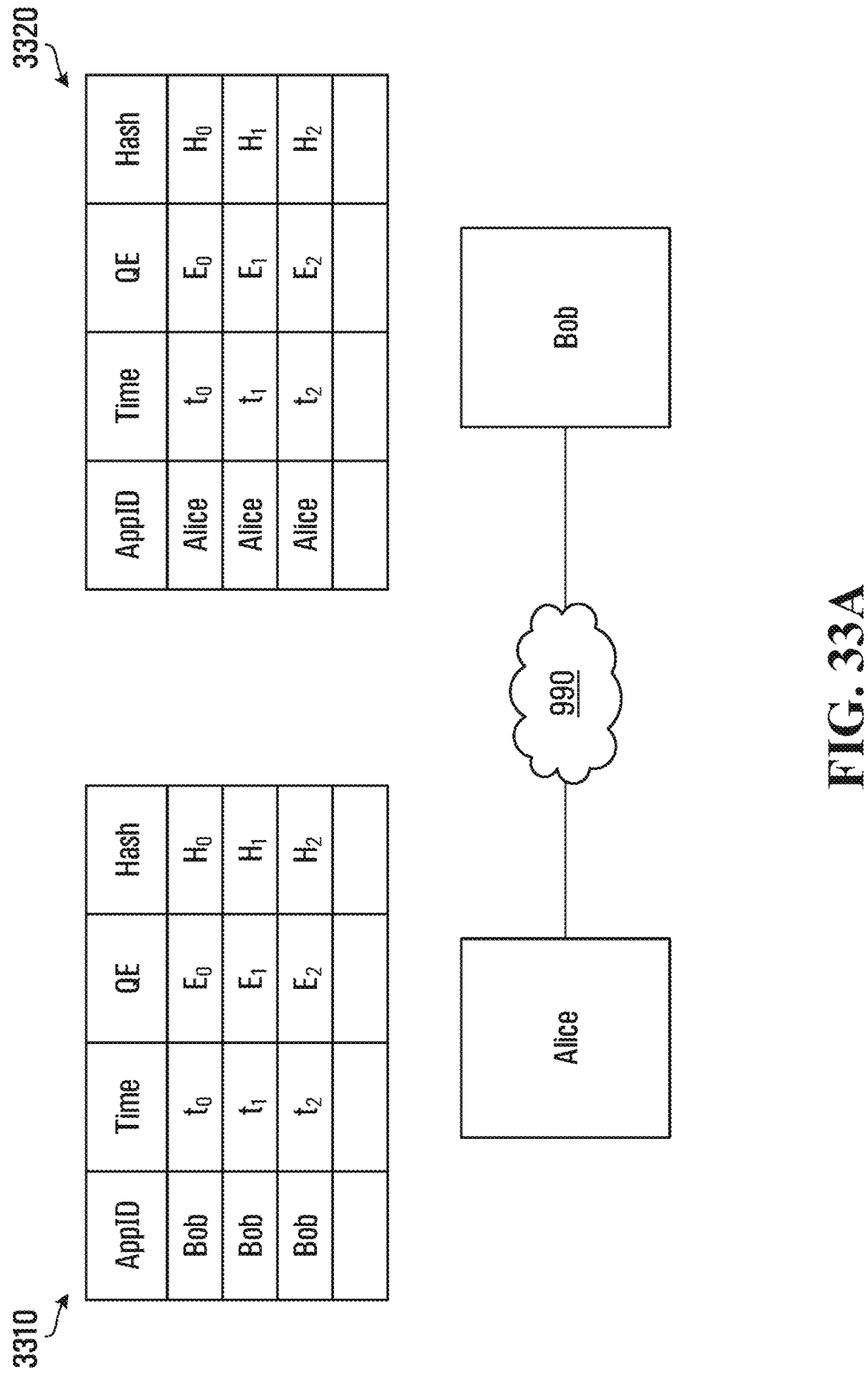
FIG. 33A is a block diagram of a communication system with the capability of building an Entropy History Table by two peers.

With reference to FIG. 33A, each of Alice and Bob maintains an "Entropy History Table" 3310, 3320 in the respective memory. The Entropy History Table keeps track of recently configured entropy "records". Each such entropy record includes a plurality of entries, including an ID of the peer associated with the record (under the "App ID" column, noting that this is not the identity of the peer where the Entropy History Table is stored, but rather the identity of another peer with which such peer communicates), a time indicator (e.g., time stamp or time frame or sequence number, under the "time" column), an entropy state (under the "QE" column) and a hash (under the "Hash" column). It is recalled that a given entropy state is uniquely associated with an encoding mapping/permutation matrix. As each entropy record is associated with a time frame or sequence value, it becomes possible to readily find a previous entropy state and configure the associated permutation matrix; this can be done by both Alice and Bob independently, if provided with of the same time indicator. It is noted that with each time indicator is associated an entropy state, and the entropy state associated with one time indicator is dependent on the entropy state associated with a previous time indicator. The hash is produced by passing the entropy state through a hash function, which may be a one-way function.

Figure 33B:
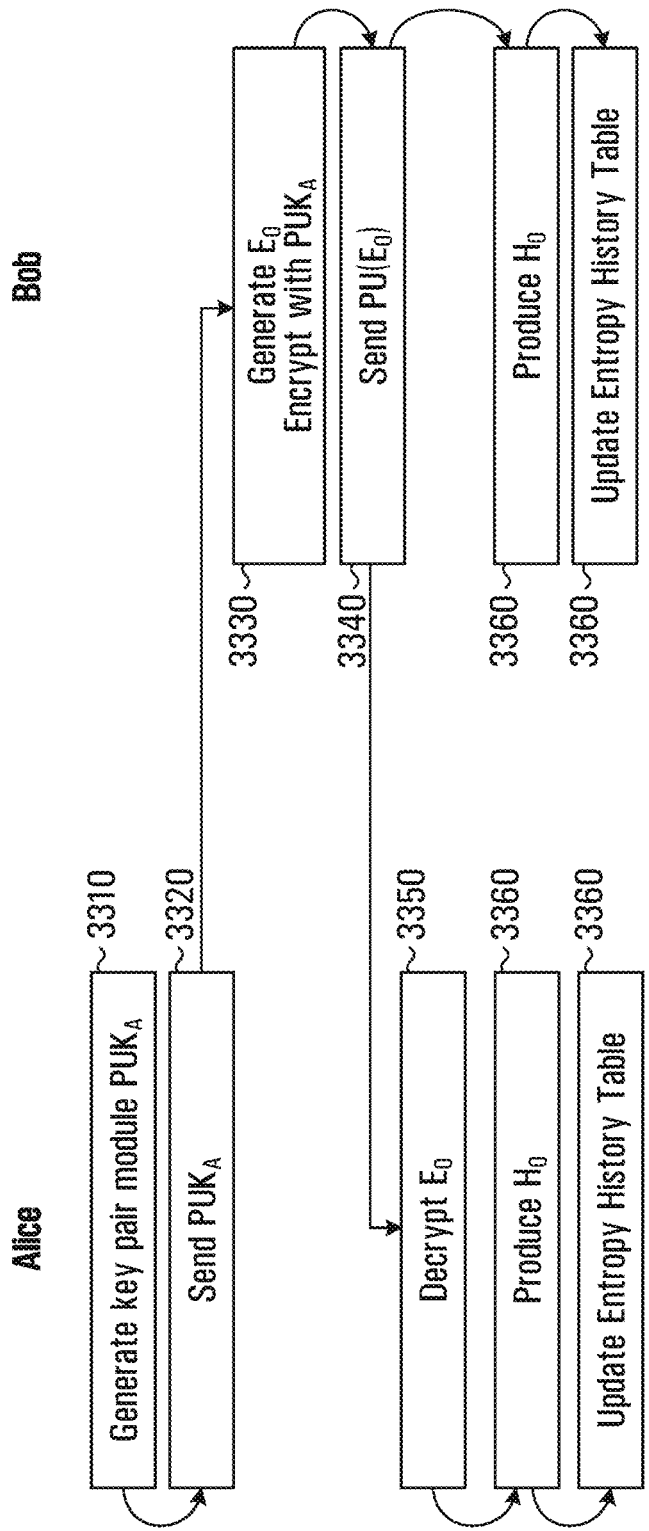
FIG. 33B is a flowchart illustrating a preliminary phase in the context of building an Entropy History Table by two peers.

In order to build the Entropy History Table, Alice and Bob participate in a two-phase exchange. The first phase is a preliminary phase. The second phase is an update phase. The preliminary phase is now described with reference to FIG. 33B and steps 3310 through 3370.

Step 3310: Alice generates a public-private key pair. Alice's public key is denoted $PUK_A$.

Step 3320: Alice sends Bob a message comprising Alice's public key $PUK_A$. This information may reach Bob via a third party, i.e., not necessarily directly sent to Bob by Alice.

Step 3330: Bob selects or generates an initial entropy state $E_0$ and encrypts it with Alice's public key $PUK_A$, which gives $PU(E_0)$. The initial entropy state $E_0$ may be represented by a states array $S_0[2^N]$.

Step 3340: Bob sends $PU(E_0)$, the encrypted version of the initial entropy state $E_0$, to Alice's ID. Step 3350: Alice decrypts the initial entropy state $E_0$ using the private key, which is known to Alice but not Bob. Both peers now share the initial entropy state $E_0$.

Step 3360: Alice and Bob produce the hash $H_0$ and update their Entropy History Table with $H_0$ and $E_0$ for the current time indicator $t_0$.

Step 3370: Alice and/or Bob set a trigger to trigger the update phase at a later time, possibly a random time in the future. In a non-limiting example, the trigger may be implemented as a timer.

At this point, Alice and Bob each have the initial entropy state $E_0$. The update phase is now described with reference to FIG. 34 and steps 3402 through 3432.

Step 3402: One of the triggers is set off. This could be Alice's trigger or Bob's trigger. Let it be assumed, for the purposes of the present discussion, that it is Alice's trigger that is received (e.g., a timer that expires first). This means that it is time to determine the entropy state for a new time indicator $t_1$ (denoted $E_1$) and the corresponding hash (to be denoted $H_1$).

Step 3404: Alice obtains the initial entropy state $E_0$ and the hash $H_0$ for the current time indicator $t_0$.

Step 3406: Alice obtains the encoding mapping P (and $P^T$) uniquely associated with the entropy state $E_0$.

Step 3408: Alice requests a random number, denoted g.

Step 3410: Alice creates a new entropy state $E_1$ from g and the current entropy state, which is the initial entropy state $E_0$. For example, this could involve an XOR operation such as $E_1$=g (XOR) $E_0$. Of course, this is merely an example and should not be viewed as a limitation, as many other operations are possible.

Step 3412: Alice generates hash $H_1$ from the new entropy state $E_1$ using a desired technique.

Step 3414: Alice updates its Entropy History Table with the new entropy state $E_0$ and the associated hash $H_0$ and for the new time indicator $t_1$.

Step 3416: Alice computes or otherwise obtains the quantropized version of g, namely P(g).

Step 3418: Alice sends the hash $H_0$ and P(g) to Bob. It is noted that g is quantropized and therefore P(g) can be sent in plaintext, although it is also feasible to encrypt it.

Step 3420: Bob receives the hash $H_0$ and P(g). Based on the hash $H_0$, Bob consults the Entropy History Table to find the corresponding entropy state $E_0$.

Step 3422: Bob obtains the encoding mapping P (and $P^T$) associated with entropy state $E_0$ obtained at step 3420.

Step 3424: Bob applies the decoding mapping $P^T$ to P(g). It is only in the case where Bob has the same Entropy History Table as Alice that this operation will give g. That is to say, if Bob does not have the same Entropy History Table, Bob may not find a match to the hash $H_0$, or if a match is somehow found, it will not correspond to entropy state $E_0$, which means that the result of Step 3422 will not result in $P^T$, but rather a different mapping that will not allow g to be extracted.

Step 3426: Bob creates a new entropy state $E_1$ from g and the current entropy state $E_0$ in the same manner as was done by Alice. For example, as previously described, this could involve an XOR operation such as $E_1$=g (XOR) $E_0$. Of course, this is merely an example and should not be viewed as a limitation, as many other types of operations are possible.

Step 3428: Bob generates the hash $H_1$ from the new entropy state $E_1$ using a desired technique.

Step 3430: Bob sends the hash $H_1$ and Bob's ID to Alice.

Step 3432: Alice receives the hash $H_1$ and recognizes Bob's ID and sees that Bob sent the expected hash $H_1$ for time indicator $t_1$.

Both sides are now considered to have their Entropy History Tables updated. A further trigger may be set and the update phase carried out again.

Another method to update the entropy the Entropy History Tables would be, after initial synchronization, to use the most recent entropy state (e.g., $E_x$) as a symmetric cryptographic key that encrypts the new entropy state (e.g., $E_{x+1}$).

From the foregoing, it will be noticed that each entropy state depends on the previous entropy state, which depends on the one before that. As such, a chain of entropy states is created, and each such entropy state $E_x$ defines an encoding mapping P. Moreover, as long as the peers agree on the time indicator, each peer will know which entropy state, and therefore which encoding mapping, to use.

Implementation Scenarios after Agreement on Encoding/Decoding Mapping Between Sending and Receiving Devices It should be appreciated that the aforementioned quantropization techniques for converting N-bit input segments into N-bit output segments using an encoding mapping associated with a particular "entropy state" may be used in various implementation scenarios, from transmitting a small amount of information such as a single encryption key, to transmitting a large amount of information such as real-time streaming application data, to locally generating an encryption key without transmission to the other party.

Figure 17A:
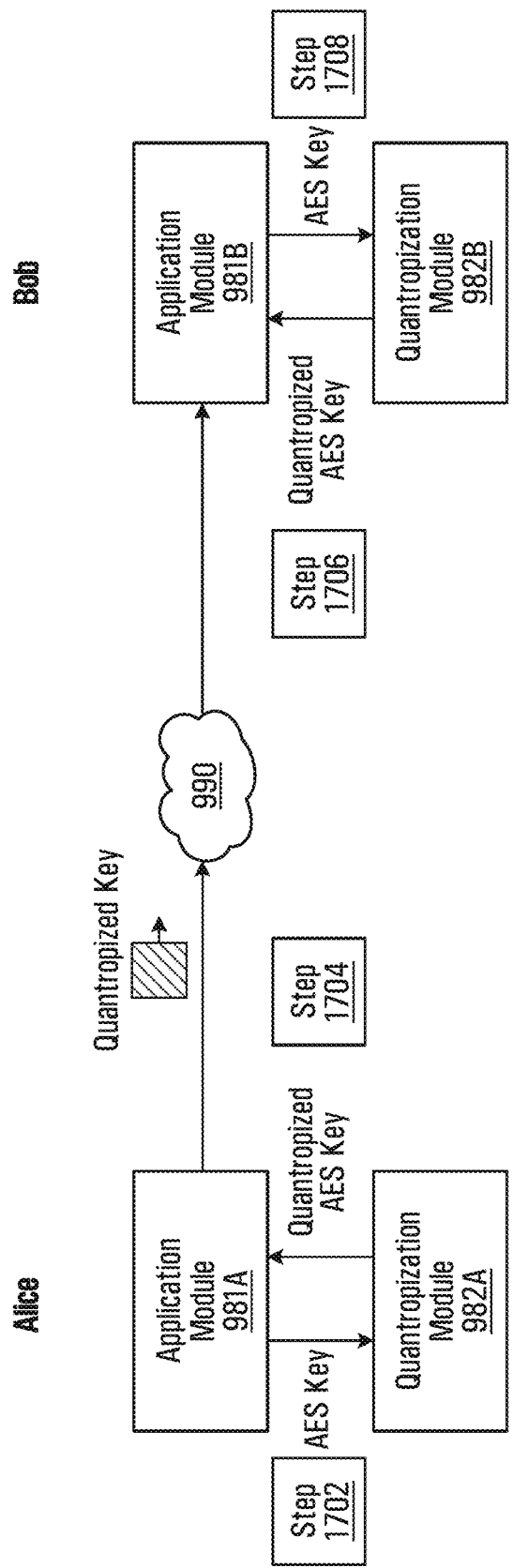
FIGS. 17A-17C are variants of communication between two peers.
Figure 17B:
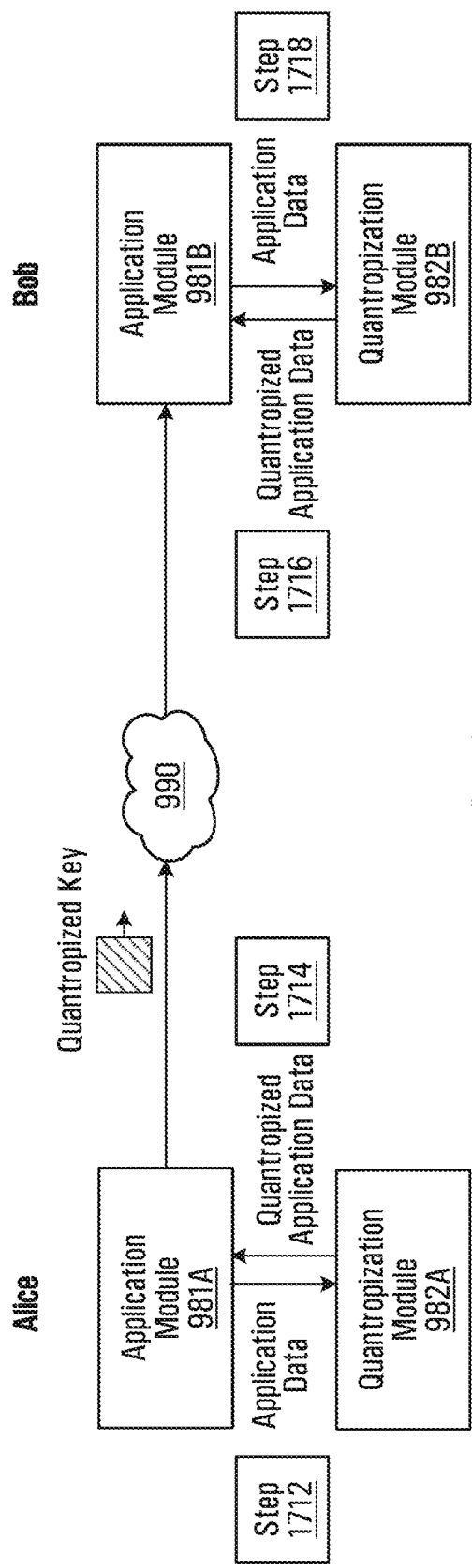
Figure 17C:
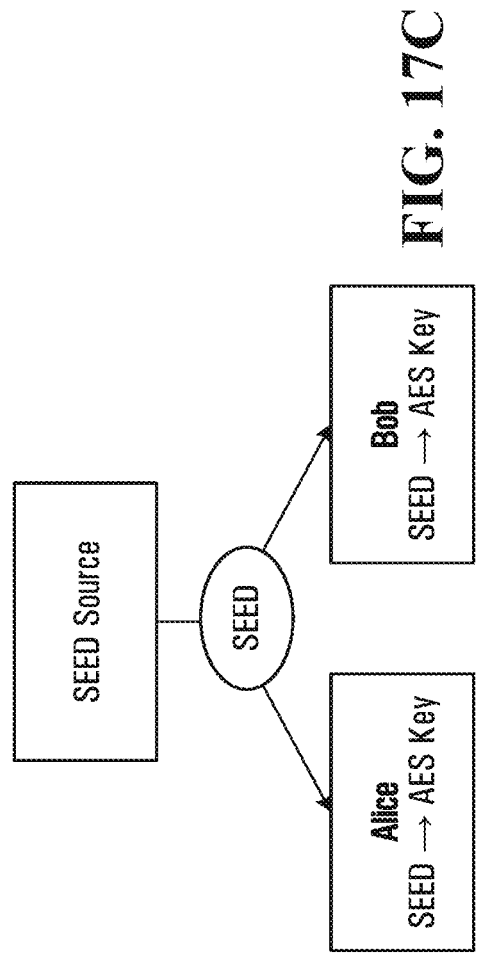

FIGS. 17A-17C conceptually illustrate various possible implementation scenarios related to the foregoing. In all implementation scenarios, Alice is equipped with a quantropization module 982A that includes the necessary functional modules related to quantropization (and dequantropization), as previously discussed. Similarly, Bob is equipped with quantropization module 982B that includes the necessary functional modules related to dequantropization (and quantropization). It is assumed that Alice and Bob have reached agreement as to which encoding and decoding mapping to use; this can be achieved according to any of the aforementioned initialization methods (including maintaining an Entropy History Table and agreeing on the current time indicator). Also, optionally, Alice may be equipped with an application module 981A and Bob may be equipped with an application module 981B. The application modules 981A and 981B communicate "application data" such as a message between two users.

First Implementation Scenario: Encoding Mapping Used by Alice to Encode an Encryption Key for Transmission to Bob With reference to FIG. 17A, Alice's application module 981A communicates application data with Bob's application module 981B using, e.g., a conventional encryption scheme. An example of such an encryption scheme can be the Advanced Encryption Standard (AES), which may be considered secure if a sufficiently long encryption key is used; however, the issue becomes how to make Alice and Bob aware of the same encryption key without exposing this encryption key to a security risk.

To this end, Alice's application module 981A determines the desired encryption key, invokes Alice's quantropization module 982A at step 1702. The quantropization module 982A applies the encoding mapping to the encryption key to produce a quantropized key and returns it to the application module 981A at step 1704. Alice's application module 981A then sends the quantropized key to Bob's application module 981B over the network 990. Bob's application module 981B then invokes Bob's quantropization module 982B with the quantropized key (step 1706), which dequantropizes the quantropized key (using the decoding mapping) so as to obtain the original encryption key and returns it to the application module 981B (step 1708). From this point on, the application modules 981A and 981B can use the encryption key (which has been securely transmitted from Alice to Bob) to encrypt application data using AES, TLS (Transport Layer Security), SSL (Secure Sockets Layer) or any other suitable cryptographic protocol. While this description has dealt with a key being sent from Alice to Bob, the opposite could be true as well.

Second Implementation Scenario: Encoding Mapping Used by Alice to Encode Application Data for Transmission to Bob With reference to FIG. 17B, Alice's application module 981A sends application data to Alice's quantropization module 982A (step 1712). Alice's quantropization module 982A quantropizes the application data (using the encoding mapping) and returns quantropized data back to Alice's application module 981A (step 1714), which sends the quantropized data to Bob's application module 981B over the network 990. Upon receipt of the quantropized data, Bob's application module 981B sends it to Bob's quantropization module 982B for dequantropization (step 1716). Quantropization module 982B dequantropizes the application data (using the decoding mapping) and returns the original data to Bob's application module 981B (step 1718), where it is interpreted and processed.

In a variant of the second implementation scenario, instead of Alice's application module 981A receiving quantropized application data returned to it from quantropization module 982A and forwarding it to Bob's application module 981B, Alice's quantropization module 982A could send the quantropized application data directly to Bob's quantropization module 982B over the network 990.

Third Implementation Scenario: Encoding Mapping Used by Alice and Bob to Individually Generate Identical Encryption Keys With reference to FIG. 17C, Alice's application module 981A communicates application data with Bob's application module 981B using, e.g., a conventional encryption scheme. An example of such an encryption scheme can be the Advanced Encryption Standard (AES), which may be considered secure if a sufficiently long encryption key is used; however, the issue becomes how to make Alice and Bob aware of the same encryption key without exposing this encryption key to a security risk.

In this particular implementation scenario, the encryption key is not transmitted from Alice to Bob. Rather, Alice and Bob locally generate the encryption key based on the encoding mapping (e.g., permutation matrix P) of which they are both aware.

Specifically, this process of locally generating the encryption key may be described with reference to the following stages:

Stage 1030: Each of Alice and Bob obtains a common seed from a seed source. The seed may be a randomly generated quantity.

Stage 1040: Each of Alice and Bob creates an encryption key using the encoding mapping (e.g., permutation matrix P) and the seed.

Stage 1050: Alice and Bob are now ready to encrypt their communications using the encryption key.

Figure 15:
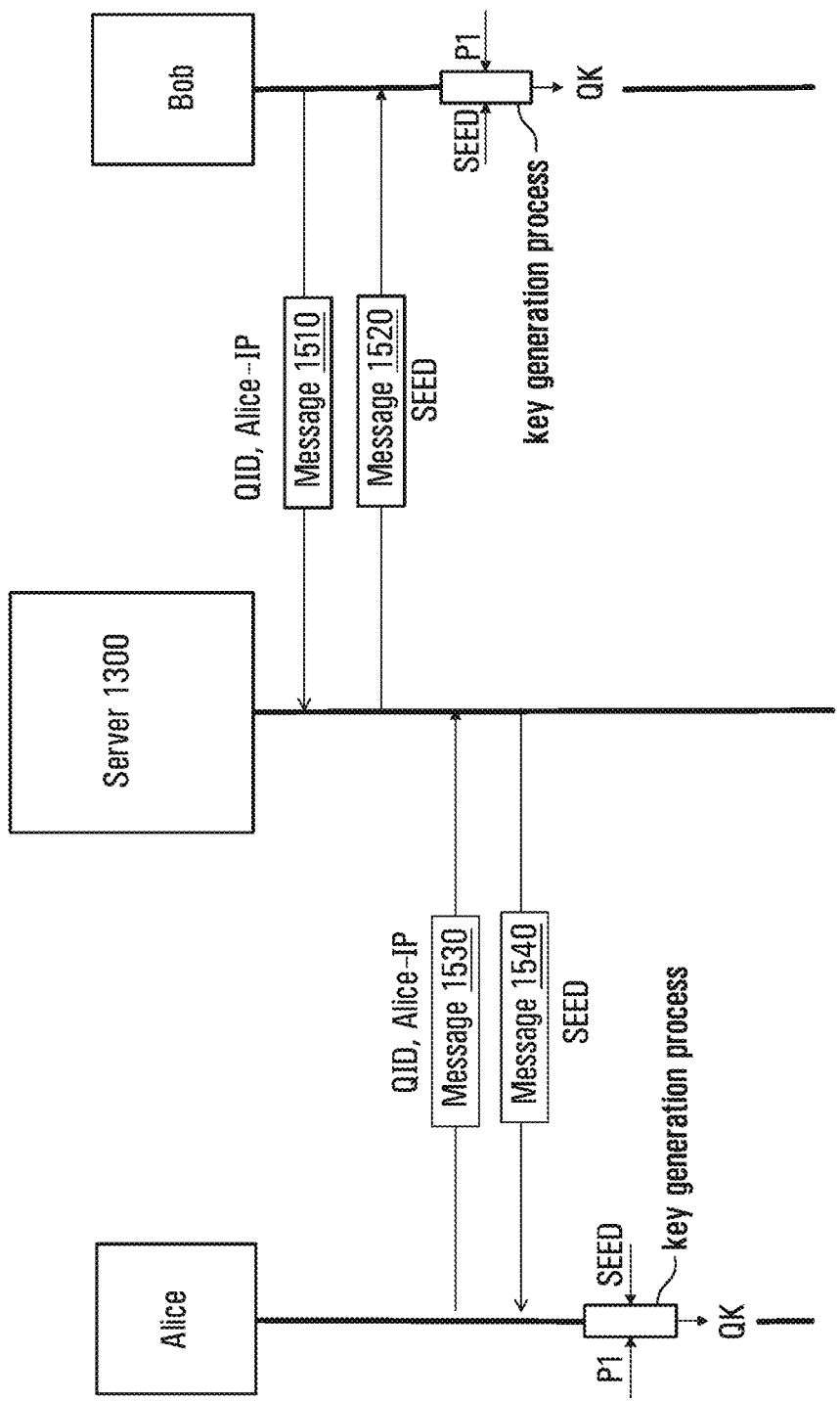
FIG. 15 is a message flow diagram showing a message exchange among two peers, Alice and Bob, and a server that issues seeds, resulting in Alice and Bob both having access to an encryption key QK.
Figure 16:
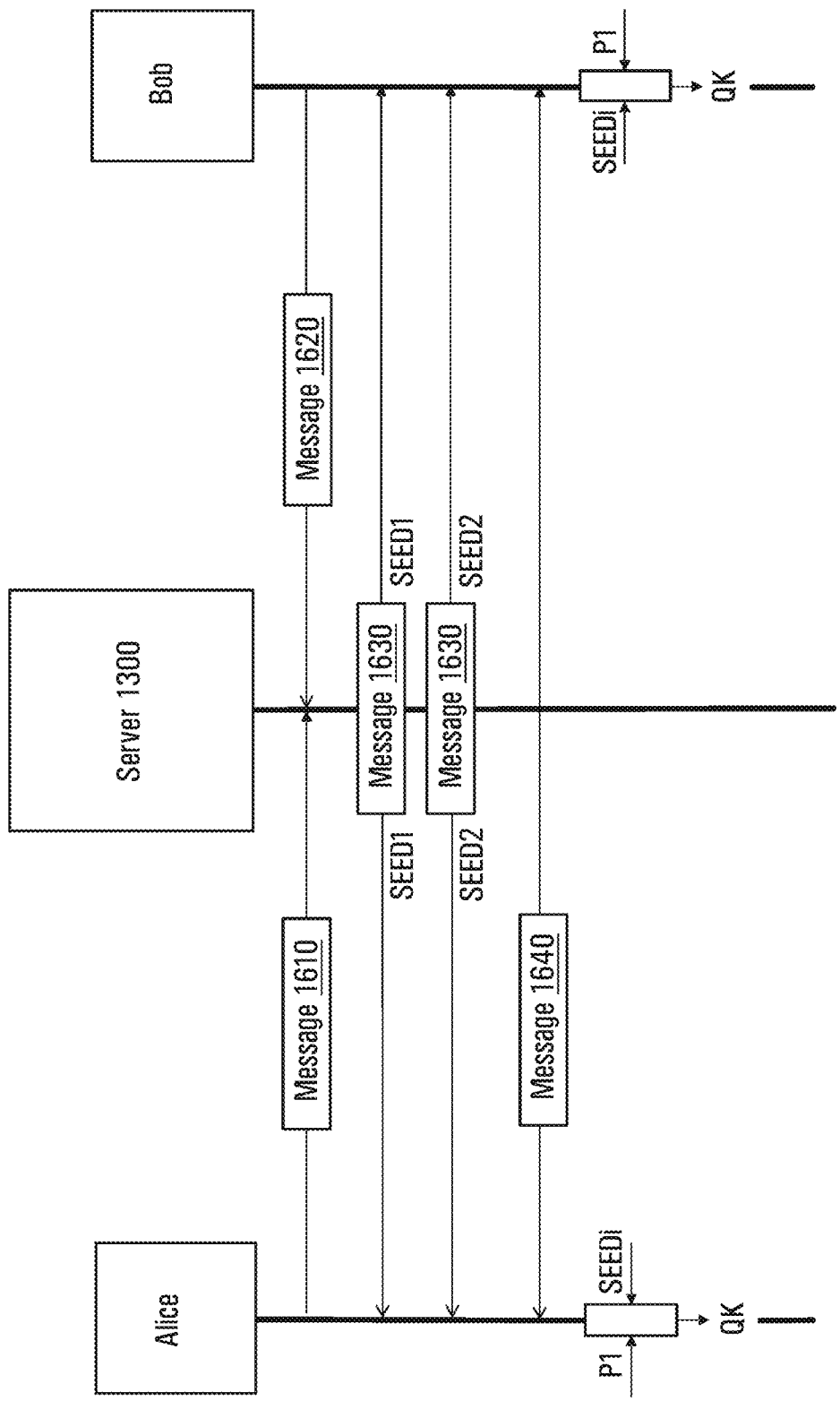
FIG. 16 is a variant of FIG. 15, in which the seeds are broadcast by the server.

The aforementioned stages are now described in the context of two possible variants, having regard to FIGS. 15 and 16. Shown in both of these figures is the server 1300, which may have the ability to generate random numbers and to communicate with both Alice and Bob over the Internet 990.

The first variant, shown in FIG. 15, is referred to as the request-response variant. It is assumed that Bob wants to establish communication with Alice. The flow of operation is as follows (it is understood that control modules 980A and 980B within Alice and Bob are configured to carry out these actions):

(7a) Bob sends a message 1510 requesting a seed from the server 1300. The message 1510 specifies Alice's client identifier (denoted QID), Alice's IP address (denoted Alice-IP), and other information such as a number of bytes.

(7b) The server 1300 generates a seed (denoted SEED). The seed SEED may be generated by a truly random quantum process at the server 1300. The server 1300 records Alice's client identifier QID and Alice's IP address Alice-IP in association with the seed SEED. The server 1300 responds to Bob with a message 1520 containing the seed SEED for communicating with Alice.

(8) Bob receives the message 1520 containing the seed SEED and implements a key generation process to generate an encryption key (denoted QK) using, as inputs, the seed SEED and the permutation matrix P (which was obtained previously). For example, the seed SEED can be treated as an information input of a matrix multiplication with the permutation matrix P. The output will then be the encryption key QK. Due to the feature of randomness of the seed SEED, so the resulting encryption key QK is also random.

(9a) Alice sends a message 1530 requesting a seed from the server 1300. The message 1530 specifies Alice's client identifier QID, Alice's IP address Alice-IP, and other information such as a number of bytes.

(9b) The server 1300 consults its records (e.g., in memory) and verifies whether Alice's IP address Alice-IP matches the address that Bob had indicated (in message 1510) should be associated with Alice's identifier QID for this session. If there is a match, the server 1300 responds with a message 1540 containing the previously generated seed SEED; if there is no match, the server 1300 may respond with a warning message (not shown) and/or Alice's request is rejected.

(9c) Alice receives the message 1540 containing the seed SEED and generates the same encryption key QK as was generated by Bob, using, as inputs to the key generation process, the seed SEED and the permutation matrix P.

At this point, Alice and Bob have possession of the encryption key QK. This process of transforming a seed (such as SEED) into an encryption key (such as QK) using a permutation matrix (such as P) can be repeated on-demand during the course of secure communications.

It should be noted that the messages 1520 and 1540 containing the seed SEED do not need to be transmitted with utmost security (e.g., they can even be transmitted in plaintext), which reduces the complexity of key distribution. In other words, if a third party obtains knowledge the seed SEED, this does not allow the third party to obtain the encryption key QK. This makes distribution of the encryption key QK feasible and secure for today's internet needs, while avoiding the physical constraints of traditional quantum key distribution.

The second variant of Stages 1030-1050, shown in FIG. 16, is referred to as a "broadcast" variant. As such, in this variant, the server 1300 may be a broadcast server for true quantum random seeds. The flow of operation is as follows:

(7a) Alice sends a message 1610 to the server 1300 indicating its desire or intention to listen for seeds. Bob sends a similar such message 1620.

(7b) Both Alice and Bob listen for seeds from the server 1300. At some point, the server 1300 issues broadcast messages 1630 containing seeds SEED1, SEED2, etc. An example format of a message containing a seed may be: 4 bytes of seedID/timestamp, 1K bytes of seed, in addition to a signature so a receiver can verify the integrity of the seed. Other formats are of course possible.

(7c) Alice and Bob each receive various ones of the broadcast messages 1620, and store the seeds SEED1, SEED2, etc. contained in such messages.

(8a) Alice communicates with Bob (message flow 1640) to agree on which seedID/timestamp to used. The use of a timestamp or seedID is to avoid having to exchange the actual seeds.

(8b) Alice and Bob each generate the encryption key QK using, as inputs to the key generation process, the agreed-upon seed and the permutation matrix P or its transpose.

It will be appreciated that at this point, Alice and Bob have possession of the encryption key QK.

Having thus completed Stages 1030-1050 (by way of either the first or second variant, for example), Alice and Bob have possession of the encryption key QK. This key cannot be easily determined by a malicious third party, even if the seed used to generate the encryption key QK is intercepted. This is because the encryption key QK is generated using the permutation matrix P (or its transpose $P^T$). The distribution of the encryption key QK may thus be considered secure, and if the encryption key QK is sufficiently long, one can now proceed to transmit data using AES (with the encryption key QK) while retaining a high level of security.

General Application Use Cases

A non-limiting example use case of the present technology is to enable of secure communication over the internet (e.g., amongst smartphones, automatic teller machines, corporate servers, data centers, satellites, e-commerce servers, vehicles, IoT devices including smart home appliances, etc.).

Embodiments of the invention can be applied to any layer of communication, such as any layer of the OSI (open systems interconnect) reference model because it deals with primitive data N-bit segments. The near end device takes an input bit stream and applies the encoding mapping (e.g., permutation matrix P) to N-bit segments to produce an output bit stream of N-bit segments, finally modulating the output bit stream before sending it to the far end device over the channel 130; and upon receipt, the far end device performs the decoding process by applying the decoding mapping (e.g., permutation matrix $P^T$) to obtain back the original bit stream. This physical layer implementation can be applied to long haul/metro point-to-point transmissions for highly secure data communications.

If implemented in the application layer, then the encoding process may be executed by a sending application and the decoding process may be executed in a receiving application. The sending application may share the permutation matrix P with the receiving application, and when the sending application plans to send data, it performs the permutation switching with the given segment size N and then the output bit segments will be converted into a regular bit stream or byte stream to send; at the receiving application, it will apply permutation switching with $P^T$ to bring back the original data. In this implementation, there is no need to change any existing information infrastructure, it functions just like plug-and-play.

Embodiments of the invention can be also implemented as software-only such as in applications directly, or a software-embedded system such as inside a network protocol stack, to be enabled and disabled, as well as browser adds-on, etc. Certain embodiments can also be implemented in data communication devices such as network nodes, routers/ wireless and wireless base stations. As well, certain embodiments can be implemented into smart phone transmission/ receiving units, or mobile applications. Data security for internet information communications may thus be improved.

Further implementations include vehicle-to-vehicle (V2V) communications for smart driving to provide highly secure communications between vehicles.

Certain embodiments can be used to build a secure space for cloud data storage by providing an integrated encoding and decoding device in the front of cloud data storage devices. All data would be encoded by the device using the permutation matrix P before sending to storage devices and decoded by the device using the same permutation matrix $P^T$ before sending out of the cloud.

Other non-limiting examples of use cases of the present technology may be to:

Enable secure communication between autonomous vehicles and a central server.

Enable secure communication between satellites and a ground station.

Enable secure communication amongst vehicles on the road (V2V private network).

Enable secure data storage.

A further non-limiting example use case pertains to an individualized operating system (OS) obtained by embedding a permutation switching sublayer into the OS to enhance data security and prevent data breaches. The permutation switching sublayer utilizes a permutation switching matrix as described above. The permutation switching matrix can be automatically determined by each individual system, based on system identifiers. In doing so, malicious software cannot be run in such an individualized system.

Figure 7A:
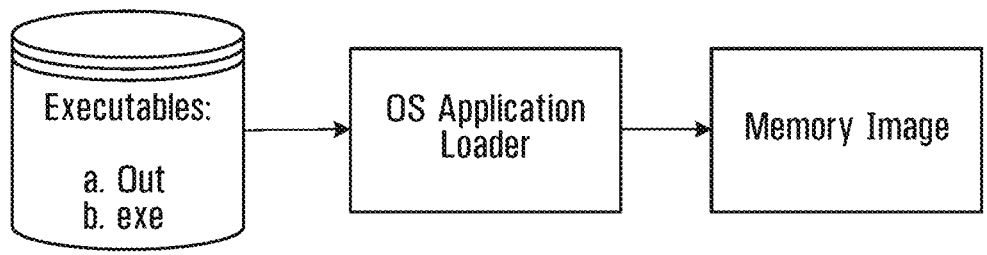
FIG. 7A-7C illustrate how certain embodiments may be applied to an application loading scenario for an operating system (OS).

FIG. 7A illustrates a typical process for an OS to load an application into memory then run it. In this case, malware might execute in a computing system if the malware is in the system; this type of occurrence gives the malware a "write once and run everywhere" attribute which can create huge damage to users.

Figure 7B:
Figure 7C:
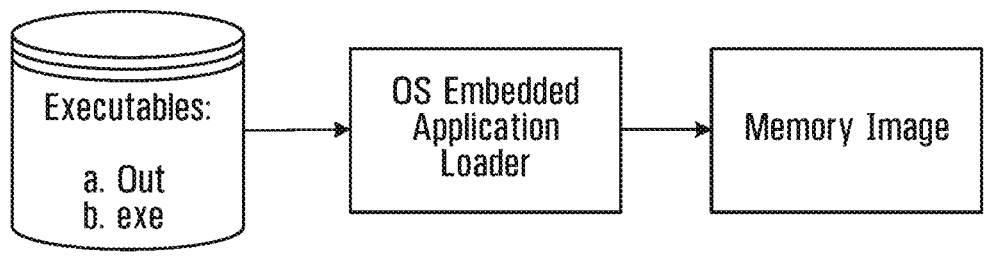

In contrast, an individualized OS consists of the typical OS with embedded application localizer (FIG. 7B) and embedded application loader (FIG. 7C). The typical OS generate the installed system permutation matrix based on the OS license and the hardware system characteristics, securely stored into its system or re-produced at run-time it every time when the system starts. A user application must be "localized", with the user authorization, by the embedded application localizer with a permutation switching (using the permutation matrix P) to application executables and generating localization IDs stored into the localized application images.

Only an application that has been localized (see FIG. 7C) can be loaded and applied the permutation switching with the permutation matrix $P^T$ to bring back to original executable to be loaded to memory to run. At the same time, the localization can be verified for correctness.

It will be appreciated that automatic downloaded malware will be prevented from executing in an individualized OS system.

Specific Application Use Case: Internet of Things (IoT)

Figure 22:
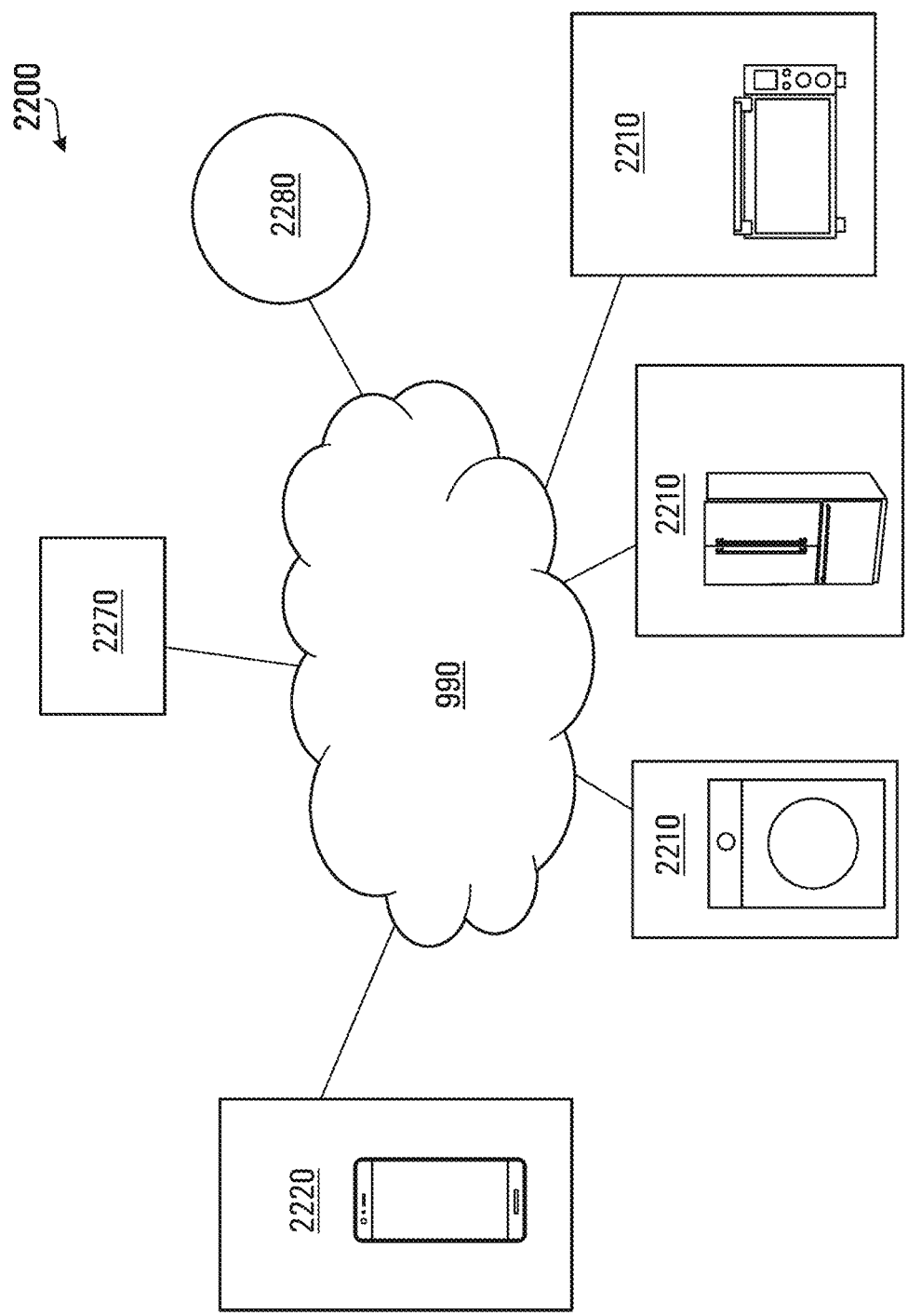
FIG. 22 is a network diagram of an Internet-of-things (IoT) environment.

Reference is now made to FIG. 22, which shows an example Internet of Things (IoT) environment 2200. The IoT environment 2200 generally refers to an ensemble of IoT-enabled objects 2210, typically with some data reporting or control functionality, that are in communication with an application device 2220 over a network such as the Internet 990. Examples of IoT-enabled objects 2210 can include physical devices such as smart home appliances (washers, dryers, vacuums, ovens, refrigerators, thermostats, cameras, etc.), clothing, toys, healthcare devices, vehicle parts and various other items embedded with electronics, sensors (optional), software and a network communication interface. The application device 2220 is interested in sending messages to, and receiving messages from, the various IoT-enabled objects 2210. Examples of the application device 2220 could be a smartphone, workstation, laptop or mainframe server. The IoT environment 2200 may include further interconnected network elements 2270, 2280 having various other functionalities.

A computer-implemented method of synchronizing an Internet-enabled object 2210 (or Internet-enabled appliance) with the application device 2220 may be implemented in this environment. Such a method could include a portion carried out at the application device 2220 and a portion carried out at the Internet-enabled appliance. Among other things, the application device 2220 may generate an encoding mapping based on (i) a previous encoding mapping used to communicate previously with the appliance 2210 and (ii) a seed (e.g., from a remote server over the Internet); and transmit the encoding mapping to the appliance 2210 over a local connection that does not traverse the Internet. For its part, the appliance 2220, upon receiving the encoding mapping over the local connection, may use the encoding mapping to subsequently secure data exchanged with the application device 2220 over the Internet. The application device 2220 may also receive encoded data from the appliance 2210 and decode the data using a decoding mapping derivable from the encoding mapping.

Figure 23:
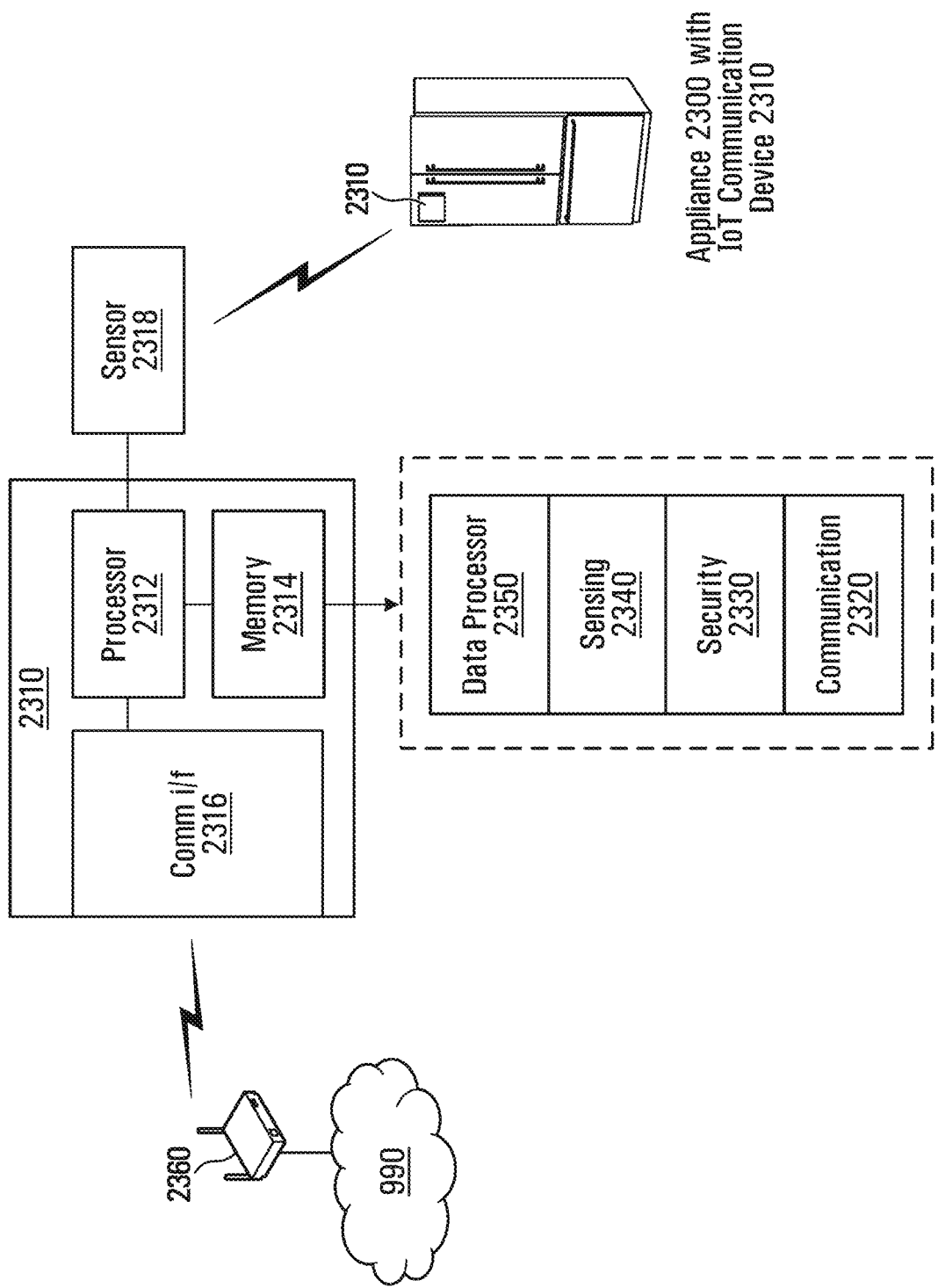
FIG. 23 is a schematic diagram showing an appliance in the IoT environment.

In the example of one of the IoT-enabled objects 2210 being a home appliance, and with reference to FIG. 23, the appliance 2300 may be conventional in many respects except that it also includes a microprocessor-enabled IoT communication device 2310. The IoT communication device 2310 includes a processor 2312, a memory 2314 and a network communication interface 2316. An external sensor 2318 may also be provided, or the sensor 2318 may be embedded elsewhere in the appliance 2300 with the output of the 2318 sensor being supplied to the IoT communication device 2310. The IoT communication device 2310 may be powered from the same power source as the rest of the appliance 2300, or it may include its own power source (e.g., a battery). The IoT communication device 2310 may also include other components that are not specifically illustrated.

In this example, the memory 2314 stores computer-readable instructions that are executed by the processor 2312. In some embodiments, the computer-readable instructions have a small code footprint, sometimes as small as 30 kilobytes (30 KB), so as to facilitate usage with battery-powered appliances. By executing the computer-readable instructions in the memory 2314, the processor 2312 can carry out a variety of processes, including a communications process 2320, a data security process 2330, a sensing process 2340 (which is optional) and data processing process 2350. In other embodiments, the aforementioned functions may be implemented by the existing hardware and software of the appliance 2300, i.e., in the absence of a dedicated microprocessor-enabled IoT communication device. Additional processes may be encoded in the computer-readable instructions stored in the memory 2314 and executable by the processor 2312.

Figure 28:
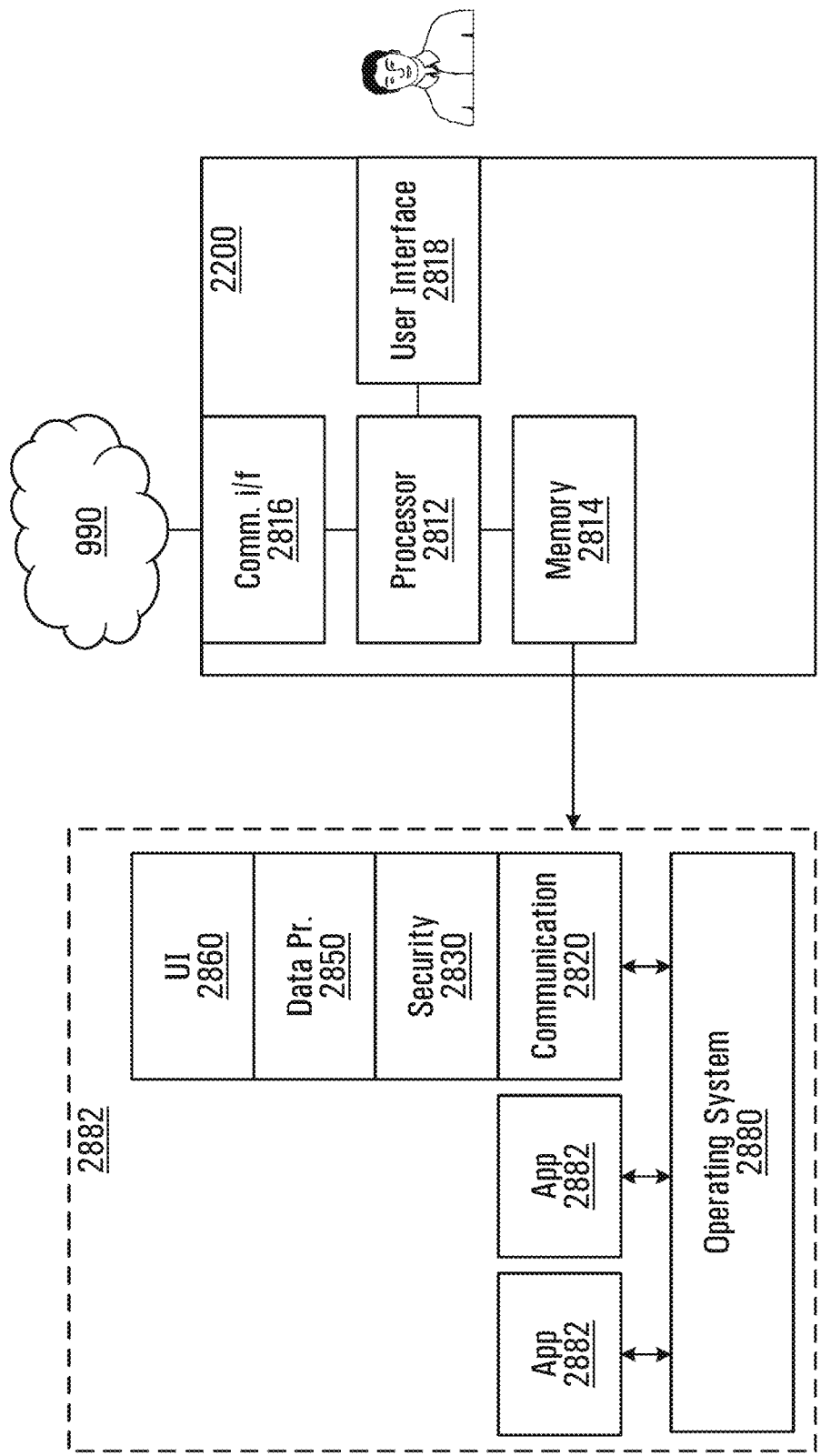
FIG. 28 is a block diagram of an application device in the IoT environment.

In the example of an IoT-enabled object being the application device 2220, and with reference to FIG. 28, the application device 2220 does not require a dedicated microprocessor-enabled IoT communication device, as existing hardware and software of the application device 2220 can be utilized to provide the requisite functionality. In this regard, it is useful to note that the application device 2220 includes, inter alia, a processor 2812, a memory 2814, a network communication interface 2816 and a user interface 2818 (which can include various input/output devices such as a screen, keyboard, loudspeaker, etc.).

In this example, the memory 2814 stores computer-readable instructions that are executed by the processor 2812. Execution of the computer-readable instructions may cause the processor 2812 to carry out an operating system 2880 and various applications (or "apps") 2882. One such app may exhibit functionality for monitoring and/or controlling the appliance 2300. To this end, carrying out the app may involve executing a variety of processes, including a communications process 2820, a data security process 2830, a data processing process 2850 and a user interface process 2860. Additional processes and apps may be encoded in the computer-readable instructions stored in the memory 2814 and executable by the processor 2812.

The aforementioned processes will now be described in further detail, as they apply to the appliance 2300 or the application device 2220.

The sensing process 2340 (executed by the processor 2312 of the IoT communication device 2310 of the appliance 2300) may include steps of obtaining a reading from the sensor 2318 and storing the reading in the memory 2314. Readings from the sensor 2318 may be obtained at regular intervals or on demand upon receipt of a command. Examples of the sensor 2318 include a thermometer, an inclinometer, a light sensor, a hygrometer, a carbon monoxide sensor, an accelerometer, a pressure sensor, an image sensor (e.g., CCD) and a detection and ranging sensor (radar, lidar, sonar), to name a few non-limiting possibilities.

The data processing process 2350 (executed by the processor 2312 of the IoT communication device 2310 of the appliance 2300) may include a step of processing the sensor data in the memory 2314 in order to produce consumable data for transmission to an external party. The consumable data may take the form of a stream of bytes in a certain format demanded by the external party. By way of non-limiting example, the sensing process 2340 may produce and store a temperature reading once every 5 minutes and the data processing process 2350 may determine an average temperature over 1 hour by averaging the 12 most recent entries stored in the memory 2314.

The user interface process 2860 (executed by the processor 2812 of the application device 2220) may include a step of interacting with a user of the application device 2220 so as to obtain an indication of a request from the user. For example, the user may request a reading from a remote appliance (such as the appliance 2300) or the user may request to exert control of such appliance. The user interface process 2860 may also include a step of presenting information to the user in a particular format, such as graphically.

For its part, the data processing process 2850 (executed by the processor 2812 of the application device 2220) may include a step of processing various data before displaying it via the user interface 2818. The data processing process 2850 may thus perform various manipulations on the data in the memory 2814, including graphical and mathematical manipulations.

Turning now to the communication process 2320 (executed by the processor 2312 of the IoT communication device 2310 of the appliance 2300), this process implements certain media access control (MAC) and physical (PHY) specifications for communicating with a nearby network access point 2360 via the network communication interface 2316. In a home environment, network connectivity may be achieved wirelessly with a home router over Wi-Fi. Other low-level protocols for communication between the appliance 2300 and the nearby access point 2360 include Bluetooth, near-field communication (NFC) and Zigbee, to name a few non-limiting possibilities. The home router 2360, which is typically connected to a service provider modem (not shown), then provides the IoT communication device 2310 with access to the Internet.

For its part, the communication process 2820 (executed by the processor 2812 of the application device 2220) may also implement certain media access control (MAC) and physical (PHY) specifications for communicating with a nearby network access point 2360 via the network communication interface 2316. However, this type of low-level communication for providing a data connection to the Internet may instead be handled by the operating system of the application device 2220. Such low-level communication may be conventional, and thus it will not be described here.

Additionally, both the communication process 2320 and the communication process 2820 also implement certain higher-layer protocols for communicating with entities on the Internet. A non-limiting example of such a higher-layer protocol is MQTT (Message Queuing Telemetry Transport), which works on top of the TCP/IP protocol. Further details about the MQTT protocol can be found at www.mqtt.org, the contents of which are incorporated by reference. Other non-limiting examples of a higher-layer protocol for communicating with the server over the Internet include Advanced Message Queuing Protocol (AMQP), Streaming Text Oriented Messaging Protocol (STOMP), IETF Constrained Application Protocol, XMPP, DDS, OPC UA, and Web Application Messaging Protocol (WAMP).

The MQTT protocol follows a publish/subscribe messaging model. Instead of the traditional client-server model, where a client communicates directly with the server, the publish/subscribe model provides for two types of "client" participants that communicate messages through a broker. Each message is ascribed a "topic". Each client can be a "publisher" client for certain topics and/or a "subscriber" client for certain other topics. The publisher clients are decoupled from the subscriber clients by the broker, which is known by both the publisher and subscriber clients (e.g., at a pre-determined URL). The broker filters all incoming messages and distributes them according to topics.

The broker is considered the heart of any publish/subscribe messaging model such as is implemented by the MQTT protocol. Depending on the concrete implementation, the broker can handle up to thousands of concurrently connected IoT-enabled objects. The broker is primarily responsible for receiving all messages, filtering them according to topic, determining who is interested in which topics and then sending the filtered messages to all subscribed clients. The broker also holds the session of all persisted clients including subscriptions and missed messages.

Considering now how the MQTT protocol may be mapped to the IoT environment 2200 in FIG. 22, and with additional reference to FIG. 23, the IoT-enabled objects 2210 and the application device 2220 can be considered the MQTT clients. In particular, the appliance 2300 can be a publisher client of certain topics and a subscriber client to others. Similarly, the application device 2220 can be a publisher client of certain topics (including those topics to which the appliance 2300 subscribes) and can be a subscriber client to certain other topics (including those topics published by the appliance 2300). One of the network elements, in this case network element 2280, can play the role of the MQTT broker. In a non-limiting example, the MQTT broker 2280 can be implemented as a server on the Internet having a pre-determined IP address. Each of the MQTT clients 2220, 2300 runs a suitable MQTT protocol library and connects to the MQTT broker 2280 over a suitable network connection. The MQTT protocol is based on top of TCP/IP and therefore the MQTT clients 2220, 2300 and the MQTT broker 2280 each implement a TCP/IP stack.

An MQTT connection itself is always between one MQTT client and the MQTT broker 2280; no MQTT client is connected to another MQTT client directly. The connection is initiated through an MQTT client sending a CONNECT message to the MQTT broker 2280. The MQTT broker 2280 responds with a CONNACK message and a status code. Once the connection is established, the MQTT broker 2280 will keep it open as long as the client does not send a DISCONNECT command or the connection is otherwise lost.

After an MQTT client is connected to the MQTT broker 2280, it can publish messages. The MQTT protocol implements topic-based filtering of the messages by the broker, so each message must contain a topic, which will be used by the MQTT broker 2280 to forward the message to interested MQTT clients.

A PUBLISH message can include the name of a topic and a payload. A SUBSCRIBE message includes the name of a topic. The MQTT broker 2280 notes which MQTT clients have subscribed to which topics. Thus, when the broker receives a PUBLISH message from an MQTT client for a particular topic, the MQTT broker 2280 routes the PUBLISH message to those MQTT clients that have subscribed to the particular topic.

Figure 24:
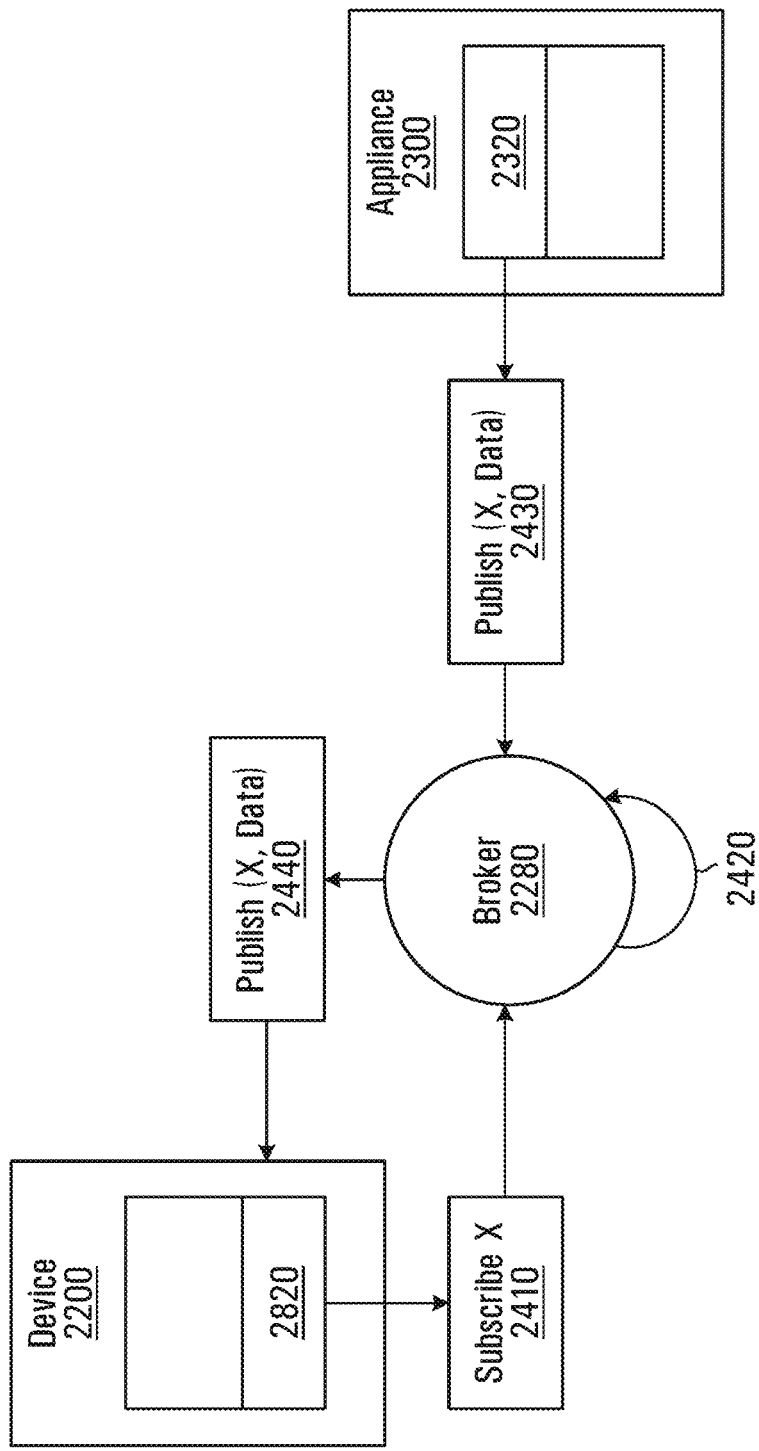
FIG. 24 is a block diagram illustrating a broker implementing a subscribe-publish communication paradigm in the IoT environment.

FIG. 24 shows an example of the subscription, publishing and brokering concepts of the MQTT protocol, applied to the IoT environment of FIG. 21, and carried out by the communication process of each respective IoT-enabled object (in the case of the appliance 2300, this is the communication process 2320 and in the case of the application device 2220, this is the communication process 2820). Specifically, the appliance 2300 may be configured to capture sensed data (e.g., via the sensing process 2340) and may have the capability of publishing messages containing this sensed data under topic "X". In addition, topic X is of interest to the application device 2220. Accordingly, as represented by 2410, the application device 2220 sends a SUBSCRIBE message (topic=X) to the broker 2280. As represented by 2420, the broker 2280 registers the application device 2220's interest in topic X. For its part, as represented by 2430, the appliance 2300 sends a PUBLISH message (topic=X) to the broker 2280 containing the sensed data (DATA). The broker 2280 recognizes that the application device 2220 is interested in topic X and therefore, as represented by 2440, routes the PUBLISH message (topic=X) with the data (DATA) to the application device 2220.

Figure 25:
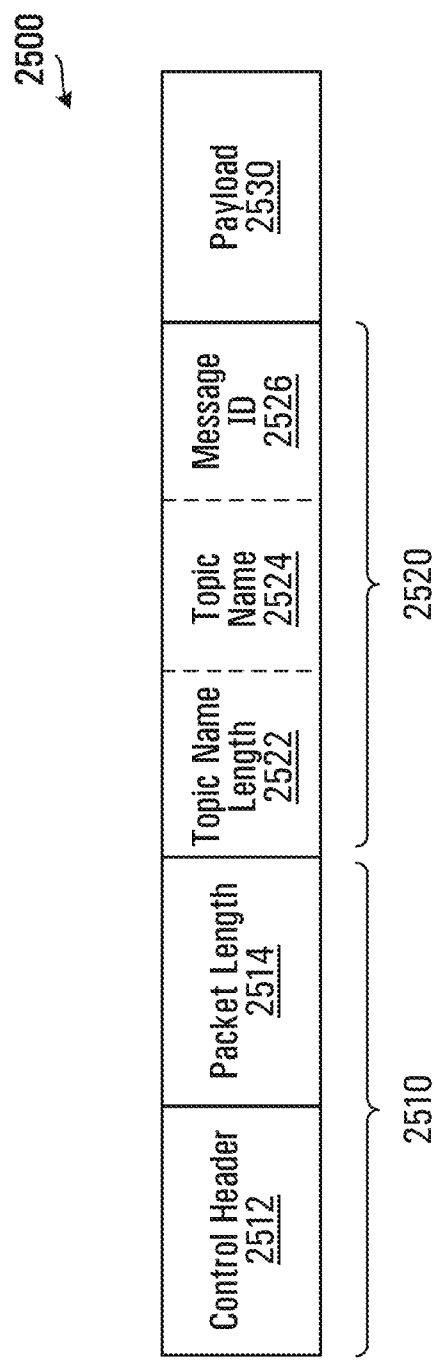
FIG. 25 is a schematic diagram showing a PUBLISH message containing data, for use in the IoT environment.

With reference to FIG. 25, there is shown a format of an MQTT message 2500, in this case a PUBLISH message. At a minimum, all MQTT messages include a fixed header field 2510 with a control header field 2512 and a packet length field 2514. The control header field 2512 indicates the type of MQTT message (in this case a PUBLISH message). As MQTT messages are variable-length messages, the packet length field 2514 indicates the length of the MQTT message 2500. Then, depending on the message type, there may be a header field 2520 and a payload field 2530. Such fields do exist for a PUBLISH message, but their length and content varies. In particular, the header field 2520 includes a topic name length field 2522, a topic name field 2524 and a message ID field 2526 (also referred to as a time stamp). The topic name length field 2524 indicates the topic to which the PUBLISH message 2500 relates, while the topic name length field 2522 indicates the length of the topic name length field 2522. As for the message ID field 2526, this may indicate a sequential number issued by the source of the message 2500, which could be unique for each message or unique for each message having the same topic.

Finally, the payload field 2530 contains the application message to be published. The MQTT protocol is data-agnostic, and how the payload is structured depends on the use case. It is completely up to the sender if it wants to send binary data, textual data or even full-fledged XML or JSON.

The objects in an IoT environment suffer from security issues similar to those of conventional servers, workstations and smartphones, except that firewall, security update and anti-malware systems used for the latter types of devices are generally unsuitable for the typically smaller, less capable, IoT-enabled objects. As such, a solution is to provide the IoT-enabled objects with data security processes, as now described in greater detail.

The data security processes 2330, 2380 function as a layer above the respective communication process 2320, 2820. For example, the communication processes 2320, 2820 are responsible for functionality such as modulation and demodulation, antenna/gain control and connection maintenance (e.g., retransmissions at the TCP level). For their part, the data security process 2330, 2830 are responsible for the following three functions:

Function 1: Determining and distributing the encoding and decoding mappings;

Function 2: Quantropization and dequantropization using the encoding and decoding mappings; and Function 3: Remote tuning of the encoding and decoding mappings.

These three functions will now be described in greater detail.

Function 1 of the Data Security Process: Determining and Distributing the Encoding and Decoding Mappings In order to allow communication to take place in the entropy space between the appliance 2300 and the application device 2220, each of these devices needs to know the encoding mapping that it will use to quantropize its data, and vice versa using a decoding mapping. The data security process 2330 carried out by the appliance 2300 and the data security process 2830 carried out by the application device 2220 are responsible for determining the encoding and decoding mappings and coordinating their distribution. In the present embodiment, the data security process 2830 of the application device 2220 is responsible for determining the permutation matrix P of dimensionality $2^N$ by $2^N$ and distributing it to the data security process 2330 of the appliance 2300. As such, the processor 2812 of the application device 2220 may handle a greater computational load than the processor 2312 of the appliance 2300.

Figure 27:
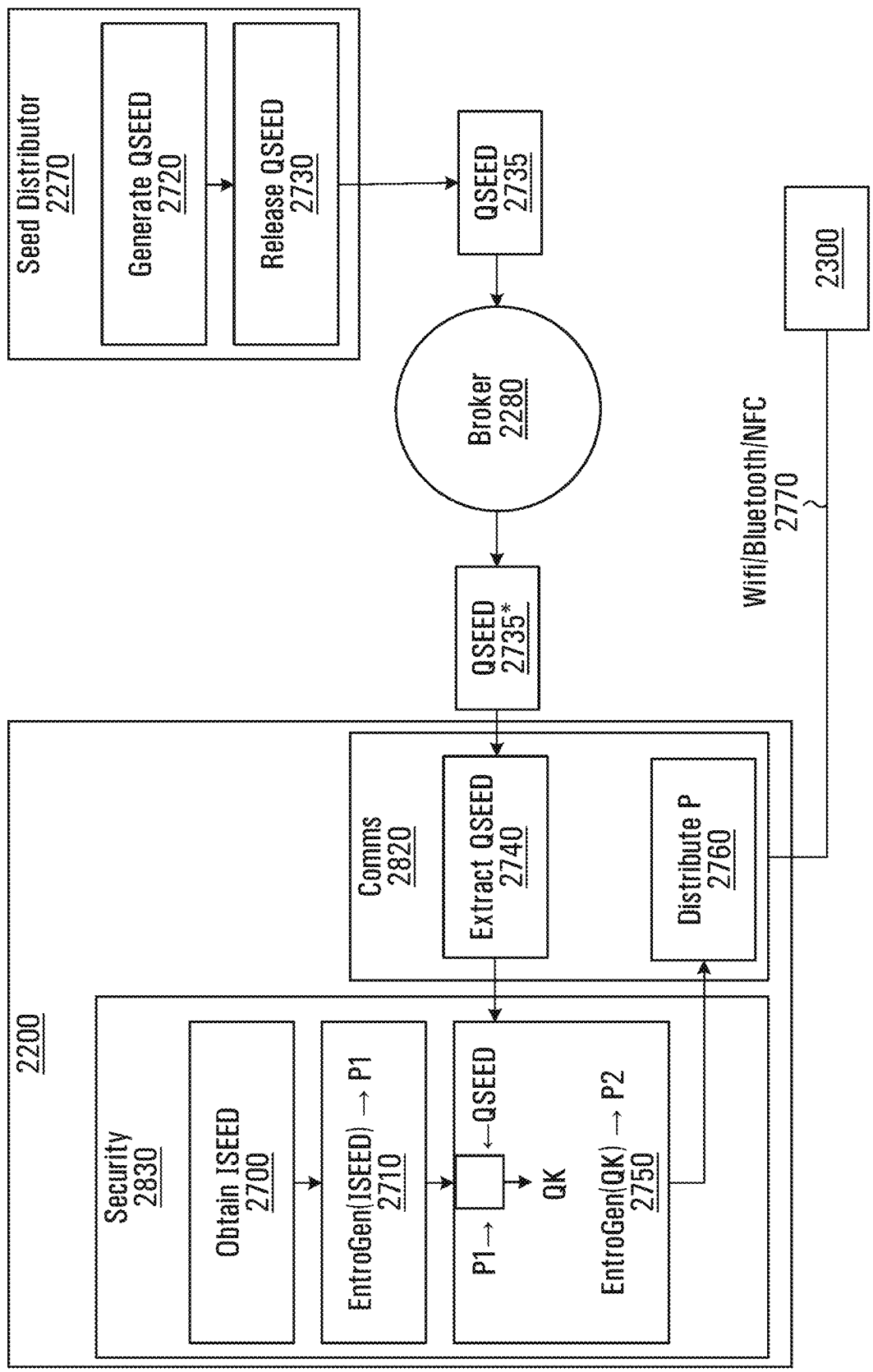
FIG. 27 is a schematic diagram illustrating transmission of a PUBLISH message containing a seed in the IoT environment.

One example way in which the permutation matrix P is determined and distributed is now described with reference to FIG. 27 which further illustrates one of the IoT-enabled clients in the IoT environment 2200, in this case network element 2270, having the role of a "seed distributor". The seed distributor 2270 may be configured to generate seeds using a random process as is known in the industry.

At step 2700, the data security process 2830 of the application device 2220 obtains an initial seed ISEED. For example, the initial seed ISEED may have been stored in the memory 2814 of the application device 2220.

At step 2710, the data security process 2830 of the application device 2220 generates an encoding mapping based on the initial seed ISEED. To this end, the data security process 2830 may execute the EntroGen(*) process. It is recalled that EntroGen(*)process produces an encoding mapping based on the value of the argument. Thus, for example, calling EntroGen(ISEED) produces an initial permutation matrix $P_I$.

At step 2720, the seed distributor 2270 generates a random seed QSEED. This may be a true random number in the mathematical sense, but this is not a requirement. It may simply be a bit string of any particular size that would be difficult for an outside party to guess.

At step 2730, the seed distributor 2270 sends the random seed QSEED to the application device 2220 via the broker 2280. That is to say, the seed distributor 2270 places the random seed QSEED into the payload of a PUBLISH message 2735, for which the topic is chosen to be "SEED" (by way of example). Meanwhile, the application device 2220 is assumed to subscribe to the topic "SEED". The PUBLISH message 2735 reaches the broker 2280, which recognizes that the application device 2220 subscribes to the topic "SEED" and accordingly routes the PUBLISH message 2735 to the application device 2220. The version of the PUBLISH message 2735 routed by the broker 2280 is given the reference numeral 2735* in order to distinguish it from the PUBLISH message 2735 received by the broker 2280, since there will be processing by the broker 2280.

Figure 30:
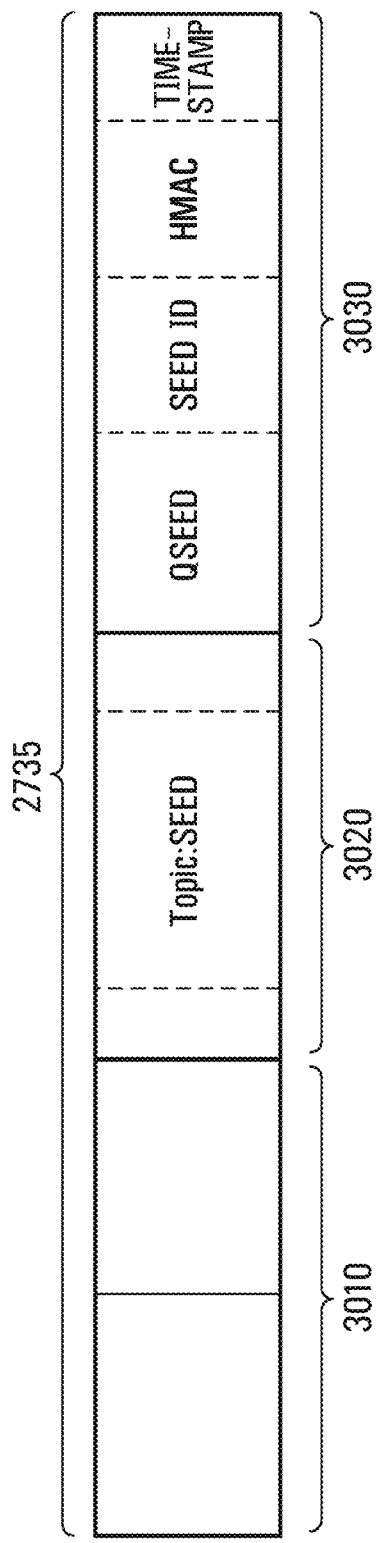
FIG. 30 is a schematic diagram showing a PUBLISH message containing a seed, for use in the IoT environment.

With reference to FIG. 30, there is shown the PUBLISH message 2735 transmitted by the seed distributor 2270 towards the application device 2220 via the broker 2280. The PUBLISH message 2735 has structural elements corresponding to those previously described with respect to the message 2500, namely a fixed header field 3010, a header field 3020 (containing the topic name "SEED") and a payload field 3030. In the present embodiment, the topic "SEED" signals transmission of the random seed QSEED within the payload field 3030. The payload field 3030 may also include a seed ID (which is an identifier of the seed being published), a hash-based message authentication code (HMAC, which is optional) and a time stamp (which can be measured in terms of relative packet order or in terms of elapsed time, for example).

Returning now to FIG. 27, at step 2740, the PUBLISH message 2735 ultimately reaches the application device 2220, where and the contents of the payload field 3030 of the PUBLISH message 2735 is extracted by the communication process 2820. In short, this is how the data security process 2830 of the application device 2220 obtains the random seed QSEED.

At step 2750, the data security process 2830 generates a key QK by applying the initial permutation matrix P to the received random seed QSEED. Then, the data security process 2830 calls the EntroGen(*) process again, but with the key QK as the argument. This results in the permutation matrix P. It is noted that by applying the initial permutation matrix $P_I$ to the received random seed QSEED before calling EntroGen(*), even if an outsider knows the EntroGen(*) process and the random seed QSEED, they still cannot generate the permutation matrix P.

At step 2760, the application device 2220 carries out the process of distributing the permutation matrix P to the IoT-enabled devices with which it is wants to securely communicate. In the present embodiment, this includes the appliance 2300. The application device 2220 establishes a link 2770 with the appliance 2300 over a secure private network, such as local private WiFi, NFC or Bluetooth. After the appliance 2300 securely receives the permutation matrix P, both IoT-enabled devices (the application device 2220 and the appliance 2300) are "in" the same entropy state, and the application device 2220 can from now on securely manage the appliance 2300 over the public Internet without security concerns.

Step 2760 can be carried out whenever the application device 2220 wishes to perform a reset or re-synchronization of the encoding mapping with the appliance 2300 or other IoT-enabled devices with which it communicates. Re-synchronization can be motivated by a variety of factors, such as the passage of a certain amount of time or a perceived security breach. It is noted that the seed distributor 2270 may publish random seeds on a regular basis (e.g., as PUBLISH messages under the topic "SEED"), and the application device 2220, in subscribing to the topic "SEED", may receive these seeds (via the broker 2280) and use them for resynchronization purposes as required.

Figure 26:
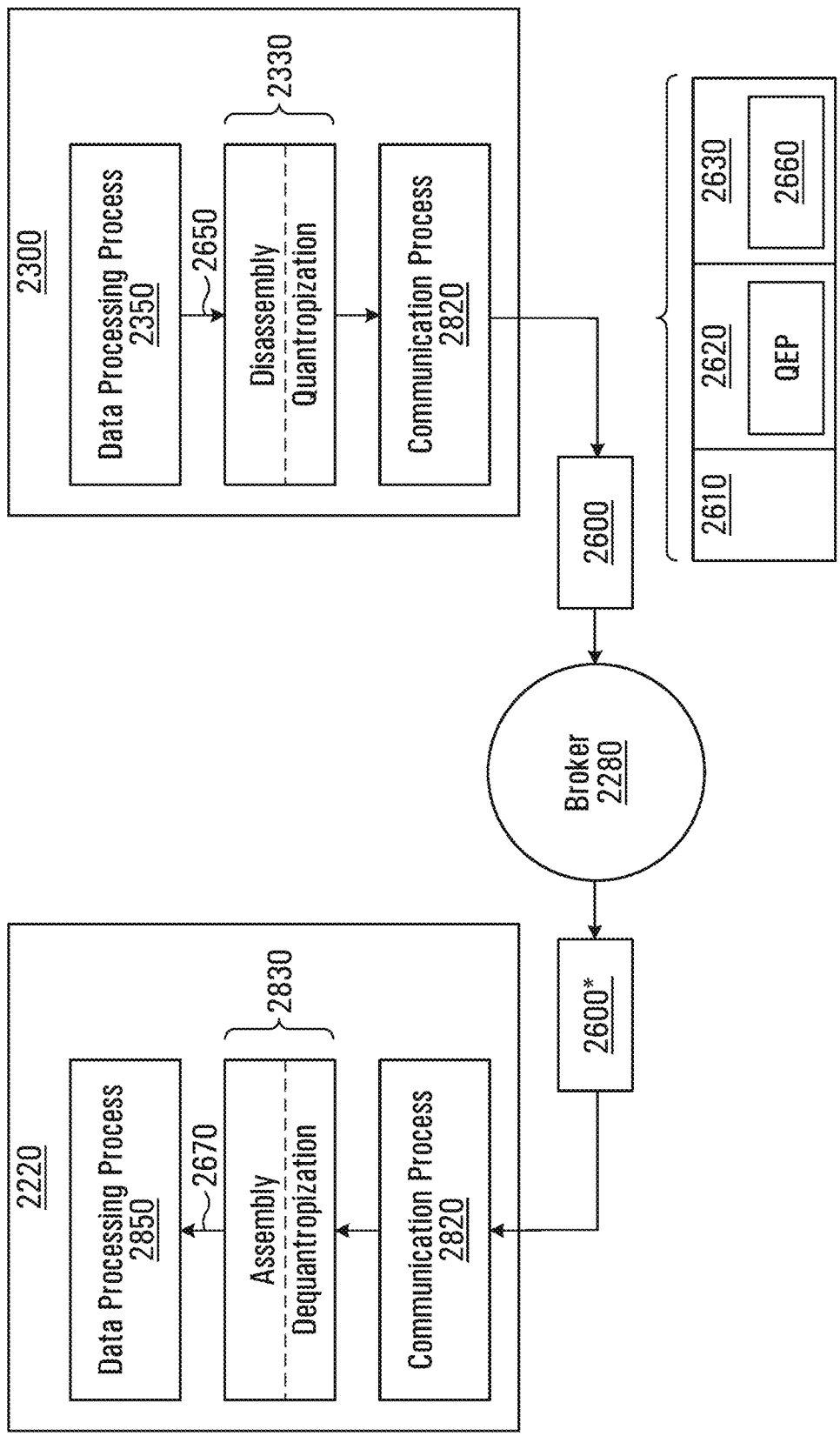
FIG. 26 is a schematic diagram illustrating transmission of a PUBLISH message containing data in the IoT environment.

Function 2 of the Data Security Process: Quantropization and Dequantropization Using the Encoding and Decoding Mappings With reference to FIG. 26, there is shown a PUBLISH message 2600 transmitted by the appliance 2300 towards the application device 2220 via the broker 2280. The message 2600 has structural elements corresponding to those previously described with respect to the message 2500, namely a fixed header field 2610, a header field 2620 (containing the topic name) and a payload field 2630. In the present embodiment, the topic "QEP" (stands for "Quantum Entropy Processing") signals transmission of a quantropized bit string in the payload field 2630. The quantropized bit string corresponds to a bit string carrying sensor data or any other kind of information provided by the data processing process 2350, and having undergone quantropization.

The corresponding bits in the information space may include additional information such as a seed ID (e.g., an identifier of the seed from which the current version of the encoding mapping was generated), a hash-based message authentication code and a time stamp (which can be measured in terms of relative packet order or in terms of elapsed time, for example). In one embodiment, all this information can be concatenated and quantropized before being placed into the payload field 2630 of the PUBLISH message 2600. In another embodiment, only some of this information (e.g., the sensor data, the seed ID) is quantropized and then is concatenated with other (non-quantropized) information (e.g., HMAC and time stamp) when being placed into the payload field 2630 of the PUBLISH message 2600.

Quantropization is achieved by the data security process 2330 of the appliance 2300 applying an encoding mapping that is stored in the memory 2314. For exemplary purposes, and as described above in connection with Function 1, the encoding mapping is represented by a permutation matrix P of dimensionality $2^N$ by $2^N$, while the decoding mapping is represented by the matrix $P^T$. The decoding mapping is assumed to be also known to the application device 2220 (see Function 1), which is further assumed to subscribe to the topic "QEP" and is tasked with carrying out the corresponding dequantropization process to retrieve the sensor data or other information.

More particularly, the data security process 2330 of the appliance 2300 includes a step of breaking down (disassembling) an input bit string 2650 received from the data processing process 2350 into N-bit segments which are mapped to corresponding N-bit output segments. Specifically, for each given N-bit segment in the input bit string, the value (e.g., decimal value) represented by this N-bit segment is mapped by the data security process 2330 to a new value (e.g., decimal value) under operation of P, and then the binary digits used to represent this new value (e.g., decimal value) becomes the corresponding N-bit output segment for the given N-bit segment. The data security process 2320 of the appliance 2300 then invokes (e.g., calls) the communication process 2320.

Specifically, the communication process 2320 creates the PUBLISH message 2600 by populating the header field 2620 with the topic name "QEP" and by populating the payload field 2630 with the aforementioned N-bit output segment, denoted 2660. The PUBLISH message 2600 is then sent onto the Internet by the appliance 2300 and reaches the broker 2280. The broker 2280 receives the PUBLISH message sent by the appliance 2300, recognizes the topic "QEP" in the header field 2620, recognizes that the application device 2220 subscribes to the topic "QEP" and routes the PUBLISH message 2600 towards the application device 2220. The routed PUBLISH message is given reference numeral 2600* to distinguish it from the PUBLISH message 2600 received by the broker 2280, since there will be processing by the broker 2280. However, the content of the two messages 2600, 2600* is identical. It is noted that no change to the MQTT protocol is required for communication of sensitive data to take place in the entropy space so that the quantropized data reaches the application device 2220.

At the application device 2220, the communication process 2820 of the application device 2220 determines that the topic of the received PUBLISH message 2600* is "QEP", extracts the contents of the payload field 2630* (namely the segment 2660) and invokes (e.g., calls) the data security process 2830. By virtue of the topic being "QEP", the data security process 2380 knows that the received data is quantropized and proceeds to a step of dequantropizing the N-bit segment 2660 in the payload field 2630* of the received PUBLISH message 2600*. Specifically, for each given N-bit segment, the value represented by the N-bit segment is mapped by the data security process 2830 to a new value under operation of the permutation matrix $P^T$, and then the binary digits used to represent this new value form the corresponding N-bit output segment. The N-bit output segment may be combined with earlier such segments and then assembled by the data security process 2830 into an output bit string 2670 of suitably sized characters (e.g., bytes) that may be further processed by the data processing process 2850 to derive useful information and lead to actions being taken. It should be noted that due to the encoding and decoding mappings being transposes of one another, bit strings 2650, 2670 are identical.

Figure 29:
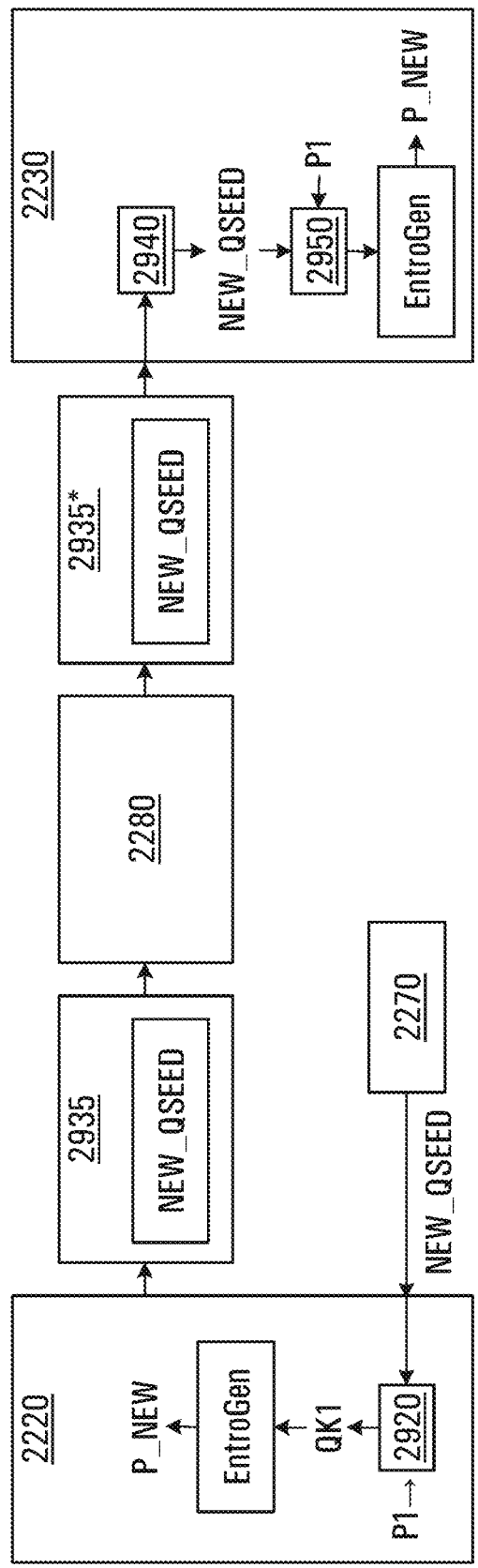
FIG. 29 is a schematic block diagram illustrating transmission of a message containing a seed, from the application device to the appliance in the IoT environment

Function 3 of the Data Security Process: Remote Tuning of the Encoding and Decoding Mappings Although step 2760 described above provides a way to re-synchronize the encoding mapping between the application device 2220 and the appliance 2300 in physical proximity to one another, it may be in some instances be desirable to reset or re-synchronize the encoding mapping when the application device 2220 is not in the vicinity of the appliance 2300. This remote re-synchronization is now described with additional reference to FIG. 29. A further topic is created for re-synchronization, under the name "ENTROSYNC". It is assumed that the IoT-enabled devices (including the application device 2220 and the appliance 2300) are aware of the existence of the topic "ENTROSYNC" and subscribe to this topic.

At step 2910, the communication process 2820 of the application device 2220 receives a new random seed NEW_QSEED from the seed distributor 2270 (via the broker 2280). As described earlier, this could be a result of regular transmissions by the seed distributor 2270 of PUBLISH messages under the topic "SEED". Alternatively, a special request-response sequence can be designed to result in the release of a seed on demand.

At step 2920, the data security process 2830 of the application device 2220 generates a new key QK1 by applying the current permutation matrix P to the new random seed NEW_QSEED. The application device 2220 then calls the EntroGen(*) process with the new key QK1 as an argument, in order to generate a new permutation matrix P_NEW in preparation for exchanging with the appliance 2300 once it will also be synchronized.

At step 2930, the application device 2220 sends a PUBLISH message 2935 under the topic "ENTROSYNC" and includes, in the payload, the value of the random seed NEW_QSEED that was used to generate the new key QK1 and the new permutation matrix P_NEW. The PUBLISH message 2935 reaches the broker 2280, which routes it to the appliance 2300. The routed PUBLISH message is given reference numeral 2935* to distinguish it from the PUBLISH message 2935, since there will be processing by the broker 2280.

At step 2940, the communication process 2320 of the appliance 2300 receives the PUBLISH message 2935, recognizes the topic "ENTROSYNC", and then extracts the new random seed NEW_QSEED from the payload and sends it to the data security process 2330.

At step 2950, the data security process 2330 of the appliance 2300 generates the same new key QK1 by applying the current permutation matrix P to the received new random seed NEW_QSEED. The appliance 2300 then calls the EntroGen(*) process with the new key QK1 as an argument, in order to generate the same new permutation matrix P_NEW in preparation for exchanging with the application device 2220.

At this point, both the application device 2220 and the appliance 2300 have knowledge of the same new permutation matrix P_NEW. Of course, the transpose P_NEW$^T$ can be easily derived from P_NEW if it is not already known. Thus, the data security process 2330 of the appliance 2300 can use an encoding mapping represented by the permutation matrix P_NEW while the data security process 2830 of the application device 2220 can use a decoding mapping represented by P_NEW$^T$. Similarly, the data security process 2830 of the application device 2220 can use an encoding mapping represented by the permutation matrix P_NEW$^T$ while the data security process 2330 of the appliance 2300 can use a decoding mapping represented by P_NEW.

Alternative Protocols to MQTT

Figure 31:
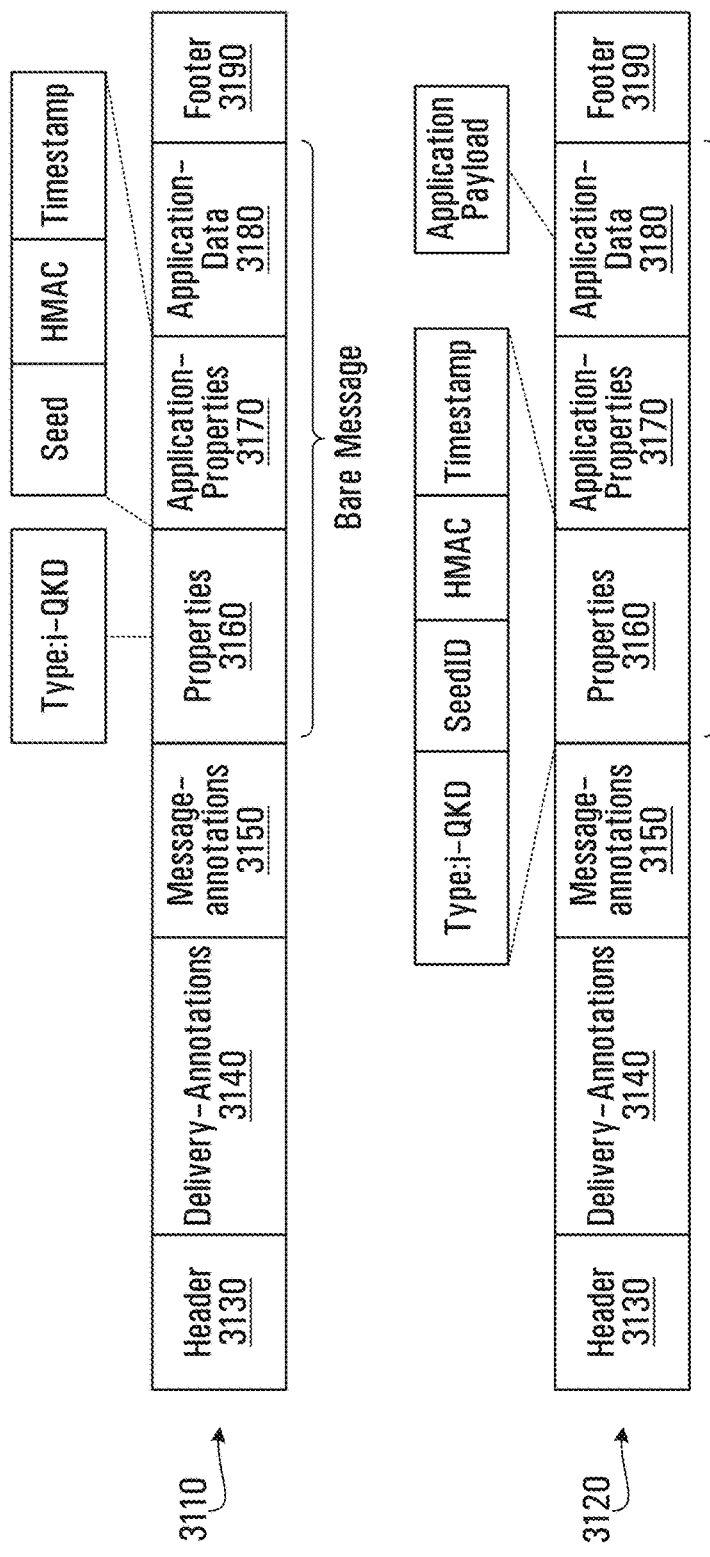
FIG. 31 is a schematic diagram showing an alternate message format for use in an alternate IoT environment.

Turning now to FIG. 31, there is shown an alternative message format, which is applicable in the case of the AMQP protocol. In particular, there is shown an AMQP message 3110 for seed delivery and an AMQP message 3120 for delivery of quantropized information. In particular, the general message format of an AMQP message includes a header field 3130, a delivery annotations field 3140, a message annotations field 3150, a properties field 3160, an application properties field 3170, an application data field 3180 and a footer field 3190.

The properties field 3160 and the application properties field 3170 may be used to convey some of the information described earlier in this document. For example, the properties field 3160 of the AQMP message 3010 for seed delivery may include a type flag (which identifies the type of message), whereas the application properties field 3170 may include the seed itself (e.g., QSEED), the HMAC and the time stamp. Also, the properties field 3160 of the AQMP message 3120 for delivery of quantropized information may include a type flag (which identifies the type of message), the seed identifier, the HMAC and the time stamp, whereas the application data field 3170 may contain the quantropized data itself.

Specific Application Use Case: Secure Blockchain Data Storage

It should be appreciated that a user can use a blockchain to securely store sensitive data (such as the initial secret for a cryptographic exchange, confidential government or corporate data, surveillance video, any other sensitive data) for its own private use. For example, consider a user in a blockchain network that has a wallet with a private key and a public key. The user can store the sensitive data on a local device (e.g., smartphone, desktop) and, as a backup, on the blockchain. This can be done by using the public key to encrypt the sensitive data, and recording it as a transaction on the blockchain. Other users cannot decrypt the sensitive data without the private key. Only the user can decrypt the sensitive data from the blockchain using the private key. In this way, only the wallet needs to be backed up securely by the user, not the data, which remains securely located in the cloud. This can be used for cloud-based secure backup storage. As such, if the user is using a new device (for example, a new smartphone after the previous one was lost or stolen), the user obtains a backup copy of the wallet (including the private key). Then the encrypted sensitive data is downloaded from the blockchain and decrypted using the private key to obtain the sensitive data in decrypted form.

Figure 20:
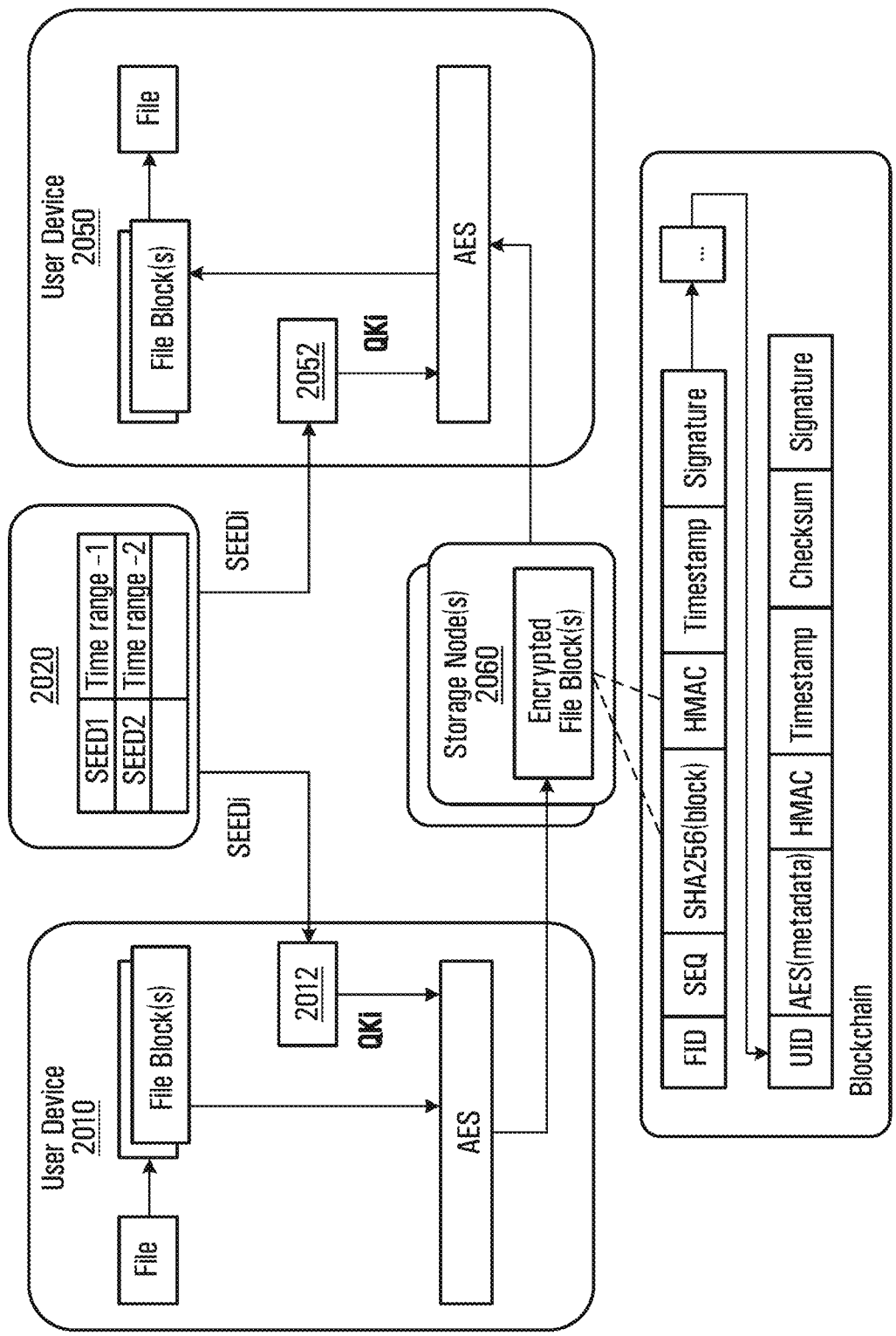
FIG. 20 is a schematic block diagram illustrating secure file storage on a blockchain.

This is now described in greater detail with additional reference to FIG. 20, which shows a user device 2010 in a blockchain-enabled environment. The user device 2010 can be a smartphone or computer, which is configured to be capable of carrying out quantropization as described herein and to this end includes a control module 2015 for determining the correct encoding and decoding mappings to use. The user device 2010 wishes to upload a file using the blockchain so as to, for example, store the file for future access. The file can be sliced into one or more file blocks. A server 2020 is also present in this blockchain-enabled environment and is configured for broadcasting seeds from time to time. In addition, the server 2020 maintains a historical record of the seeds it has broadcast, together with their time ranges. As seeds SEED1, SEED2, etc. are received from the server 2010, the control module 2015 of the user device 2010 can generate a succession of keys QK1, QK2, etc. with the aid of one or more permutation matrices P1, P2, etc. as has been described previously. That is to say:

P1(SEED1)→QK1
EntroGen(QK1)→P2
P2(SEED2)→QK2
EntroGen(QK2)→P3
Etc.

When the user is ready to upload the file, the metadata of the file is first encrypted (using by AES) with the current key QKi; the result is denoted AES(metadata). Then the encrypted metadata is written on the blockchain as a transaction with a user ID, the timestamp and a signature. In addition, a hashed message authentication code (HMAC) is also added, which is produced from the key and the message cipher. HMAC can only be verified by peers that have been paired, which provides robustness in the face of a quantum computer. In other words, in the event that the user's private key being used to carry out the transactions on the blockchain is cracked (e.g., by a quantum computer) or stolen, the user can still identify authentic and fake transactions by verifying the HMAC along with each transaction record. Also, a checksum value related to the file data may be produced and added as part of the transaction. This can be used once the file is downloaded to test for data integrity.

Each file block FID is then encrypted using the same technique and with the same key QKi (unless changes have occurred in the meantime). The entire encrypted file block is hashed, e.g., using SHA256. Then this hash is uploaded to the blockchain, along with User ID, sequence number, HMAC, timestamp and signature of the user.

Consider now that the user wants to download the file, say, onto a second user device 2050. The second user device 2050 can be another smartphone or computer which, similar to user device 2010, is configured to be capable of carrying out quantropization as described herein and to this end includes a control module 2055 for determining the correct encoding and decoding mappings to use. The second user device 2050 firsts download the encrypted metadata from the blockchain. The integrity of the file metadata will be verified by the HMAC. The metadata can be decrypted by AES using the correct key QKi generated with the correct seed SEEDi. The correct value of "i" can be retrieved from the server 2020 based on the timestamp stored in the file. The decrypted metadata will tell the second user device 2050 which file blocks (FIDs) to download (and from which storage nodes) as well as their sequence. Then the second user device 2050 will download the all encrypted file blocks and decrypt them using the same mechanism. The integrity of each file block will be verified by HMAC. Finally, the device will concatenate the file blocks to formulate the original file. The file can be verified by the checksum value.

Specific Application Use Case: Quantum-Resistant Signatures

Figure 35:
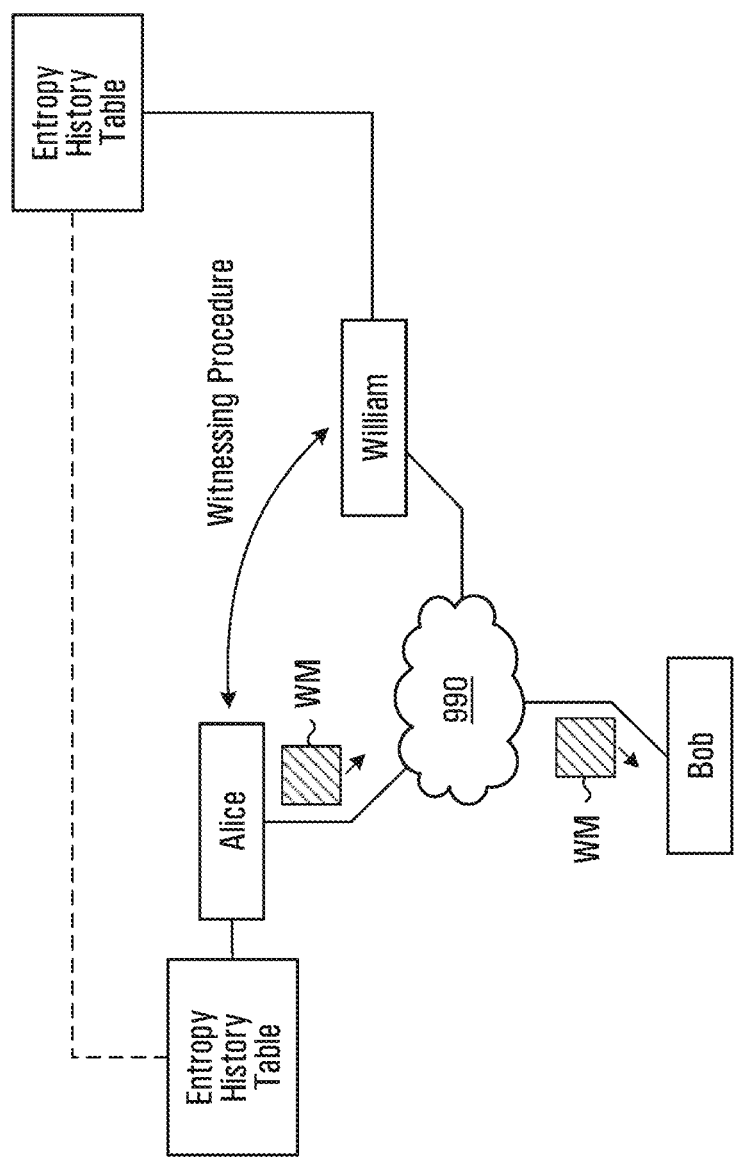
FIG. 35 shows a system for communicating a witnessed message.

With reference now to FIG. 35, there is shown an example system for transmission of a "witnessed message" in accordance with a non-limiting embodiment. The witnessed message may in some embodiments comprise a blockchain transaction. Specifically, the system includes two peers, Alice and Bob, as well as a witnessing entity, referred to as "William". William represents a computing device that could be accessible to Alice and Bob over a network 990 such as the internet. This could be in the context of an online service provided by William, and which charges a fee for each witnessed transaction, for example. It is assumed that Alice and William have securely built up a common Entropy History Table (as described above), including entropy records. It is recalled that an entropy record includes a plurality of entries, which may include an ID of the peer associated with the record, a time indicator, an entropy state and a hash.

It is further assumed that a common entropy record is identified between Alice and William. The common entropy record may be identified by, for example, agreeing on the time indicator. The common entropy record identifies an entropy state, which for the purposes of the present example, will be referred to as the shared entropy state at time "t" (denoted $E_t$), and which has a corresponding hash $H_t$.

Figure 36:
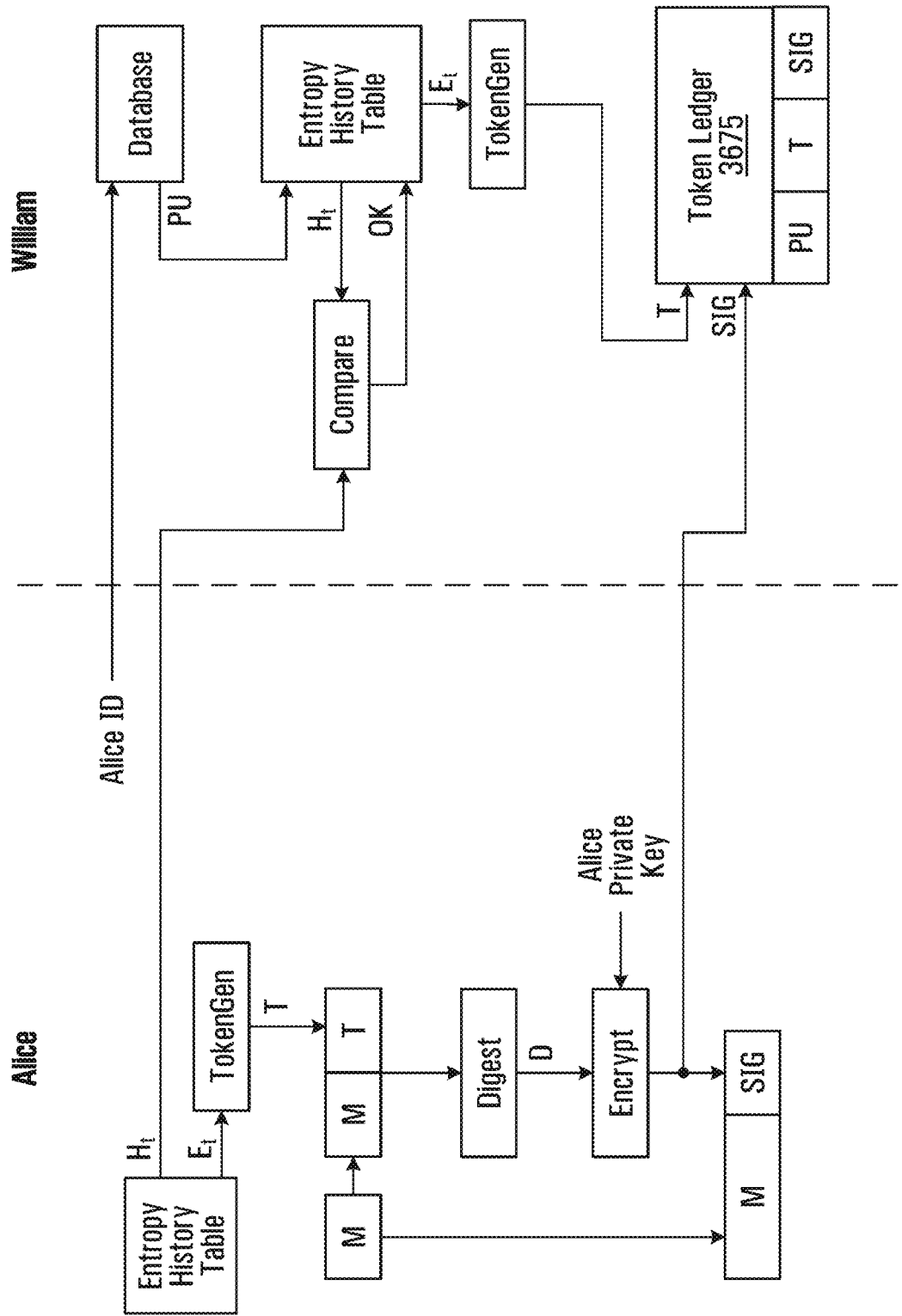
FIG. 36 is a diagram showing generation of a witnessed message.

In a particular non-limiting embodiment, steps involved in Alice generating a witnessed message WM from an original message M are now described with reference to the diagram in FIG. 36. It is assumed that Alice maintains a public-private key pair. Alice's public key PU can be used by Bob and William as an identifier of Alice.

Alice initiates a token generation protocol TokenGen(*) to generate a token T from the entropy state $E_t$. By way of non-limiting example, TokenGen may involve two steps:
1. Use a pseudo random number generator (such as RC4 PRGA) to generate a pseudo-random number R based on the entropy state $E_t$;
2. Use a hash function (such as MD5 or SHA-2) to generate the token T from the random number R.

Alice generates a signature SIG. This is done by first creating a digest D of a combination of the message M and the token T. In a simple example, the digest D can be generated as a hash function applied to a concatenation of the message M and the token T. Then, the digest D is encrypted with Alice's private key to create the signature SIG.

Alice creates a witnessed message WM with the message M and the signature SIG. This can be done by concatenating the message M and the signature SIG.

Meanwhile, Alice informs William that a token was generated, and supplies William with Alice's ID, the signature SIG (which, it is recalled, was generated form the message M and the token T), as well as the hash $H_t$ corresponding to the (current) entropy state $E_t$ (obtained from the Entropy History Table).

Based on Alice's ID, William obtains Alice's public key PU (for example, this could be stored in a database, which may be published online). Based on Alice's public key PU, William retrieves the corresponding hash, and verifies that the retrieved hash matches the hash received from Alice, namely $H_t$. If not, then this would mean that Alice is not using the same Entropy History Table as William, which could signal a security breach.

Assuming that there is a match between the hash retrieved from the Entropy History Table and the hash obtained from Alice, William retrieves the corresponding entropy state (which should be the current entropy state $E_t$) and initiates the same token generation protocol TokenGen(*) to generate the same token T as Alice from the same entropy state $E_t$, that is, T=TokenGen (E).

William updates a "token ledger" 3675 with the token T and the signature SIG, in association with Alice's public key PU. The token ledger 3675 may be implemented as a data structure, such as a table, linked list, etc., stored in a database and physically residing in memory. The token ledger 3675 may also log other details such as a message ID or session ID.

William then informs Alice that the token ledger has been updated.

At this point, Alice sends the witnessed message WM to recipient Bob. It is recalled that the witnessed message WM includes a first part (the message M) and a second part (the signature SIG)—the two parts could be concatenated or combined in different ways to form the witnessed message WM.

Generally speaking, Bob validates the witnessed message WM received from Alice by carrying out the following:
  receiving a token (T) from William (the witnessing entity); this could be done in response to providing at least the second part of the message to William;
  obtaining a first data element (D) by joint processing of the first part of the message and the token (such as hashing a combination of the first part of the message and the token);
  obtaining a second data element by joint processing of the second part of the message using a key associated with Alice (e.g., decrypting the second part of the message using Alice's public key, whereby Alice's private key would have been used to encrypt the second part of the message and, more specifically to encrypt a result of joint processing, by Alice, of the first part of the message and the token, thereby to create the second part of the message); and
  validating the witnessed message by comparing the first and second data elements; note that if the validating is unsuccessful, a warning of some kind (e.g., signal) may be issued by Bob.

It is noted that the first and second data elements match only when the token received from William matches an original token used by Alice in creating the second part.

The token created by William and the original token used by Alice in creating the second part are both created from the same entropy data (E). This entropy data was obtained by William consulting a ledger based on a code (such as a hash H derived by executing a one-way function on the entropy data) received from Alice.

Figure 37:
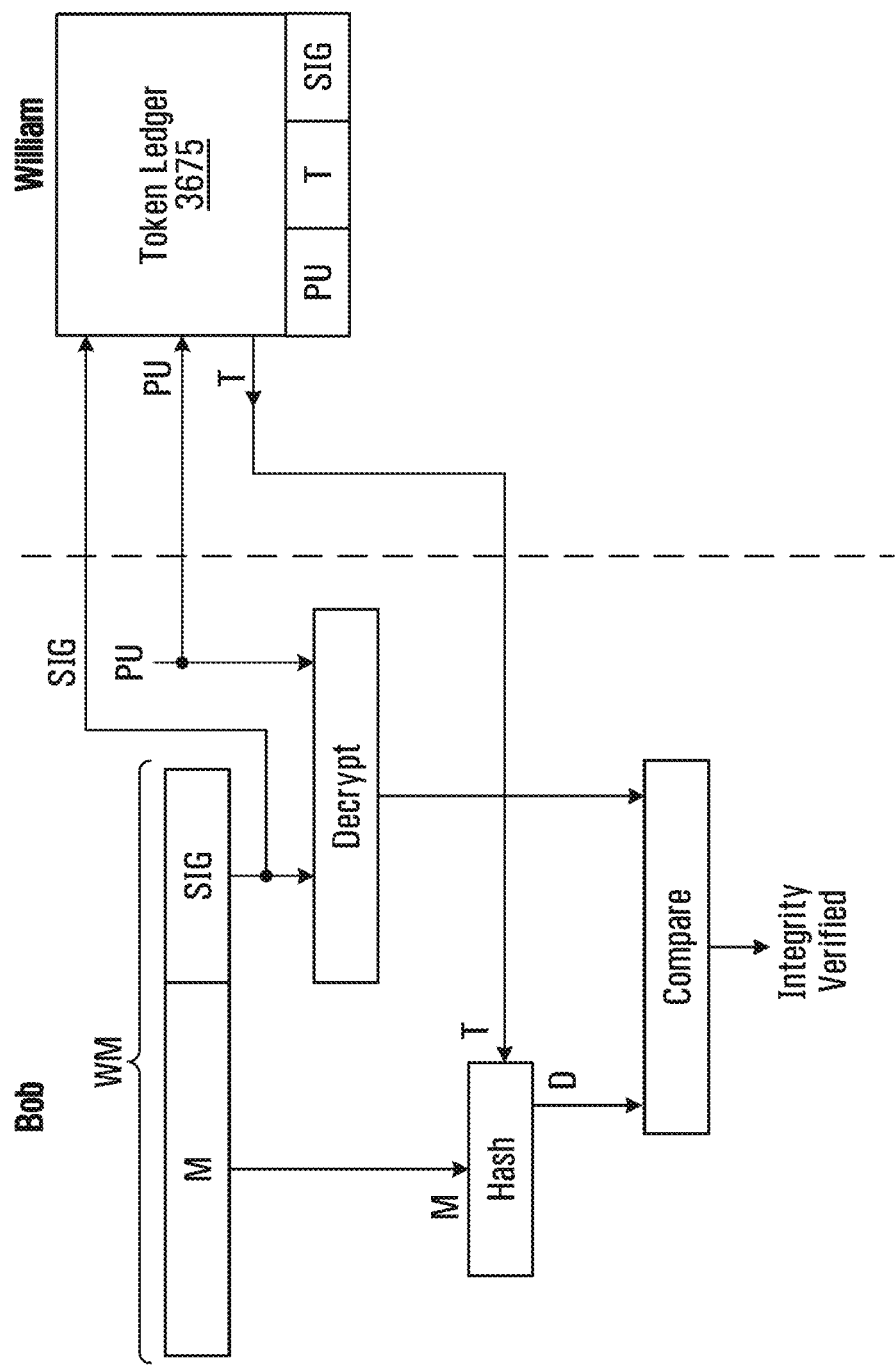
FIG. 37 is a diagram showing receipt of a witnessed message.

In a particular non-limiting embodiment, steps involved in Bob validating/verifying the integrity of the witnessed message WM are now described with reference to the diagram in FIG. 37.
  Bob extracts the signature SIG from the witnessed message WM.
  Bob provides the signature SIG to William, together with Alice's public key PU (or any other identifier of Alice that would allow William to obtain Alice's public key PU).
  William obtains the token T by consulting the token ledger 3675 based on at least one of Alice's public key PU and the signature SIG received from Bob.
  William sends the token T to Bob.
  Bob verifies integrity of the witnessed message WM using the token T. In particular:
    Bob extracts the message M from the witnessed message WM received from Alice, combines it with the token T received from William, and creates an expected digest D.
    Meanwhile, Bob uses Alice's public key PU to decrypt the signature SIG, thereby to obtain a decrypted digest D'.
    Bob then compares the expected digest D to the decrypted digest D'. If there is a match, this will confirm that the message M in its current form was indeed sent by Alice as witnessed by Bob. If not, this could mean that the message was tampered with, or that it was not actually sent by Alice.

The above-described process prevents a malicious party that gains access to Alice's private key from generating a valid transaction, even if the malicious party also gains access to the token T. This is because the malicious party does not have access to the Entropy History Table, and therefore the malicious party does not know the current entropy state $E_t$ or its corresponding hash $H_t$. Thus, the malicious party cannot successfully instruct William to generate the correct token T for use in the receiving process.

Stated differently, Alice and William must generate the same token because Bob relies only on William for the token. If the tokens are different, Bob will be unable to verify the message. It is assumed that Alice and William share a privileged/secured relationship. Specifically, William will only generate tokens when directed by Alice. As such, so long as a secured channel can be established between Alice and William, this approach may be more difficult to crack than a conventional approach, even for quantum computers.

It is noted that in the above scenario, William (the witnessing entity) is configured to obtain a code (such as a hash) and a signature from Alice, consult a first database (Entropy History table) to obtain entropy data associated with the code, generate a token from the entropy data, store in a second database (token ledger 3675) an association between the token and the signature (and possibly also the identifier of Alice, such as a public key) and, later, transmit a message comprising the token in response to receipt of a request identifying at least the signature. However, the first database is only consulted when there is a match between code obtained from Alice and a code associated with the identifier of Alice. The entropy data may represent a configuration of a one-to-one switch with $2^N$ input ports and $2^N$ output ports.

Specific Application Use Case: Quantum-Resistant Blockchain Transactions

Figure 38:
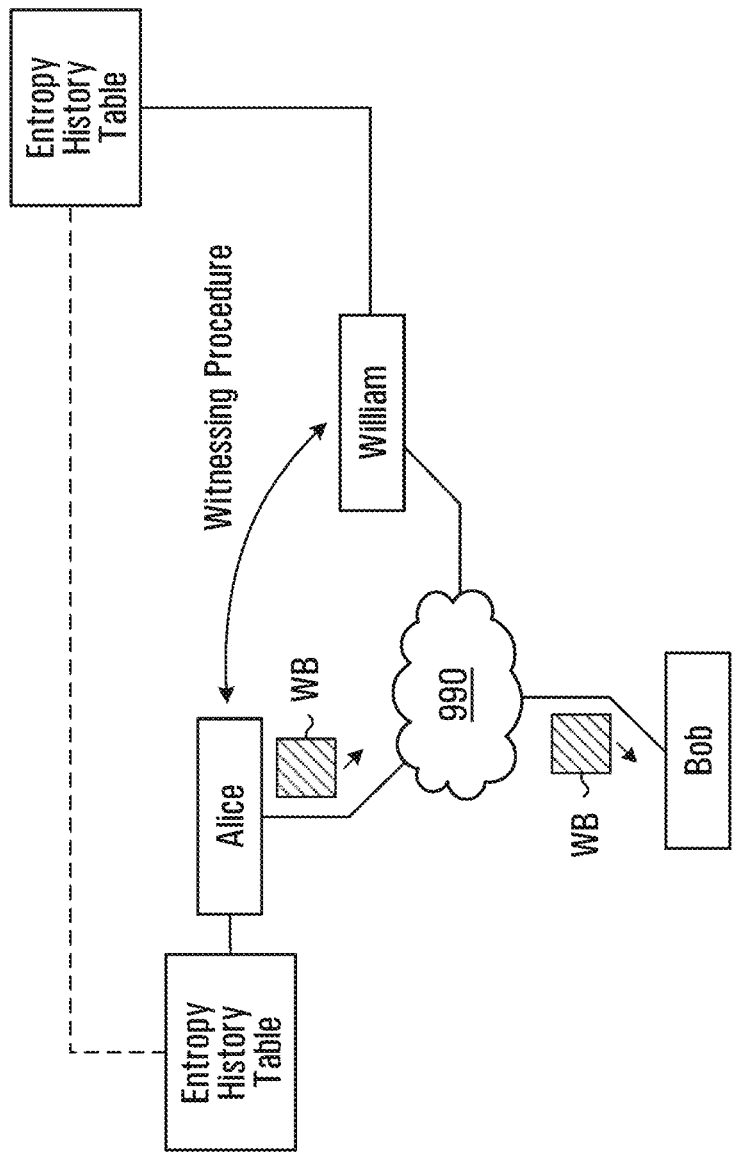
FIG. 38 shows a system for publishing a witnessed blockchain transaction.

With reference now to FIG. 38, there is shown an example system for publishing of a "witnessed blockchain transaction" in accordance with a non-limiting embodiment. Specifically, the system includes two peers, Alice and Bob, as well as a witness William. William represents a computing device that could be accessible to Alice and Bob over a network such as the internet. It is assumed that Alice and William establish and maintain a common Entropy History Table. In a non-limiting example, Alice and William agree on a common entropy record in the Entropy History Table. The common entropy record may be identified by, for example, agreeing on a time indicator. For the purposes of the present example, the common entropy record is associated with the shared entropy state $E_t$ which, according to the Entropy History Table, has a corresponding hash $H_t$. It is further assumed that Alice maintains a public-private key pair, and that Alice's public key PU can be used by Bob and William as an identifier of Alice.

Figure 39:
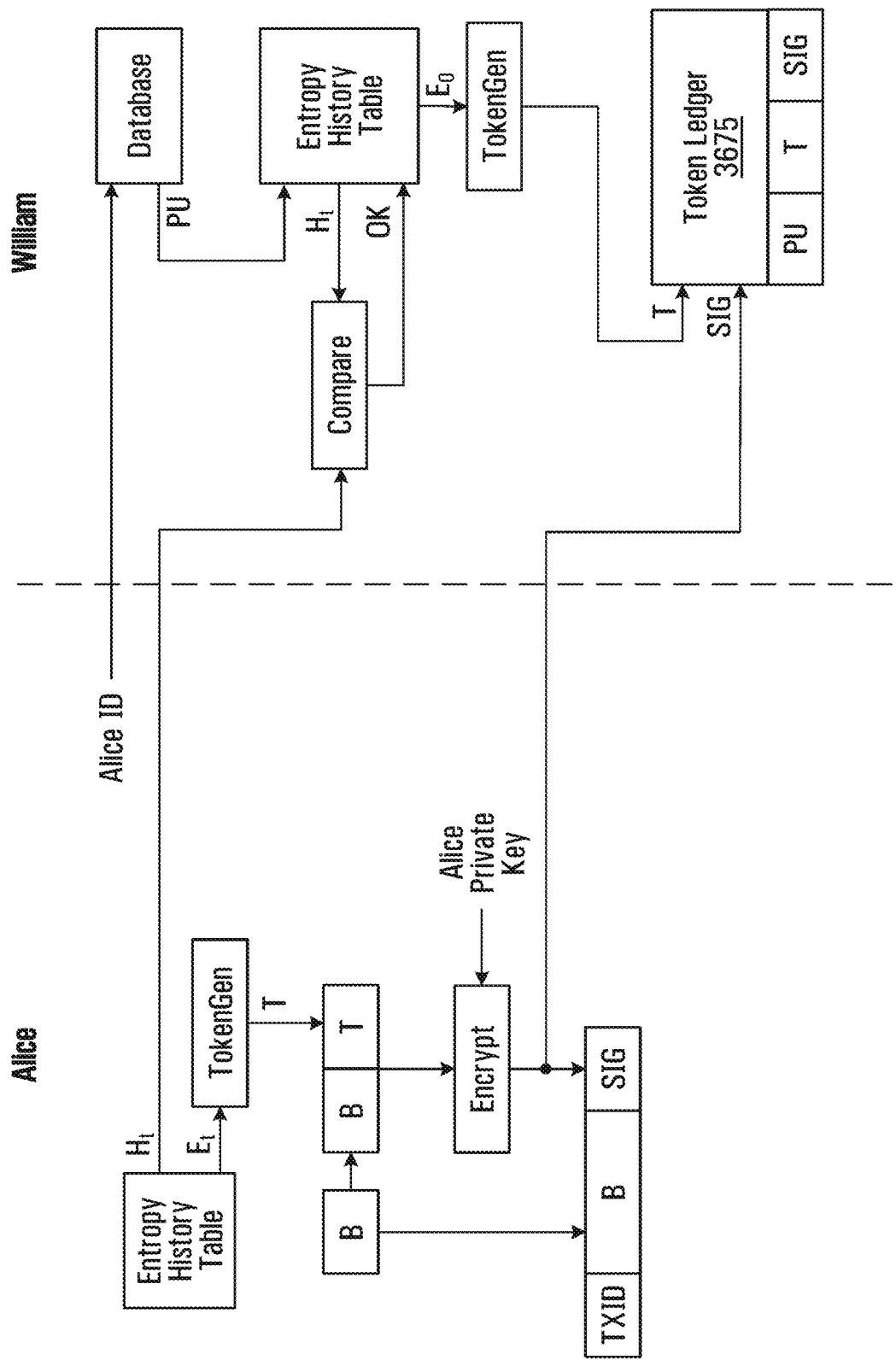
FIG. 39 is a diagram showing generation of a witnessed blockchain transaction.

Steps involved in Alice generating a witnessed blockchain transaction WB from an original transaction payload/message B are now described with reference to the diagram in FIG. 39.

Alice initiates a token generation protocol TokenGen(*) to generate a token T from the current entropy state $E_t$, that is, T=TokenGen($E_t$).

Alice generates a signature SIG. This is done by encrypting a combination (e.g., concatenation) of the transaction payload/message B and the token T with Alice's private key.

Alice creates a witnessed blockchain transaction WB with the transaction ID, the transaction payload/message B and the signature SIG.

Meanwhile, Alice informs William that a token was generated, and supplies William with Alice's ID, the signature SIG (which was generated form the message M and the token T), as well as the hash $H_t$ corresponding to the current entropy state $E_t$ (obtained from the Entropy History Table).

Based on Alice's ID, William obtains Alice's public key PU. Based on Alice's public key PU, William retrieves the corresponding hash, and verifies that the retrieved hash matches the hash received from Alice, namely $H_t$. If not, then this would mean that Alice is not using the same Entropy History Table as William, which could signal a security breach.

Assuming that there is a match between the hash retrieved from the Entropy History Table and the hash obtained from Alice, William retrieves the corresponding entropy state $E_t$ and initiates the same token generation protocol TokenGen (*) to generate the same token T as Alice from the same entropy state $E_t$, that is, T=TokenGen($E_t$).

William updates a "token ledger" 3975 with the token T and the signature SIG, in association with Alice's public key PU. The token ledger 3975 may be implemented as a data structure, such as a table, linked list, etc., and may be stored in a database, and physically residing in a computer memory. The token ledger 3975 may also log other details such as transaction ID or session ID.

William informs Alice that the token ledger has been updated.

At this point, Alice publishes the witnessed blockchain transaction WB to recipient Bob. It is recalled that the witnessed blockchain transaction WB includes the transaction ID, the transaction payload/message B and the signature SIG. Steps involved in Bob verifying the integrity of the witnessed blockchain transaction WB are similar to those already described with reference to the diagram in FIG. 37.

Security Enhancements

It has been shown that the N-bit output bit segments produced through application of an encoding mapping as described herein exist in a space that is so vast that, from a practical perspective, encryption is no longer needed to guarantee security, even for relatively small values of N. Nevertheless, the security provided by the use of an encoding mapping as described herein can be further enhanced. For example, one can use more than one permutation matrix in series, or avoid the use of common encoding lengths such as 8 bits (with ASCII) or 16 bits (with Unicode), in order to reduce the presence of a statistically significant fingerprint in the output bit stream that could help reverse engineer the input bit stream. Also, one can prepend bits into the input bit stream to alter the "frame" into which the input bits of the original bit stream are placed.

Other security features help reduce the presence of statistically significant fingerprint in the output bit stream. Examples are now described in greater detail.

First Security Enhancement: Multi-Level Quantropization

Figure 40:
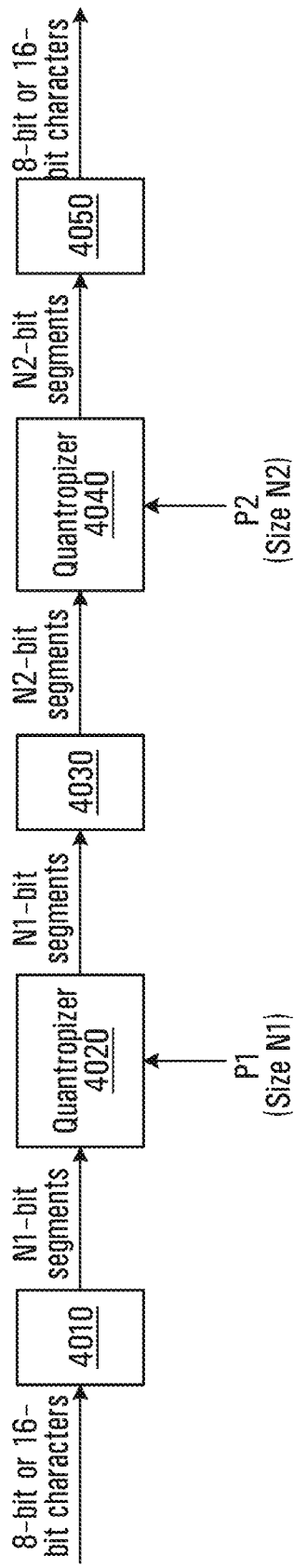
FIG. 40 is a block diagram showing a security enhancement involving multi-level quantropization.

With reference to FIG. 40, there is shown a multi-level system with two system sizes, N1 and N2. At the sender-side, an input bit stream (e.g., provided in 8-bit or 16-bit characters) is first disassembled by a first disassembler 4010 into segments of size N1. These segments are then quantropized by a first quantropizer 4020 using a first permutation matrix P1 of size N1. The resulting N1-bit segments are reassembled by a reassembler 4030, which produces segments of size N2. The reassembler 4030 may include a packager, which creates 8-bit or 16-bit characters, and then a disassembler, which breaks up the 8-bit or 16-bit characters into N2-bit segments. These N2-bit segments are then quantropized by a second quantropizer 4040 using a second permutation matrix P2 of size N2. The resulting N2-bit segments are then packaged by a packager 4050 into 8-bit or 16-bit characters before being transmitted to the recipient. The recipient side essentially conducts the same operations but in reverse order, starting with N2-bit dequantropization (using permutation matrix $\mathbf{P2}^T$) and then N1-bit dequantropization (using permutation matrix $\mathbf{P1}^T$).

Thus, it has been shown how N1-bit input segments of an input message are converted into corresponding N1-bit output segments using a $2^{N1}$-by-$2^{N1}$ one-to-one mapping stored in a non-transitory storage medium; then, the N1-bit output segments are reassembled into N2-bit input segments, which are then converted into corresponding N2-bit output segments using a $2^{N2}$-by-$2^{N2}$ one-to-one mapping. The $2^{N1}$-by-$2^{N1}$ one-to-one mapping and the $2^{N2}$-by-$2^{N2}$ one-to-one mapping are stored in a non-transitory storage medium. N1 and N2 can be arbitrary integers greater than 1, and N1 is different from N2.

Second Security Enhancement: Bit Position Shuffling

Figure 41:
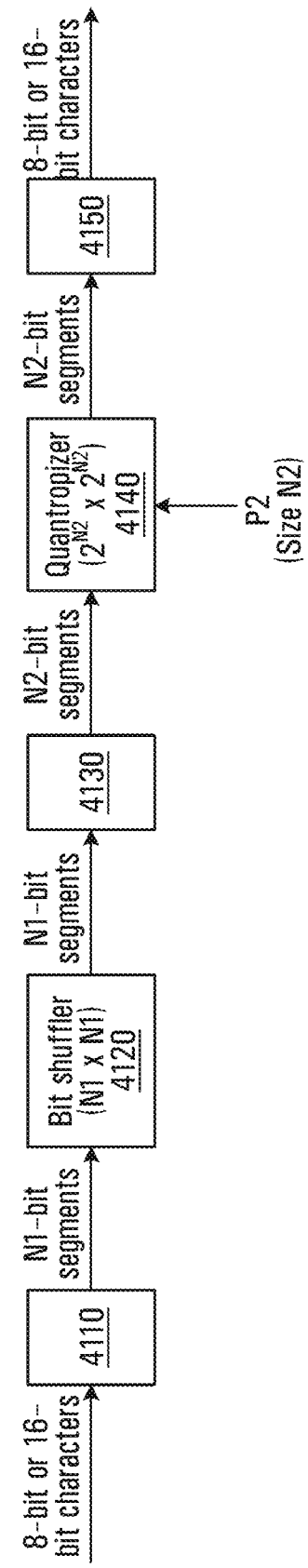
FIG. 41 is a block diagram showing a security enhancement involving bit position shuffling.

With reference to FIG. 41, there is shown a system with a bit shuffler and a quantropizer. Specifically, at the sender-side, an input bit stream (e.g., provided in 8-bit or 16-bit characters) is first disassembled by a first disassembler 4110 into segments of size N1. These segments are then bit-shuffled by a bit shuffler 4120 of size N1. The bit shuffler 4120 maps input bit positions to output bit positions. As such, the resulting N1-bit segment corresponding to a particular N1-bit input segment will have the same number of ones and the same number of zeros as the particular N1-bit input segment, only at different positions. When N1 is not equal to 8 or 16, this will greatly reduce any byte-level statistical fingerprint in the input bit stream, as consecutive instances of the same bit pattern in the input will not produce the same bit pattern in the output. The N1-bit segments are then disassembled by a disassembler 4130, which produces segments of size N2. These N2-bit segments are then quantropized by a quantropizer 4140 using a permutation matrix P of size N2. The resulting N2-bit segments are then packaged by a packager 4150 into 8-bit or 16-bit characters before being transmitted to the recipient. The recipient side essentially conducts the same operations but in reverse order, starting with N2-bit dequantropization (using permutation matrix $P2^T$) and then N1-bit deshuffling.

Third Security Enhancement: Block Quantropization

Figure 42:
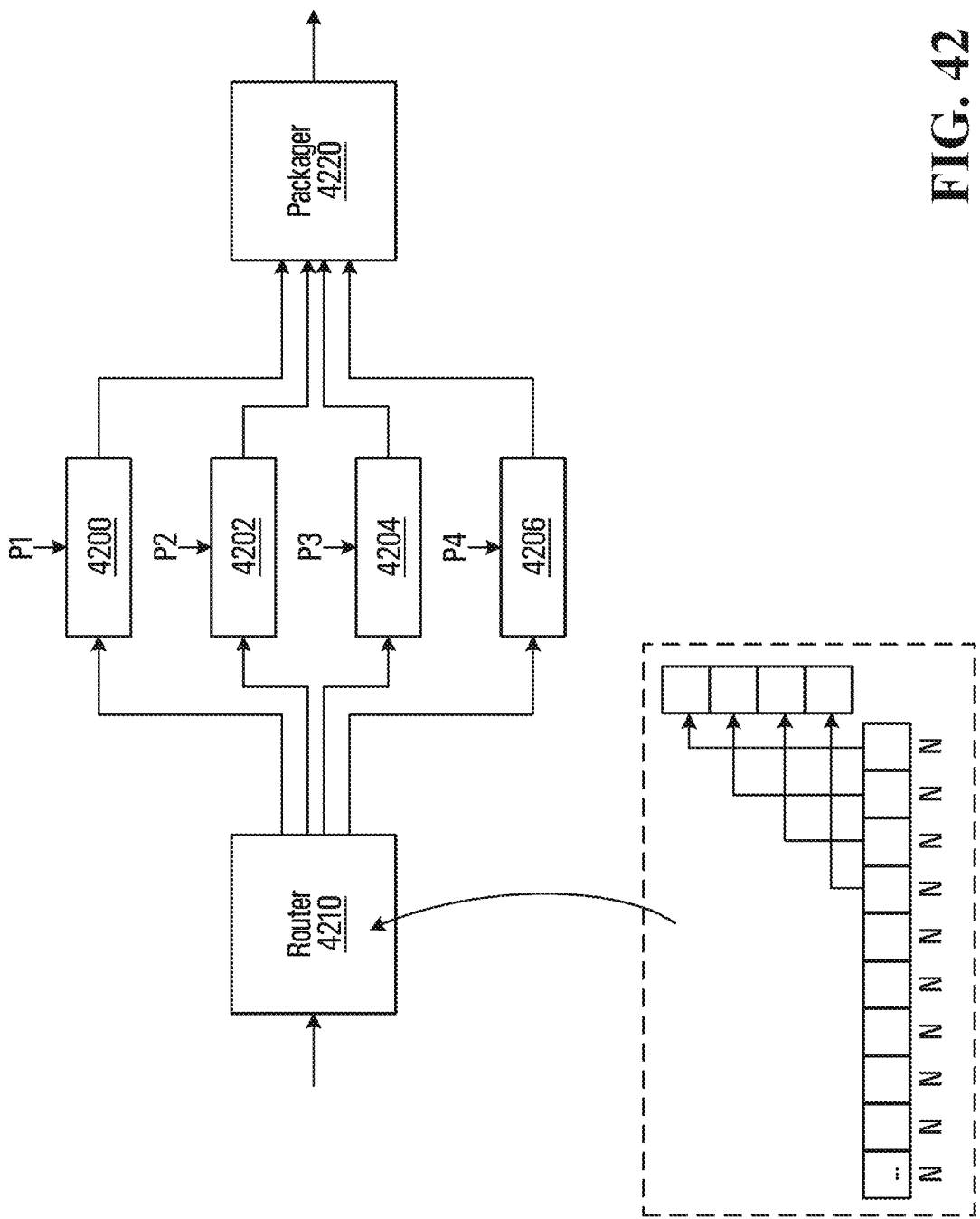
FIG. 42 is a block diagram showing a security enhancement involving block quantropization.

With reference to FIG. 42, there is shown a block quantropization system with a block of four quantropizers 4200, 4202, 4204, 4206. At the sender-side, an input bit stream (e.g., provided in 8-bit or 16-bit characters) is first disassembled by a disassembler 4210 into batches of four segments of size N. The first such segment in each batch is sent to the first quantropizer 4200 for quantropization using a first permutation matrix P1 of size N. The second segment in each batch is sent to the second quantropizer 4202 for quantropization using a second permutation matrix P2 of size N. The third segment in each batch is sent to the third quantropizer 4204 for quantropization using a third permutation matrix P3 of size N. Finally, the fourth segment in each batch is sent to the fourth quantropizer 4206 for quantropization using a fourth permutation matrix P4 of size N. The resulting batch of four N-bit segments is reassembled by a packager 4020, which transforms the sequence of four sets of N bits into 8-bit or 16-bit characters for transmission to the recipient. The recipient side essentially conducts the same operations but in reverse order. It should be understood that the number of quantropizers in the block is not limited to four, and could be a greater or smaller number.

Fourth Security Enhancement: Dynamic Spreading

For any communication in which the message contains structure (e.g. English words, language), one may seek to remove such structure prior to quantropization for at least two security-related reasons:

1. Certain messages (e.g., SMS or IM) are known to start with certain text strings (such as "Hi", "Hey" or "Hello"). Such predictability of a vast majority of messages increases the chances that the permutation matrix can be reverse-engineered (this is the "known plaintext attack");
2. Certain messages do not take advantage of all the $2^N$ unique input ports of the permutation switch. This is indeed true for an 8-bit system (N=8) and in the case of English text, which uses 26 letters (52 including capitals, plus a few punctuation marks) according to a highly skewed probability distribution. As such, where there is an uneven usage of the $2^N$ possible bit arrangements when encoding the message, the difficulty of cracking a $2^N \times 2^N$ permutation matrix reduces to the difficulty of cracking a much smaller permutation matrix. Accordingly, dynamic spreading of the input data may be used.

Figure 32:
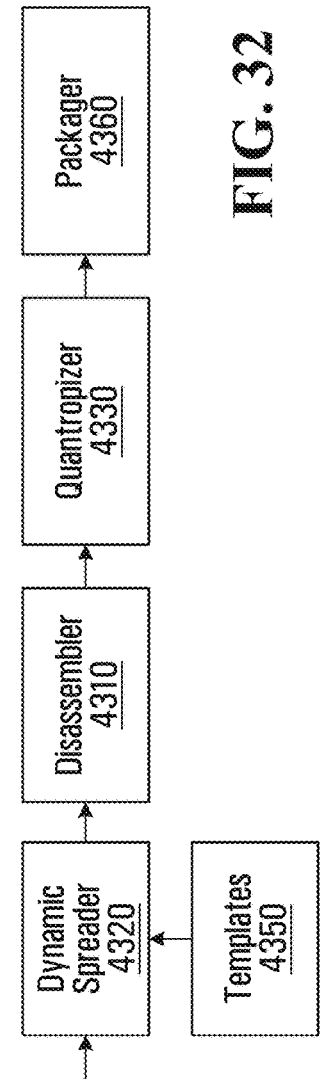
FIG. 32 is a block diagram showing a security enhancement involving dynamic spreading using a stream cipher.
Figure 43:
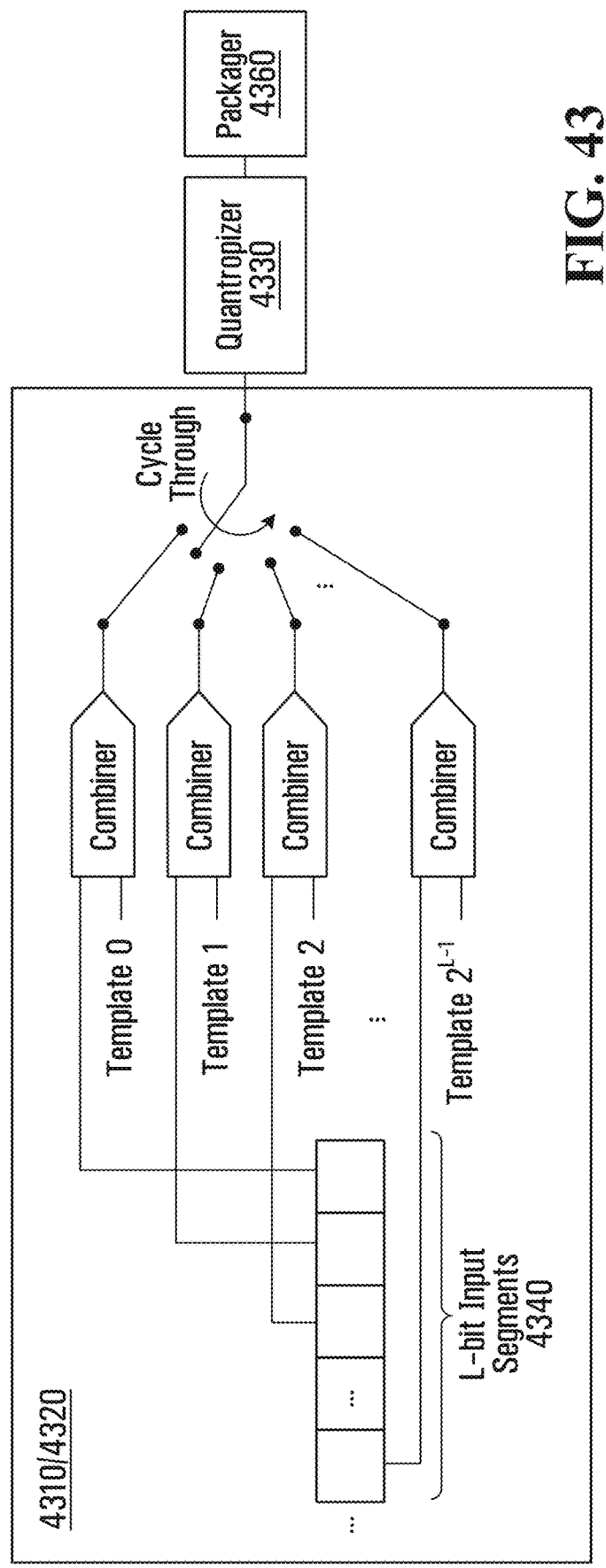
FIG. 43 is a block diagram showing a security enhancement involving dynamic spreading.

With reference to FIGS. 32 and 43, there is shown a quantropization system that includes a disassembler 4310, a dynamic spreader 4320 (also referred to as a "scrambler") and a quantropizer 4330. The dynamic spreader 4320 processes L-bit input segments in batches of $2^L$ such segments. The dynamic spreader 4320 keeps track of the position (i.e., 0 to $2^L-1$) of each L-bit input segment 4340 within each batch of $2^L$ such input segments. The dynamic spreader 4320 also maintains $2^L$ mutually exclusive templates 4350 for bit-toggling, one for each position (i.e., 0 to $2^L-1$). The $2^L$ mutually exclusive templates 4350 could be, for example, the $2^L-1$ possible combinations of zeros and ones possible with N bits. The mutually exclusive templates 4350 could be stored in a memory of the dynamic spreader 4320. The dynamic spreader 4320 then combines the $0^{th}$ L-bit input segment with the $0^{th}$ template to yield the $0^{th}$ L-bit "intermediate" segment. Next, the dynamic spreader 4320 combines the $1^{st}$ L-bit input segment with the $1^{st}$ template to yield the $1^{st}$ L-bit intermediate segment, and so on. By "combining", this could include a variety of invertible functions, such as exclusive or (XOR).

As a result, the dynamic spreader 4320 will produce an ordered sequence of $2^L$ L-bit intermediate segments 4360, which are fed, in sequence, to the quantropizer 4330 via the disassembler 4310. The disassembler 4310 converts the sequence of $2^L$ L-bit intermediate segments 4360 into a sequence of N-bit segments 4340 ready for quantropization.

The quantropizer 4330 conducts a quantropization process using an encoding mapping (e.g., characterized by a permutation matrix P). In some embodiments, the system size, N, of the quantropizer 4330 may be the same as the system size, L, of the dynamic spreader 4320. However, in general, the dynamic spreader 4320 and the quantropizer 4330 may operate with different system sizes. At the receiving end, a dequantropization process is conducted by a dequantropizer and then a dynamic despreading operation is performed by a dynamic despreader. Depending on the nature of the combining performed by the dynamic spreader 4320, the dynamic despreader may perform exactly the same operation (e.g., XOR) as the dynamic spreader 4320, or a different inverse operation.

In some embodiments, the templates 4350 used by the dynamic spreader 4320 may be fixed. In other embodiments, the templates 4350 used by the dynamic spreader 4320 may be dynamic, which means that the templates 4350 may be adjusted over time. In an example, a given template may be XORed with a "salt", and this salt has to be also applied inversely at the dynamic despreader.

It will be seen that use of the dynamic spreader 4320 causes a set of identical input strings to map to different bit segments at the input of the quantropizer 4330, leading to different output segments being transmitted to the recipient, which therefore makes it more difficult for someone intercepting the message to infer the encoding mapping being performed by the quantropizer 4330. As such, spreading an original message amounts to mapping different instantiations of same-valued input segments in the original message into different-valued output segment in the intermediate original message.

In an alternative embodiment, a quantropization system may include a quantum entropy processor with a disassembler, a quantropizer and a packager. Also provided is a dynamic spreader, which in this embodiment could be a stream cipher (such as RC4, for example). The dynamic spreader and the quantropizer are initialized with the appropriate entropy state $E_t$, which allows the quantropizer to generate the appropriate permutation matrix P and serves as a seed for the dynamic spreader. The entropy state $E_t$ can be obtained by consulting an Entropy History Table.

Conclusion

Various operational embodiments are provided herein, including embodiments in which one or more of the operations described may correspond to computer readable instructions stored on one or more computer readable media, which if executed by a computing device, will cause the computing device to perform the operations described. The order in which some or all of the operations are described should not be construed as to imply that these operations are necessarily order-dependent. Alternative ordering will be appreciated by one skilled in the art having the benefit of this description. Further, it will be understood that not all operations are necessarily present in each embodiment provided herein.

Various aspects and embodiments can also be described by the following additional clauses:

1. A communication system, comprising:
    a first apparatus comprising a first processing entity coupled to a first memory; and
    a second apparatus comprising a second processing entity coupled to a second memory;
    wherein the first and second apparatuses communicate over a communication channel;
    wherein the first memory stores first computer-readable instructions and a first mapping between $2^N$ possible input indexes and $2^N$ possible output indexes, N being an integer greater than one;
    wherein the second memory stores second computer-readable instructions and a second mapping between $2^N$ possible input indexes and $2^N$ possible output indexes, the second mapping being derivable from the first mapping;
    wherein the first processing entity is configured for:
        obtaining a first bit stream;
        subdividing the first bit stream into a plurality of N-bit first input segments;
        for each of the N-bit first input segments, determining a first input index as a value represented by the N bits of a particular one of the N-bit first input segments, determining a first output index based on the first input index and the first mapping, and setting bits of a corresponding N-bit first output segment so as to represent the value of the first output index; and
        causing a second bit stream formed using each corresponding N-bit first output segment to be transmitted over the communication channel;
    wherein the second processing entity is configured for:
        receiving the second bit stream;
        subdividing the second bit stream into a plurality of N-bit second input segments;
        for each of the N-bit second input segments, determining a second input index as a value represented by the N bits of a particular one of the N-bit second input segments, determining a second output index based on the second input index and the second mapping, and setting bits of a corresponding N-bit second output segment so as to represent the value of the second output index so as to recover a corresponding one of the N-bit input segments; and
        outputting a third bit stream formed using each corresponding N-bit second output segment.
2. The communication system defined in clause 1, wherein the first processing entity is further configured to send the second mapping to the second apparatus for storage in the second memory.
3. The communication system defined in clause 2, wherein the first processing entity is further configured to derive the second mapping from the first mapping.
4. The communication system defined in clause 3, wherein when the first mapping is represented as a first matrix and the second mapping is represented as a second matrix, the first and second matrices being transposes of one another.
5. The communication system defined in clause 1, wherein the first processing entity is further configured to send the transmitted mapping to the second apparatus, the transmitted mapping being the first mapping or the second mapping.
6. The communication system defined in clause 4, wherein the first processing entity is further configured to send a flag to the second apparatus, the flag indicating whether the transmitted mapping is the first mapping or a transpose of the first mapping.
7. The communication system defined in clause 5, wherein the second processing entity is further configured to process the flag and to store in the second memory the transmitted mapping when the flag indicates that the transmitted mapping is the transpose of the first mapping.
8. The communication system defined in clause 5, wherein the second processing entity is further configured to process the flag and to store in the second memory a transpose of the transmitted mapping when the flag indicates that the transmitted mapping is the first mapping.
9. The communication system defined in clause 5, wherein the first processing entity is further configured for encrypting data indicative of the transmitted mapping prior to sending it to the second apparatus.
10. The communication system defined in clause 9, wherein to encrypt the data indicative of the transmitted mapping prior to sending it to the second apparatus, the first processing entity is configured for using a private key of a private key/public key pair to encrypt the data indicative of the transmitted mapping, the private key being uniquely known to the first apparatus, the public key being made available to the second apparatus.
11. The communication system defined in clause 5, wherein the first and second processing entities are configured for carrying out a handshaking protocol with one another to securely transmit the transmitted mapping from the first apparatus to the second apparatus.
12. The communication system defined in clause 1, wherein the first mapping is stored in the first memory by a permutation matrix, wherein determining the first output index based on the first input index and the first mapping comprises creating a $2^N$-length input vector with all zeroes except for a "1" in a single position corresponding to the first input index, multiplying the permutation matrix and the input vector to obtain a $2^N$-length output vector having all zeroes except for a "1" in a single position, wherein the first output index is set to equal the position in which the "1" appears in the output vector.
13. The communication system defined in clause 1, wherein the first and second mappings are each one-to-one mappings.
14. The communication system defined in clause 1, wherein for plural successive N-bit first input segments, the first processing entity is configured for:
    determining a first input index for each of the first N-bit input segments;
    creating a succession of arrays of size 2, each array corresponding to one of the N-bit first input segments and having all zeroes except for a "1" in a single position corresponding to the first input index;
    applying each of the arrays to inputs of a $2^N$-input, $2^N$-output switch fabric that implements the mapping, thereby to obtain a succession of output arrays at the outputs of the switch fabric, each of the arrays having all zeroes except for a "1" in a single position;
    setting the output index for each of the N-bit output segments to correspond to the position in which the "1" appears in a corresponding one of the output arrays.
15. The communication system defined in clause 1, wherein N is at least as great as 14.
16. The communication system defined in clause 1, the first processing entity being further configured encrypting the first bit stream with an encryption key before said subdividing, the second processing entity being further configured for decrypting the third bit stream with a decryption key corresponding to the encryption key, thereby to recover the first bit stream.

17. The communication system defined in clause 1, the first processing entity being further configured encrypting the second bit stream with an encryption key before said causing, the second processing entity being further configured for decrypting the received bit stream with a decryption key corresponding to the encryption key prior to said subdividing.

18. The communication system defined in clause 1, wherein the first and second apparatuses are mobile communication devices.

19. A data protection method comprising:
using electricity to store, in a computer memory, a mapping between $2^1 V$ possible input indexes and $2^N$ possible output indexes;
using electricity to obtain an input bit stream;
using electricity to subdivide the input bit stream into a plurality of N-bit input segments stored in the computer memory, N being an integer greater than one;
using electricity to produce a plurality of N-bit output segments corresponding to respective ones of the N-bit input segments and to store the N-bit output segment in the computer memory, wherein a particular one of the N-bit output segments is produced from a particular one of the N-bit input segments by:
determining an input index as a value represented by the N bits of the particular one of the N-bit input segments;
determining an output index based on the input index and the mapping;
setting the bits of the particular one of the N-bit output segments so as to represent the value of the output index;
using electricity to output an output bit stream formed using the N-bit output segments;
using electricity to convert the output bit stream into an output signal; and
using electricity to release the output signal onto a physical medium.

20. A method of implementing a secure network amongst a plurality of communication devices, comprising:
determining a mapping between $2^N$ possible input indexes and $2^N$ possible output indexes, where N>1;
securely embedding the mapping within a memory of each of the communication devices;
configuring one or more processors in each of the communication devices to execute a data encoding method when transmitting data to other ones of the communication devices; and
configuring one or more processors in each of the communication devices to execute a data decoding method when processing data received from other ones of the communication devices;
the data encoding and decoding methods comprising:
obtaining an input bit stream;
subdividing the input bit stream into a plurality of N-bit input segments;
producing a plurality of N-bit output segments corresponding to respective ones of the N-bit input segments, wherein a particular one of the N-bit output segments is produced from a particular one of the N-bit input segments by:
determining an input index as a value represented by the N bits of the particular one of the N-bit input segments;
determining an output index based on the input index and the mapping; and
setting the bits of the particular one of the N-bit output segments so as to represent the value of the output index; and
outputting an output bit stream formed using the N-bit output segments.

Finally, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory computer-readable storage medium comprising computer-readable instructions which, when executed by a processor, cause the processor to carryout a method that comprises using a permutation mapping to encode individual first sets of bits of an input bit stream into corresponding same-sized second sets of bits of an output bit stream, wherein the size of the first and second sets of bits is N, wherein permutation mapping is of a size $2^N$ by $2^N$, wherein N is an integer at least as great as 8 and wherein the permutation mapping is such that for at least 90% of the possible corresponding pairs of first and second sets, the relative proportion of ones and zeroes is different between the two sets in the pair; and causing the output bit stream to be at least one of (i) transmitted over a communication channel and (ii) stored in a non-transitory memory.

2. The non-transitory computer-readable storage medium defined in claim 1, wherein the method carried out by the processor further comprises:
receiving a seed from a server; and
generating the permutation mapping based on the seed.

3. The non-transitory computer-readable storage medium defined in claim 1, wherein the method carried out by the processor further comprises releasing the output bit stream towards a recipient entity that uses a second mapping derivable from said permutation mapping to convert N-bit output segments in the output bit stream into the first sets of bits.

4. The non-transitory computer-readable storage medium defined in claim 3, wherein the permutation mapping is obtained from a history table stored in memory and shared with the recipient entity.

5. The non-transitory computer-readable storage medium defined in claim 3, wherein the permutation mapping and the second mapping are representable as $2^N$-by-$2^N$ permutation matricesthat a re transposes of one another.

6. The non-transitory computer-readable storage medium defined in claim 1, wherein the input bit stream carries a blockchain transaction.

7. The non-transitory computer-readable storage medium defined in claim 1, wherein the input bit stream carries a text document.

8. The non-transitory computer-readable storage medium defined in claim 1, wherein the method carried out by the processor further comprises:
using a sensor to obtain sensed data representative of at least one sensed environmental parameter; and
wherein at least some of the first sets of bits of the input bit stream carry the sensed data.

9. The non-transitory computer-readable storage medium defined in claim 1, wherein the method carried out by the processor further comprises:
storing a set of $2^L$ unique L-bit templates, where L is an integer;
separating a prior bit stream into ordered sets of $2^L$ prior segments of size L bits; and
scrambling the L bit positions within each $i^{th}$ prior segment in each of the sets in accordance with a corresponding one of the templates, wherein the input bit stream comprises the prior segments in each set after scrambling.

10. The non-transitory computer-readable storage medium defined in claim 9, wherein the method carried out by the processor further comprises:
changing the templates over time.

11. The non-transitory computer-readable storage medium defined in claim 1, wherein the method carried out by the processor further comprises:
receiving an original message;
spreading the original message, thereby to produce the input bit stream.

12. The non-transitory computer-readable storage medium defined in claim 11, wherein spreading the original message comprises mapping different instantiations of same-valued input segments in the original message into different-valued output segment in the intermediate original message.

13. The non-transitory computer-readable storage medium defined in claim 12, wherein the method carried out by the processor further comprises:
converting second sets of bits in the output bit stream into corresponding new second sets of bits using an inverse mapping derivable from the permutation mapping; and
generating a new output bit stream comprising the N-bit new second sets of bits.

14. The non-transitory computer-readable storage medium defined in claim 13, wherein the method carried out by the processor further comprises:
despreading the new output bit stream.

15. The non-transitory computer-readable storage medium defined in claim 14, wherein the inverse mapping and the permutation mapping are transposes of one another.

16. A communication apparatus comprising:
a processor; and
a non-transitory memory coupled to the processor, wherein the memory stores a permutation mapping of size $2^N$-by-$2^N$, where N is an integer at least as great as 8;
wherein the processor is configured for:
using the permutation mapping to encode individual first sets of bits of an input bit stream into corresponding same-sized second sets of bits of an output bit stream, wherein the size of the first and second sets of bits is N, and wherein the permutation mapping is such that for at least 90% of the possible corresponding pairs of first and second sets, the relative proportion of ones and zeroes is different between the two sets in the pair;
causing the output bit stream to be transmitted over a communication channel.

17. The communication apparatus defined in claim 16, wherein the processor is further configured for:
receiving a seed from a server; and
generating the permutation mapping based on the seed.

18. The communication apparatus defined in claim 16, wherein the output bit stream is released towards a recipient entity that uses a second mapping derivable from said permutation mapping to convert N-bit output segments in the output bit stream back into the first sets of bits.

19. The communication apparatus defined in claim 18, wherein the permutation mapping is obtained from a history table stored in the memory and shared with the recipient entity.

20. The communication apparatus defined in claim 18, wherein the permutation mapping and the second mapping are representable as $2^N$-by-$2^N$ permutation matrices that are transposes of one another.

21. The communication apparatus medium defined in claim 16, wherein the input bit stream carries a blockcha in tra nsaction.

22. The communication apparatus medium defined in claim 16, wherein the input bit stream carries a text document.

23. The communication apparatus medium defined in claim 16, wherein the method carried out by the processor further comprises:
using a sensor to obtain sensed data representative of at least one sensed environmental parameter; and
wherein at least some of the first sets of bits of the input bit stream carry the sensed data.

24. The communication apparatus defined in claim 16, wherein the processor is further configured for:
storing a set of $2^L$ unique L-bit templates;
separating a prior bit stream into ordered sets of $2^L$ prior segments of size L bits; and
scrambling the L bit positions within each $i^{th}$ prior segment in each of the sets in accordance with a corresponding one of the templates, wherein the input bit stream comprises the prior segments in each set after scrambling.

25. The communication apparatus defined in claim 24, wherein the processor is further configured for:
changing the templates over time.

26. The communication apparatus defined in claim 16, wherein the processor is further configured for:
receiving an original message;
spreading the original message, thereby to produce the input bit stream.

27. The communication apparatus defined in claim 26, wherein spreading the original message comprises mapping different insta ntiations of same-valued input segments in the original message into different-valued output segment in the intermediate original message.

28. The communication apparatus defined in claim 27, wherein the processor is further configured for:
converting second sets of bits in the output bit stream into corresponding new second sets of bits using an inverse mapping derivable from the permutation mapping; and
generating a new output bit stream comprising the N-bit new second sets of bits.

29. The communication apparatus defined in claim 28, wherein the processor is further configured for:
despreading the new output bit stream.

30. The communication apparatus defined in claim 29, wherein the inverse mapping and the permutation mapping are transposes of one another.

\* \* \* \* \*